US008524116B2

(12) United States Patent
Ushiyama et al.

(10) Patent No.: US 8,524,116 B2
(45) Date of Patent: Sep. 3, 2013

(54) OPTICAL COMPENSATORY FILM, PROCESS FOR PRODUCING THE SAME, AND POLARIZING PLATE AND LIQUID CRYSTAL DISPLAY EMPLOYING THE SAME

(75) Inventors: Akinobu Ushiyama, Minami-ashigara (JP); Tokuju Oikawa, Minami-ashigara (JP); Jun Watanabe, Minami-ashigara (JP); Kentaro Toyooka, Minami-ashigara (JP); Shinichi Morishima, Minami-ashigara (JP); Masaki Noro, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1613 days.

(21) Appl. No.: 11/630,779

(22) PCT Filed: Jun. 24, 2005

(86) PCT No.: PCT/JP2005/012145
§ 371 (c)(1),
(2), (4) Date: Feb. 4, 2008

(87) PCT Pub. No.: WO2006/001504
PCT Pub. Date: Jan. 5, 2006

(65) Prior Publication Data

US 2008/0199637 A1 Aug. 21, 2008

(30) Foreign Application Priority Data

Jun. 25, 2004 (JP) ................................ 2004-188334
Sep. 22, 2004 (JP) ................................ 2004-274716
Sep. 24, 2004 (JP) ................................ 2004-277364

(51) Int. Cl.
*C09K 19/52* (2006.01)
*C09K 19/00* (2006.01)

(52) U.S. Cl.
USPC ....................... 252/299.01; 428/1.31; 428/1.3

(58) Field of Classification Search
None
See application file for complete search history.

(56) References Cited

U.S. PATENT DOCUMENTS 6,261,649 B1 * 7/2001 Takagi et al. ................. 428/1.1
2001/0033352 A1 10/2001 Park
2004/0057000 A1 * 3/2004 Hong ........................... 349/117
2006/0040070 A1 * 2/2006 Ito et al. ....................... 428/1.31

FOREIGN PATENT DOCUMENTS

JP 2003-232922 A 8/2003
JP 2003-232923 A 8/2003

(Continued)

OTHER PUBLICATIONS

Machine English translation of JP 2004-069730 A. Dec. 11, 2011.*

(Continued)

*Primary Examiner* — Jennifer Chriss
*Assistant Examiner* — J. L. Yang
(74) *Attorney, Agent, or Firm* — Buchanan Ingersoll & Rooney PC

(57) ABSTRACT

A novel optical compensatory sheet comprising an optically anisotropic layer comprising at least one liquid crystal compound, at least one cellulose ester, and at least one polymer A comprising at least one repeating unit derived from a monomer having a fluoro-aliphatic group, and at least one repeating unit having a group selected from the group consisting of carboxyl group (—COOH) or a salt thereof, a sulfo group (—$SO_3H$) or a salt thereof and a phosphonoxy group {—OP (═O) $(OH)_2$} or a salt thereof, is disclosed. A novel optical compensatory sheet comprising an optically anisotropic layer comprising at lest one liquid crystal compound at least one polymer C, having a weight average molecular weight of not less than 5000 and less than 20000, represented by a formula (1b), and at least one polymer D, having a weight average molecular weight of not less than 20000, represented by a formula (1b), is also disclosed. In the formula, "A" represents a repeating unit having a group capable of hydrogen bonding, "B" represents a repeating unit having a polymerizable group, and "C" represents a repeating unit derived from an ethylene-type unsaturated monomer.

$$-(A)_{ai}-(B)_{bj}-(C)_{ck}- \quad \text{Formula (1b)}$$

10 Claims, 9 Drawing Sheets

(a)

(b)

(56) References Cited

FOREIGN PATENT DOCUMENTS

| | | | | |
|---|---|---|---|---|
| JP | 2003-262879 | A | | 9/2003 |
| JP | 2003262879 | A | * | 9/2003 |
| JP | 2004-17486 | A | | 1/2004 |
| JP | 2004-46038 | A | | 2/2004 |
| JP | 2004-063730 | A | | 2/2004 |
| JP | 2004046038 | A | * | 2/2004 |
| JP | 2004-69730 | A | | 3/2004 |
| JP | 2004069730 | A | * | 3/2004 |
| TW | 504590 | B | | 10/2002 |
| TW | 522260 | B | | 3/2003 |

OTHER PUBLICATIONS

Machine English translation of JP 2003-262879 A. Jul. 23, 2012.*
Machine English translation of JP 2004-046038 A. Jul. 23, 2012.*
Machine English translation of JP 2004-069730 A. Jul. 23, 2012.*
Office Action from Japanese Patent Office issued in corresponding Japanese Patent Application No. 2006-554380 dated Oct. 26, 2010, with an English translation.
English-language version of the International Preliminary Report on Patentability and Attached Written Opinion (Forms PCT/IB/326, PCT/IB/373 and PCT/ISA/237) mailed by the International Bureau on Jan. 11, 2007 in corresponding PCT/JP2005/012145, The International Bureau of WIPO, Geneva, Switzerland.
Office Action from Japanese Patent Office issued in corresponding Japanese Patent Application No. 2006-554380 dated Feb. 22, 2011, with an English translation.
Office Action from Taiwan Patent Office issued in corresponding Taiwan Patent Application No. 094121178 dated Dec. 26, 2012, with English translation.

* cited by examiner (A)

(B)

(a)

(b)

OPTICAL COMPENSATORY FILM, PROCESS FOR PRODUCING THE SAME, AND POLARIZING PLATE AND LIQUID CRYSTAL DISPLAY EMPLOYING THE SAME

TECHNICAL FIELD

The present invention relates to optical compensatory films comprising an optically anisotropic layer in which liquid crystal molecules are fixed in an alignment state, and polarizing plates and liquid crystal displays comprising the optical compensatory film.

RELATED ART

Optical compensatory sheets are employed in a variety of liquid-crystal displays to eliminate image coloration and to broaden the viewing angle. Stretched birefringent films have conventionally been employed as optical compensatory sheets. Further, in recent years, instead of optical compensatory sheets formed of a stretched birefringent film, the use of optical compensatory sheets comprising an optically anisotropic layer formed of discotic liquid-crystal molecules on a transparent substrate has been proposed. The optically anisotropic layer may be produced by applying a coating fluid comprising a discotic liquid crystal compound to a surface of an alignment layer, heating the coating layer at a temperature higher than an alignment temperature to align the discotic molecules, and fixing them in the alignment state. Generally, discotic liquid-crystal molecules are highly birefringent. Further, discotic liquid-crystal molecules have various orientation modes. Thus, the use of discotic liquid-crystal molecules permits the achievement of optical properties that are unachievable in conventional stretched birefringent films.

On the other hand, it is necessary for preparing an optically anisotropic layer having desired optical characteristics to control alignment of discotic liquid crystal molecules in the layer since discotic liquid-crystal molecules have various orientation phases. For generating optical compensatory abilities, it is important to align discotic molecules in a hybrid alignment, in which molecules are randomly aligned locally and are aligned with a tilt angle varying according to a distance from a substrate supporting the layer. For generating such a hybrid alignment, a difference between tilt angles at two surfaces of the optically anisotropic layer, one of which is a surface of an alignment layer side, and another one is a surface of an air-interface side, is necessary. When a coating fluid comprising a discotic liquid crystal compound is applied to a surface of an alignment layer and dried the coating layer, discotic molecules near the two surfaces may be aligned in a monodomain manner with appropriate tilt angles respectively. Thus, the hybrid alignment, in which molecules are aligned with a tilt angle varying continuously along a thick direction, can be generated. For generating such a hybrid alignment, it is necessary to align discotic molecules at the alignment layer side with a tilt angle much smaller than that at the air interface side. Some alignment layers formed of polyvinyl alcohols can give tilt angles nearly equal to 0° and such alignment layers have been used for forming hybrid alignments (Japanese Laid-Open Patent Publication, occasionally referred to as "JPA" hereinafter, No. hei 8-50206).

Under prior art, optical compensatory sheets to be used in small or middle size liquid crystal displays not greater than 15-inches have been mainly researched and developed. Recently, however, it is required to develop optical compensatory sheets to be used in bright and large size liquid crystal displays not smaller than 17-inches. When a conventional optical compensatory sheet was disposed on a polarizing plate as a protective film and the stacked product was employed in a large size liquid crystal display, uneven brightness was found on the display panel. This defect was undistinguished when the stacked product was employed in a small size or a middle size liquid crystal display. And, thus, it is required to develop optical compensatory sheets for reduction of light leakage in response to growing in seize and in brightness. It is described in Japanese Laid-Open Patent Publication No. hei 11-148080 that a composition comprising a so-called leveling agent and polymerizable liquid crystal is used in order to reduce unevenness in brightness.

For forming optically anisotropic layers, a coating process has mainly been carried out with a wire bar. The process using wire bar readily causes step-wise unevenness due to the vibration of coating fluid in liquid receiver tank and the eccentricity and bending of a roll for coating. A die coating apparatus for coating fluid coating onto a surface, which is capable of avoid the occurrence of streaks in the coated layer, is disclosed in U.S. Pat. No. 5,759,274.

SUMMARY OF THE INVENTION

One object of the present invention is to provide a novel optical compensatory film, comprising a layer giving an optical anisotropy brought about by a hybrid alignment of liquid-crystalline molecules with an improved tilt angle, excellent in optical compensation. Especially, it is to provide an optical film and a polarizing plate, comprising an optically anisotropic layer formed of a composition comprising at least one discotic liquid-crystal compound, in which the discotic liquid-crystalline molecules are aligned in a hybrid alignment with improved tilt angles at an air interface side and/or at an alignment layer side, capable of contributing to improving viewing angles of liquid crystal displays employing TN-mode, OCB-mode, VA-mode, IPS-mode or the like.

Another object of the present invention is to provide an optical compensatory film and a polarizing plate capable of contributing to displaying high-quality images without contributing unevenness in displaying, even when being employed in a big screen liquid crystal display.

And another object of the present invention is to provide a liquid-crystal display improved in viewing-angle property.

The first embodiment of the present invention relates to an optical compensatory sheet comprising an optically anisotropic layer comprising:

at least one liquid crystal compound, at least one cellulose ester, and at least one polymer A comprising:

at least one repeating unit derived from a monomer having a fluoro-aliphatic group, and at least one repeating unit represented by a formula (1a):

Formula (1a)

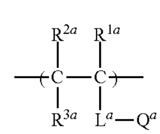

wherein $R^{1a}$, $R^{2a}$ and $R^{3a}$ respectively represent a hydrogen atom or a substituent; $L^a$ is a linking group selected from Linkage Group I shown below or a divalent group consisting of two or more selected from Linkage Group I shown below:

(Linkage Group I)

a single bond, —O—, —CO—, —NR$^{4a}$— (R$^{4a}$ is a hydrogen atom, an alkyl group, an aryl group or an aralkyl group), —S—, —$SO_2$—, —P(=O)(OR$^{5a}$)—(R$^{5a}$ is an alkyl group, an aryl group or aralkyl group), an alkylene group and arylene group;

and $Q^a$ is a carboxyl group (—COOH) or a salt thereof, a sulfo group (—$SO_3$H) or a salt thereof or a phosphonoxy group {—OP(=O)$(OH)_2$} or a salt thereof.

In the first embodiment, the optically anisotropic layer may further comprise at least one polymer B having a fluoro-aliphatic group.

The second embodiment of the present invention relates to an optical compensatory sheet comprising an optically anisotropic layer comprising:

at lest one liquid crystal compound, at least one polymer C, having a weight average molecular weight of not less than 5000 and less than 20000, represented by a formula (1b), and at least one polymer D, having a weight average molecular weight of not less than 20000, represented by a formula (1b);

$$-(A)ai-(B)bj-(C)ck- \qquad \text{Formula (1b)}$$

wherein "A" represents a repeating unit having a group capable of hydrogen bonding and i (i is an integer of bigger than 1) types of "A" are included in the polymer; "B" represents a repeating unit having a group capable of polymerization (polymerizable group) and j (j is an integer) types of "B" are included in the polymer; and "C" represents a repeating unit derived from a ethylene-type unsaturated monomer and k (k is an integer) types of "C" are included in the polymer, provided that at least one of j and k is not zero; and "a", "b" and "c" respectively represent weight % (polymerization ratio) of "A", "B" and "C", the total weight % of i types of "A", Σai, is from 1 to 99 wt %, the total weight % of j types of "B", Σbj, is from 0 to 99 wt %, and the total weight % of k types of "C", Σck, is from 0 to 99 wt %, provided that at least one of Σbj and Σck is not zero wt %.

In the second embodiment, the optically anisotropic layer may further comprise at least one cellulose ester; and the optically anisotropic layer may further comprise at least one polymer B having a fluoro-aliphatic group.

In the first and second embodiments, the liquid crystal compound may be selected from discotic compounds; in the optically anisotropic layer, molecules of the liquid crystal compound may be fixed in a hybrid alignment state; and the optically anisotropic layer may be formed by applying a coating fluid on a surface with a slider coater or a slot die coater.

In another aspect, the first and second embodiments relate to an optical compensatory sheet comprising an optically anisotropic layer comprising at least a liquid crystal compound in a fixed tilt-orientation state, wherein the optically anisotropic layer has an Re of 40 nm or more, an Re(40)/Re ratio of less than 2.0 and an Re(−40)/Re ratio of 0.40 or more, under provisions that the retardation value of the optically anisotropic layer as measured along the film normal direction is defined as Re, the retardation value thereof as measured in the face orthogonal to the film including the orientation direction, along a direction rotating by +40° from the film normal line is defined as Re(40) and the retardation value thereof as measured in the face orthogonal to the film including the orientation direction, along a direction rotating by −40° from the film normal line is defined as Re(−40).

In the first and second embodiments, the angle of the director of the liquid crystal compound toward the film plane changes along the film thickness direction in the optically anisotropic layer.

The present invention also relates to a process for producing the optical compensatory sheet of the first or second embodiment, comprising:

(a) applying a coating fluid comprising at least one liquid crystal compound to a surface, using a slot die;

(b) aligning molecules of the liquid crystal compound in an oblique alignment state, and (c) fixing the molecules in the alignment state to form an optically anisotropic layer.

As embodiments of the present invention, there are provided the process further comprising applying a coating fluid to a surface of a substrate continuously running using a slot die to form an alignment layer, wherein the coating fluid comprising at least one liquid crystal compound is applied to the surface of the alignment layer; the process, after the (a) step, further comprising drying a coating layer formed of the coating fluid with a dryer having a casing capable of wrapping web, while preventing air nearby the surface of the coating layer from disorder and retaining solvent vapor at the surface of the coating layer in a high concentration during drying; and the process wherein drying the coating layer at a temperature which is controlled by disposing a plate member at the side of the coating layer of the dryer, capable of condensing and recovering evaporated solvent from the coating layer, and by disposing a cooler in the plate member.

The present invention also relates to a liquid crystal display comprising at least one optical compensatory sheet of the first or second embodiment; a polarizing plate comprising, at least, a linear polarizing film and an optical compensatory sheet of the first or second embodiment; and a liquid crystal display comprising a liquid crystal cell (for example, a TN-mode liquid crystal cell), a pair of polarizing films respectively disposed either side of the liquid crystal cell, and at least one optical compensatory sheet of the first or second embodiment disposed between the cell and one of the pair of the polarizing films.

Figure 1:
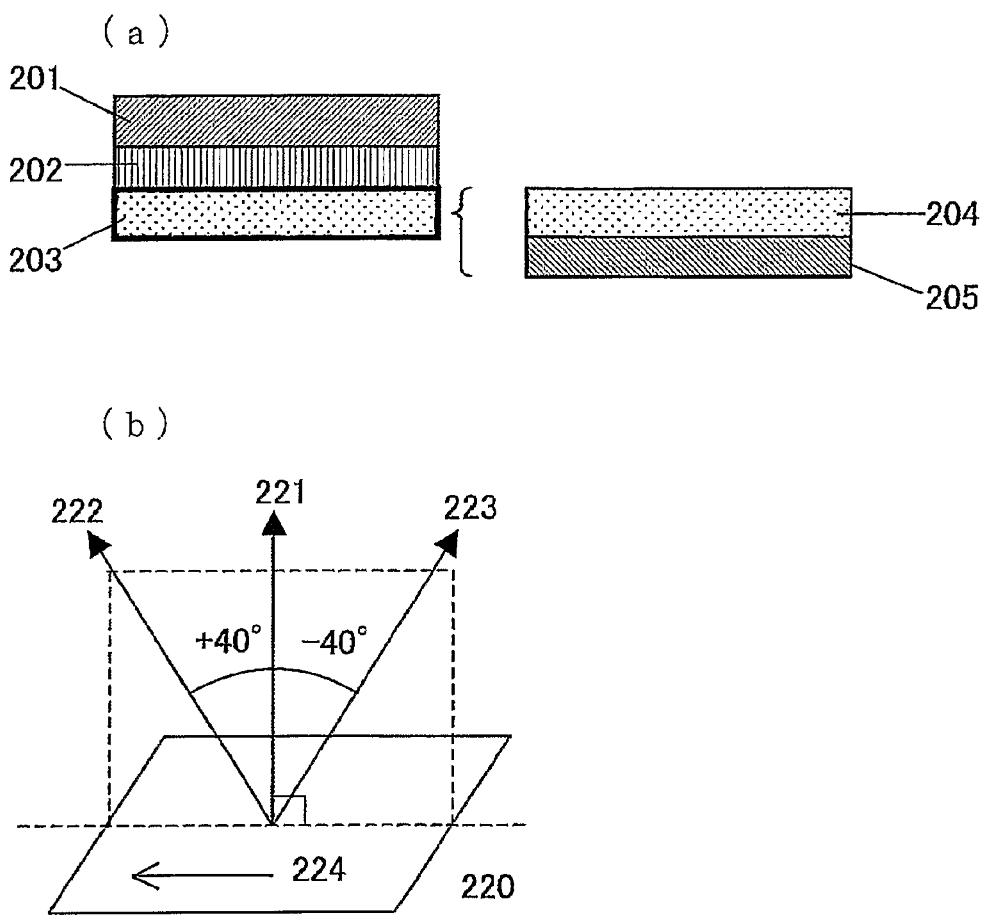
FIG. 1 shows schematic views of one embodiment of an optical compensatory sheet and an ellipsoidal polarizing plate in accordance with the invention.

The meanings of the reference numerals in the drawings are mentioned below.

10: Coating/drying line
12: Belt-like flexible substrate
14: Apparatus for transferring band-like flexible substrate
16: Coating mean
18: Dryer
20: Ventilating drying unit
22: Guide roller
24: Winding-up apparatus
26: Dryer
30: Condense plate
110: Coater
111: Backup roll
112: Web
113: Slot die
114: Coating fluid
114*b*: Coated film
115: Pocket
116: Slot
116*a*: Opening
117: Tip lip
117*a*: Flat part
118: Upstream lip land
119: Downstream lip land
130: Slot die
131: Downstream lip land
132: Pocket
133: Slot
$I_{LO}$: Land length of downstream lip land
$I_{UP}$: Length of upstream lip land along web running direction
201: Protective film of polarizing plate
202: Polarizing film
203: Optical compensatory sheet
204: Transparent support film
205: Optically anisotropic layer
206: Liquid crystal cell
207: Liquid crystal layer
208: Back light
209: Oblique polarizing plate
211: Direction of absorption axis of upper polarizing plate
212: Rubbing direction on the side of upper substrate of liquid crystal cell
213: Rubbing direction on the side of lower substrate of liquid crystal cell
214: Direction of absorption axis of lower polarizing plate
220: Optical compensatory sheet of the invention
221, 222, 223: Direction for observing Re(0), Re(±40)
224: Orientation direction of liquid crystal compound

DETAILED DESCRIPTION OF THE INVENTION

The present invention will be described in detail.

It is noted that, in the present invention, the term "hybrid alignment" is used for any alignments in which liquid-crystalline molecules are aligned with a tilt angle, or in other words an angle formed by their long axes (for example, in the cases of discotic compounds, their disc-like core) and a horizontal plane of the layer (in an embodiment comprising the optically anisotropic layer and a substrate supporting the layer, the horizontal plane is equal to a surface of the substrate), varying according to a distance from a substrate supporting the optically anisotropic layer, or in other words varying in a depth-direction. The hybrid alignment is achieved by aligning liquid-crystalline molecules in an area between two interfaces (for example, when the layer is formed on an alignment layer, one is an interface between the alignment layer and a liquid-crystal composition and another is an interface between an air and a liquid-crystal composition, and, however, two interfaces does not always mean those for the optically anisotropic layer transferred from on the alignment layer to on another substrate or the like) with tilt angles being different between at the two interfaces. When an optically anisotropic layer is formed on an alignment layer, a hybrid alignment is achieved by aligning liquid-crystalline molecules with a tilt angle at an interface between an optically-anisotropic layer (a liquid-crystal composition) and an alignment layer, referred to as "an alignment layer interface", and with a different tilt angle at an interface between an air and an optically anisotropic layer (a liquid-crystal composition), referred to as "an air interface". Examples of the manner of changing in a tilt angle include continuous increase, continuous decrease, intermittent increase, intermittent decrease, change comprising continuous increase and continuous decrease and intermittent change comprising increase and decrease. Embodiments of the intermittent changes comprise an area in which the tilt angle doesn't change in depth-direction. According to the present invention, it is preferred that the tilt angle increases or decreases as a whole whether the tilt angle change continuously or not. It is more preferred that the tilt angle increases as a whole with the position of the molecules being far from the substrate, and it is much more preferred that the tilt angle increases continuously as a whole with the position of the molecules being far from the substrate.

In the specification, the term "tilt-orientation" is used for any alignments in which liquid-crystalline molecules are aligned with a tilt angle, or in other words an angle formed by their long axes (for example, in the cases of discotic compounds, their disc-like core) and a horizontal plane of the layer (in an embodiment comprising the optically anisotropic layer and a substrate supporting the layer, the horizontal plane is equal to a surface of the substrate). In the tilt-orientation, the tilt angle may vary or not vary in a depth-direction of a layer.

In the specification, ranges indicated with "to" mean ranges including the numerical values before and after "to" as the minimum and maximum values.

In the specification, the meaning of "polymerization" includes "copolymerization".

The meaning "on a substrate" or "on an alignment layer" includes not only "on a surface of a substrate" or "on a surface of an alignment layer" but also "on a surface of a layer disposed on a substrate" or "on a surface of a layer disposed on an alignment layer".

First Embodiment

The first embodiment of the invention relates to an optical compensatory sheet comprising an optically anisotropic layer comprising a liquid crystal compound, cellulose ester and a polymer "A".

(Cellulose Ester)

First, the cellulose ester to be used in the first embodiment will be described in detail.

Adding cellulose ester to a composition comprising a liquid crystal compound may contribute to avoiding the occurrence of cissing ("hajiki") when the composition is applied to a surface. Cellulose ester may also contribute to control tilt angles of liquid crystal molecules. Examples of the cellulose ester, which can be used in the first embodiment preferably, include cellulose acetate, cellulose acetate butyrate, cellulose acetate propionate, hydroxypropyl cellulose, methylcellulose and carboxy methyl cellulose. Among these, cellulose acetate butyrate is preferred, and cellulose acetate butyrate having a butyrylation degree of 40% or more is much more preferred. The amount of cellulose acetate is desirably from 0.01 to 20 wt %, more desirably from 0.05 to 10 wt % and much more desirably from 0.05 to 5 wt % with respect to the total weight of a single or plural liquid crystal compounds.

(Polymer A)

Next, Polymer A to be used in the first embodiment will be described in detail. The polymer A is a copolymer comprising a repeating unit derived from a monomer having a fluoro-aliphatic group and a repeating unit represented by a formula (1a). The polymer A may mainly contribute to controlling a tilt angle of liquid crystal molecule at an alignment layer side.

Formula (1a)

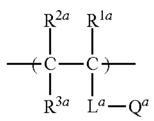

In the formula (1a), $R^{1a}$, $R^{2a}$ and $R^{3a}$ respectively represent a hydrogen atom or a substituent; $L^a$ is a linking group selected from Linkage Group I shown below or a divalent group consisting of two or more selected from Linkage Group I shown below:

(Linkage Group I)

a single bond, —O—, —CO—, —$NR^{4a}$— ($R^{4a}$ is a hydrogen atom, an alkyl group, an aryl group or an aralkyl group), —S—, —$SO_2$—, —P(=O)($OR^{5a}$)—($R^{5a}$ is an alkyl group, an aryl group or aralkyl group), an alkylene group and arylene group;

and $Q^a$ is a carboxyl group (—COOH) or a salt thereof, a sulfo group (—$SO_3H$) or a salt thereof or a phosphonoxy group {—OP(=O)$(OH)_2$} or a salt thereof.

The types of the polymer A is not limited, and may be selected various types of polymers. Various polymer types are described on pages 1 to 4 in "Revision Chemistry of Polymer Synthesis (Kaitei Porimar Gousei no Kagaku)" written by OHTSU TAKAYUKI and published by Kagaku-Dojin Publishing Company, Inc in 1968, and the polymer A may be selected the described polymer types such as polyolefins, polyesters, polyamides, polyimides, polyurethanes, polycarbonates, polysulfones, polyethers, polyacetals, polyketones, polyphenylene-oxides, polyphenylene-sulfides, polyarylates, PTFEs, polyvinylidene-fluorides or cellulose derivatives. The polymer A is desirably selected from polyolefins.

It is preferred that the polymer A has a fluoro-aliphatic group in side chain. The carbon number of the fluoro-aliphatic group is desirably from 1 to 12 and more desirably from 6 to 10. The aliphatic group may have a chain or cyclic structure, and the chain structure may be linear or branched. Among those, linear $C_{6-10}$ fluoro-aliphatic groups are preferred. The fluorine-substitution degree of the fluoro-aliphatic group is desirably decided, however not to be limited to, such that not less than 50%, more desirably not less than 60%, of all carbon atoms in the corresponding aliphatic group are replaced with fluorine atoms. The fluoro-aliphatic group in a side chain may bind to a main chain through a linking group such as an ester linkage, amide linkage, imido linkage, urethane linkage, urea linkage, ether linkage, thioether linkage or aromatic ring.

The repeating unit having a fluoro-aliphatic group derived from a monomer represented by a formula (2a) is preferred.

Formula (2a)

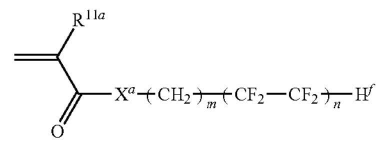

In the formula (2a), $R^{11a}$ is hydrogen or methyl; $X^a$ is oxygen (O), sulfur (S) or —N($R^{12a}$)— where $R^{12a}$ represents a hydrogen atom or a $C_{1-4}$ alkyl group and desirably a hydrogen atom or methyl; $H^f$ is hydrogen or fluorine; m is an integer from 1 to 6 and n is an integer from 2 to 4.

$X^a$ is desirably oxygen, $H^f$ is desirably hydrogen, m is desirably 1 or 2 and n is desirably 3 or 4, and mixtures thereof may be used.

The monomer having a fluoro-aliphatic group may be derived from a fluoro aliphatic compound prepared by a telomerization method, occasionally referred to as telomer method, or an oligomemerization, occasionally referred to as oligomer method. Examples of preparation of the fluoride-aliphatic compound are described on pages 117 to 118 in "Synthesis and Function of Fluoride Compounds (Fussokagoubutsu no Gousei to Kinou)" overseen by ISHIKAWA NOBUO and published by CMC Publishing Co., Ltd in 1987; and on pages 747 to 752 in "Chemistry of Organic Fluorine Compounds II", Monograph 187, Ed by Milos Hudlicky and Attila E. Pavlath, American Chemical Society 1995; and the like. The telomerization method is a method for producing a telomer by carrying out radical polymerization of fluorine-containing compound such as tetrafluoroethylene in the presence of an alkylhalide such as iodide, having a large chain-transfer constant number, as a telogen. One example is shown in Scheme-I.

The obtained fluorine-terminated telomers are usually terminal-modified properly as shown in Scheme 2, to give fluoro aliphatic compounds. These compounds are, if necessary, transferred to a desired monomer structure, and then used for preparing fluoro-aliphatic-containing polymers.

Scheme 2

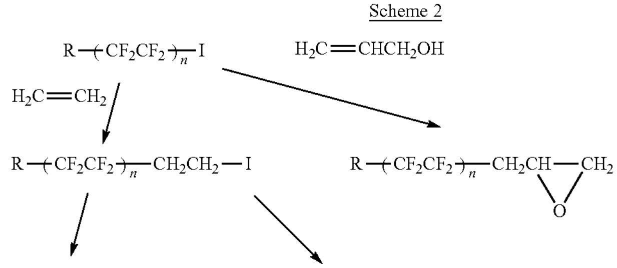

$R-(CF_2CF_2)_n-CH_2CH_2-OH$
-continued
$R-(CF_2CF_2)_n-CH=CH_2 \longrightarrow R-(CF_2CF_2)_n-CO_2H$
Examples of the fluoride monomer which can be used for preparing the polymer A employed in the first embodiment include, however not to be limited to, compounds shown below.
F-1
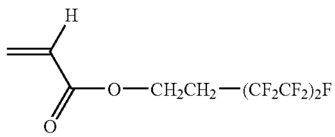
F-2
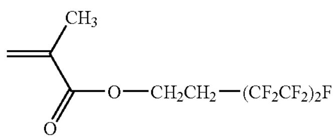
F-3
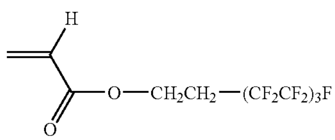
F-4
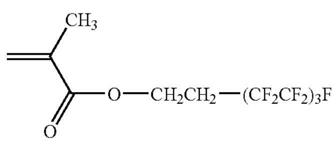
F-5
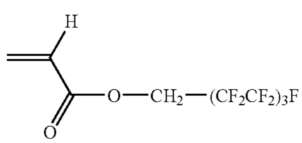
F-6
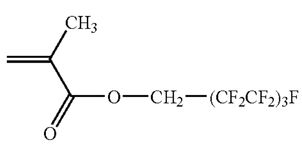
F-7
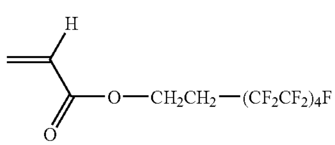
F-8
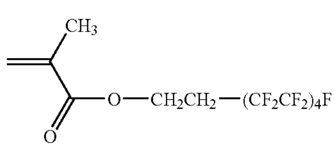
F-9
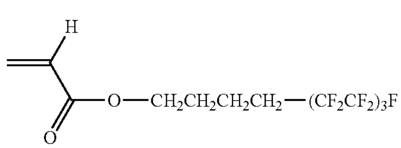
-continued
F-10
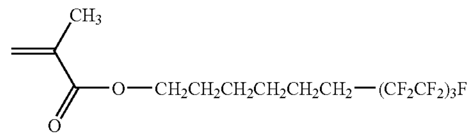
F-11
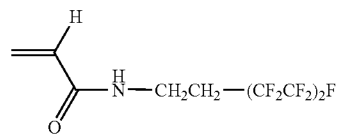
F-12
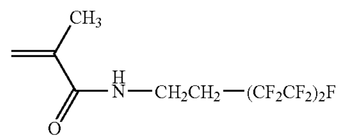
F-13
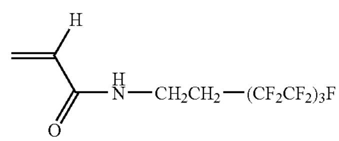
F-14
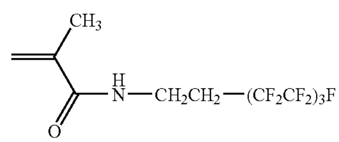
F-15
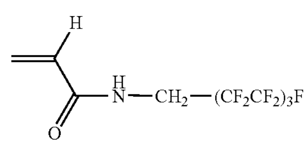
F-16
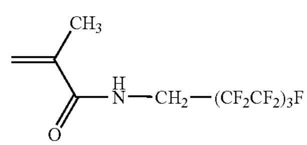
F-17
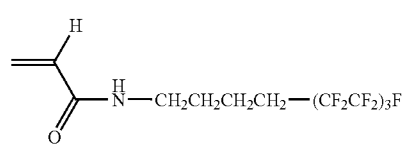
F-18
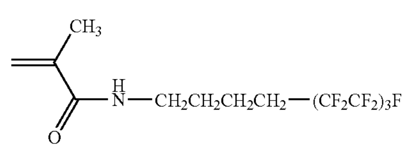
F-19
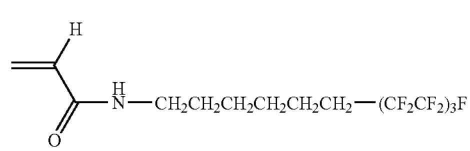

-continued
F-20
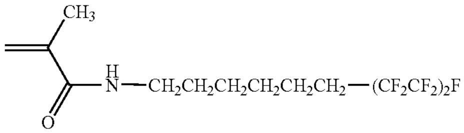
F-21
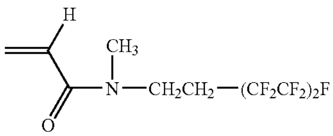
F-22
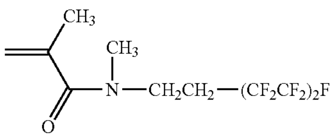
F-23
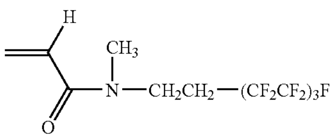
F-24
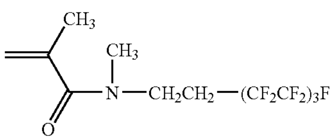
F-25
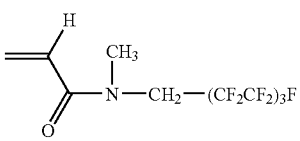
F-26
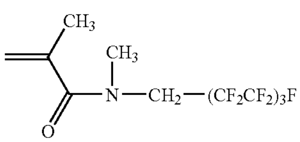
F-27
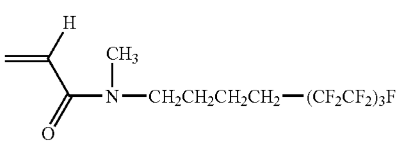
F-28
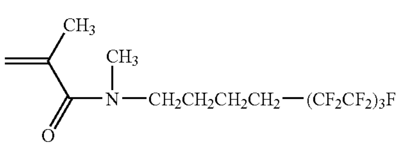
F-29
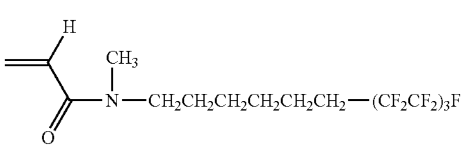
F-30
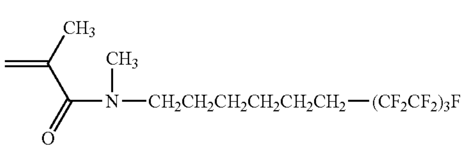
-continued
F-31
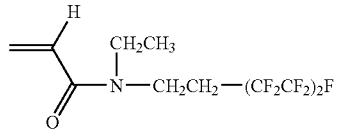
F-32
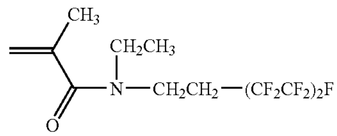
F-33
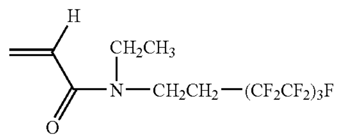
F-34
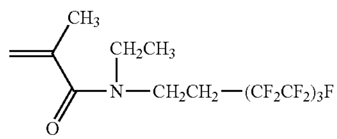
F-35
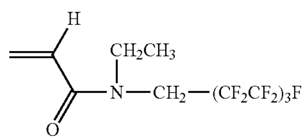
F-36
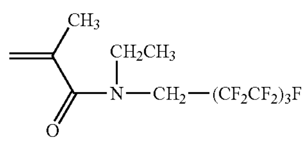
F-37
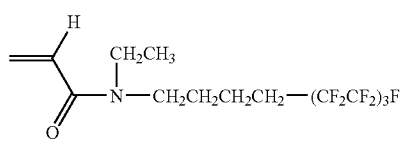
F-38
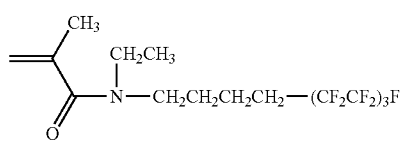
F-39
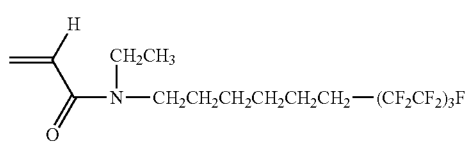
F-40
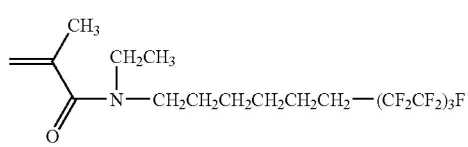
F-41
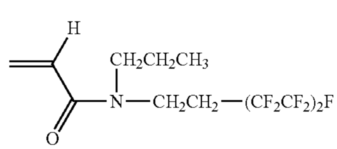

-continued
F-42
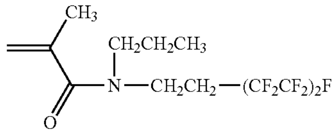
F-43
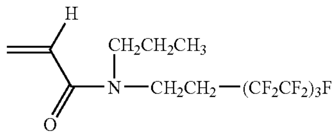
F-44
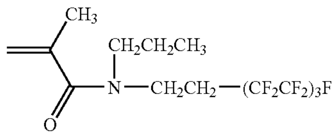
F-45
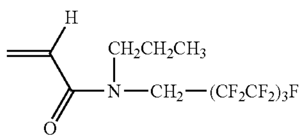
F-46
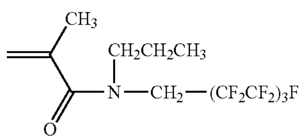
F-47
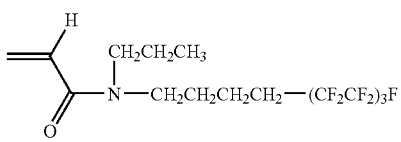
F-48
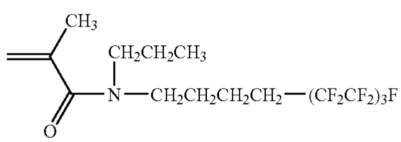
F-49
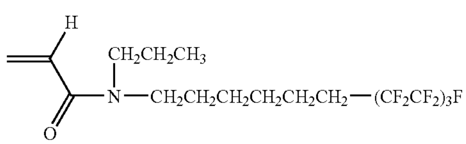
F-50
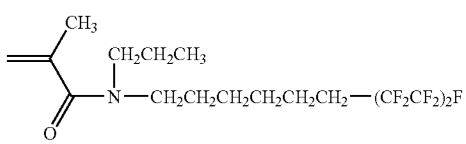
F-51
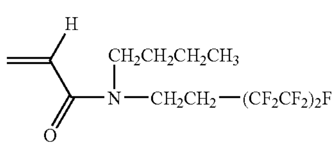
F-52
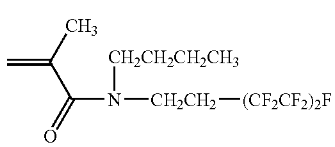
-continued
F-53
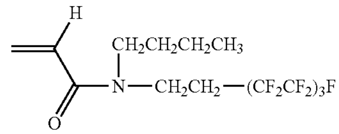
F-54
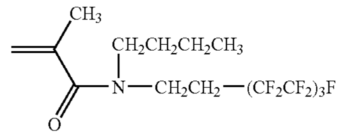
F-55
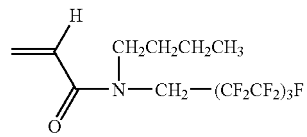
F-56
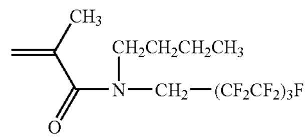
F-57
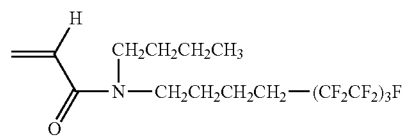
F-58
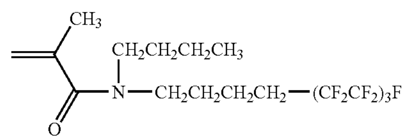
F-59
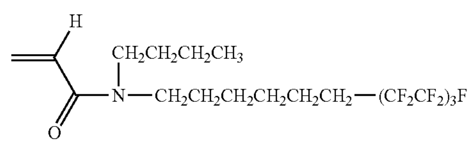
F-60
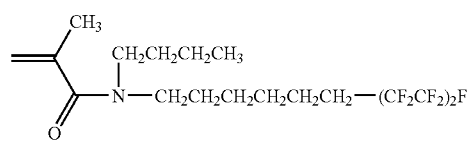
F-61
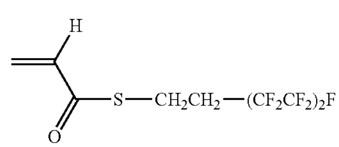
F-62
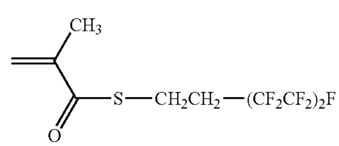
F-63
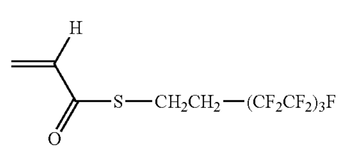

-continued

F-64

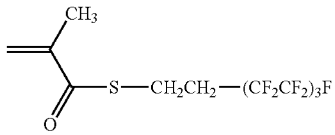

F-65

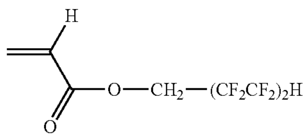

F-66

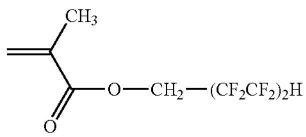

F-67

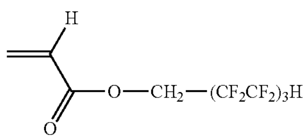

F-68

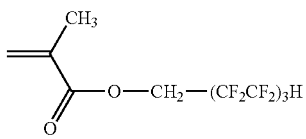

F-69

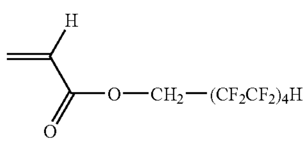

F-70

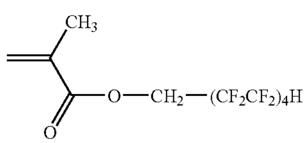

Next, the repeating unit represented by the formula (1a) will be described in detail.

Formula (1a)

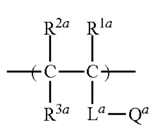

In the formula (1a), $R^{1a}$, $R^{2a}$ and $R^{3a}$ respectively represent a hydrogen atom or a substituent. $Q^a$ is a carboxyl group (—COOH) or a salt thereof, a sulfo group (—$SO_3H$) or a salt thereof or a phosphonoxy group {—OP(═O)$(OH)_2$} or a salt thereof. $L^a$ is a linking group selected from Linkage Group I shown below or a divalent group consisting of two or more selected from Linkage Group I shown below:

(Linkage Group I)

a single bond, —O—, —CO—, —$NR^{4a}$— ($R^{4a}$ is a hydrogen atom, an alkyl group, an aryl group or an aralkyl group), —S—, —$SO_2$—, —P(═O)($OR^{5a}$)— ($R^{5a}$ is an alkyl group, an aryl group or aralkyl group), an alkylene group and arylene group.

In the formula (1), $R^{1a}$, $R^{2a}$ and $R^{3a}$ respectively represent a hydrogen atom or a substituent selected from Substituent Group I shown below:

(Substituent Group I)

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{6-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitoro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl. These substituents may be substituted by at least one substituent group selected from these. When two substituent groups are selected, they may be same or different each other. Two or more may, if possible, bond each other to form a ring.

It is preferred that $R^{1a}$, $R^{2a}$ and $R^{3a}$ respectively represent a hydrogen atom, an alkyl group, a halogen atom (such as fluorine, chlorine, bromine or iodine) or a group represented by $-L^a-Q^a$ described later; more preferred that $R^{1a}$, $R^{2a}$ and $R^{3a}$ respectively represent a hydrogen atom, a $C_{1-6}$ alkyl group, chlorine or a group represented by $-L^a-Q^a$ described later; much more preferred that $R^{1a}$, $R^{2a}$ and $R^{3a}$ respectively represent a hydrogen atom or a $C_{1-4}$ alkyl group; further much more preferred that $R^{1a}$, $R^{2a}$ and $R^{3a}$ respectively represent a hydrogen atom or a $C_{1-2}$ alkyl group; and most preferred that $R^{2a}$ and $R^{3a}$ are hydrogen and $R^{1a}$ is hydrogen or methyl. Examples of the alkyl group include methyl, ethyl, n-propyl, n-butyl and sec-butyl. The alkyl group may have any substituent. Examples of the substituent include a halogen atom, an aryl group, a heterocyclic group, an alkoxyl group, an aryloxy group, an alkylthio group, an arylthio group, an acyl group, a hydroxy group, an acyloxy group, an amino group, an alkoxycarbonyl group, an acylamino group, an oxycarbonyl group, a carbamoyl group, a sulfonyl group, a sulfamoyl group, a sulfonamido group, a sulforyl group and a carboxyl group. It is noted that when the alkyl group has any substituent, the carbon atom number of the alkyl group, described above, is the number of the carbon atoms included in the only alkyl group, and the carbon atoms included in the substituent are not counted. Numbers of carbon atoms included in the other groups described later are defined as same as that of the alkyl group.

$L^a$ is a divalent linking group selected from the above defined group or any combination of two or more selected from the above identified group. The $R^{4a}$ in —$NR^{4a}$— described above represents a hydrogen atom, an alkyl group, an aryl group or an aralkyl group, and desirably a hydrogen atom or an alkyl group. And the $R^{5a}$ in —$PO(OR^{5a})$— represents an alkyl group, an aryl group or an aralkyl group, and desirably an alkyl group. When $R^{4a}$ or $R^{5a}$ is an alkyl group, an aryl group or an aralkyl group, the desired carbon numbers of them are same as those described in Substituent Group I. L desirably contains a single bond, —O—, —CO—, —$NR^{4a}$—, —S—, —$SO_2$—, an alkylene group or arylene group; more desirably contains a single bond, —CO—, —O—, —$NR^{4a}$—, an alkylene group or an arylene group; and much more desirably represents a single bond. When $L^a$ contains an alkylene group, the carbon atom number of the alkylene group is desirably from 1 to 10, more desirably from 1 to 8 and much more desirably from 1 to 6. Preferred examples of the alkylene group include methylene, ethylene, trimethylene, tetrabutylene and hexamethylene. When $L^a$ contains an arylene group, the carbon atom number of the arylene group is desirably from 6 to 24, more desirably from 6 to 18 and much more desirably from 6 to 12. Preferred examples of the arylene group include phenylene and naphthalene. When $L^a$ contains a divalent linking group consisting of a combination of an alkylene group and an arylene group, or in other words an aralkyl group, the carbon atom number in the aralkyl group is desirably from 7 to 34, more desirably from 7 to 26 and much more desirably from 7 to 16. Preferred examples of the aralkyl group include phenylene methylene, phenylene ethylene and methylene phenylene. $L^a$ may have any substituent. Examples of the substituent are same as those exemplified for the substituent of $R^{1a}$, $R^{2a}$ or $R^{3a}$.

Examples of $L^a$ include, however not to be limited to, those shown below.

L-1

—

L-2

—COO—$(CH_2)_2$—

L-3

—COO—$(CH_2)_3$—

L-4

—COO—$(CH_2)_5$—

L-5

—COO—$(CH_2)_8$—

L-6

—COO—$(CH_2)_{11}$—

L-7

—COO—$(CH_2)_3$—$CH(CH_3)CH_2$—

L-8

—CONH—$(CH_2)_3$—

L-9

—CONH—$(CH_2)_5$—

L-10

—CON($CH_3$)—$(CH_2)_8$—

L-11

—CONH—$(CH_2)_{11}$—

L-12

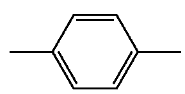

L-13

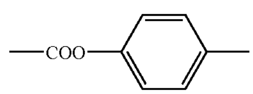

L-14

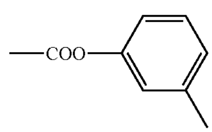

L-15

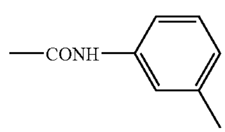

L-16

—$COOCH_2CH_2OCH_2$—

L-17

—COO—$(CH_2CH_2O)_2$—$CH_2$—

L-18

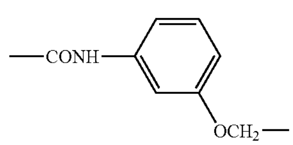

L-19

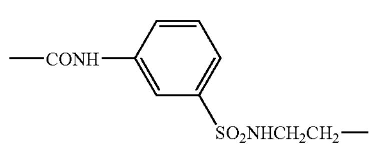

-continued

L-20

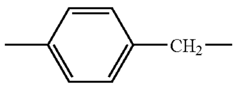

L-21

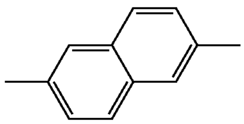

L-22

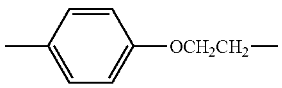

L-23

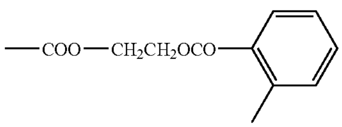

L-24

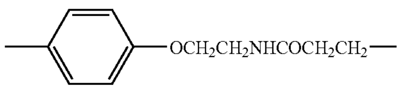

L-25

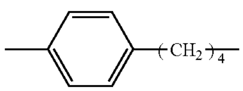

L-26

$-(CH_2)_5-$

L-27

$-O-(CH_2)_4-O-CH_2-$

In the formula (1a), $Q^a$ represents a carboxyl group or a carboxylate such as lithium carboxylate, sodium carboxylate, potassium carboxylate, ammonium carboxylate (for example, unsubstituted ammonium carboxylate, tetramethylammonium carboxylate, trimethyl-2-hydroxyethylammmonium carboxylate, tetrabutylammonium carboxylate, trimethylbenzylammonium carboxylate or dimethylphanylammmonium carboxylate) or pyridinium carboxylate; a sulfo group or a sulfate (examples of a counter cation are same as those exemplified for the carboxylate above); or a phosphonoxy group or a phosphonoxylate (examples of a counter cation are same as those exemplified for the carboxylate above). Q is desirably a carboxyl group, a sulfo group or a phosphonox group, more desirably a carboxyl group or a sulfo group and much more desirably a carboxyl group.

Examples of the monomer corresponding to the repeating unit represented by the formula (1a), which can be used for producing the polymer A to be used in the first embodiment, include, however not to be limited to, those shown below.

C-1

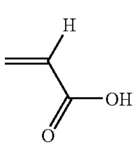

C-2

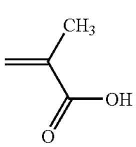

-continued

C-3

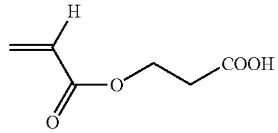

C-4

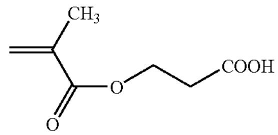

C-5

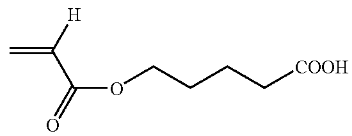

C-6

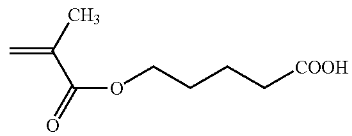

C-7

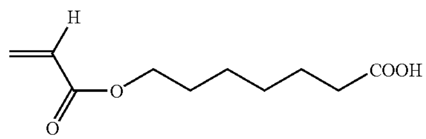

C-8

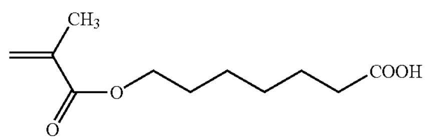

C-9

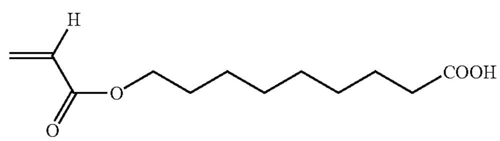

C-10

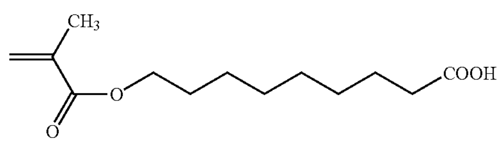

C-11

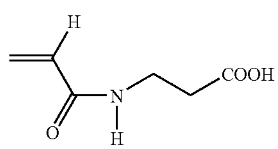

C-12

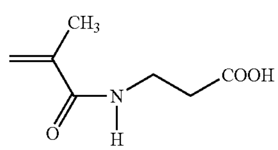

C-13

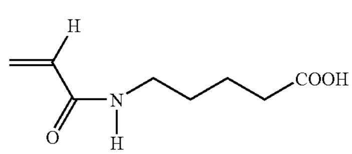

-continued

C-14

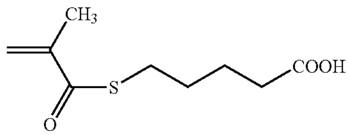

C-15

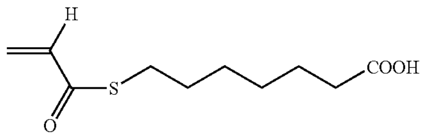

C-16

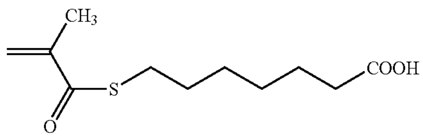

C-17

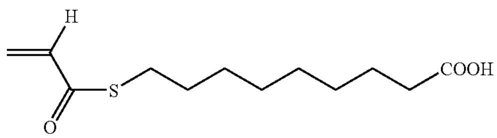

C-18

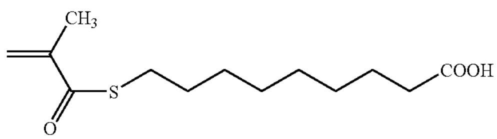

C-19

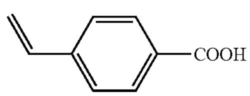

C-20

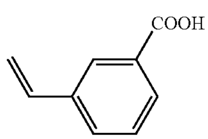

C-21

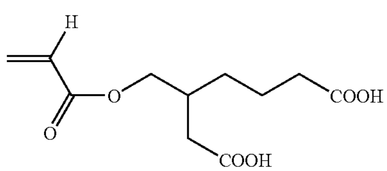

C-22

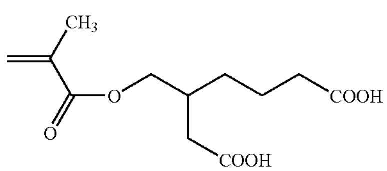

C-23

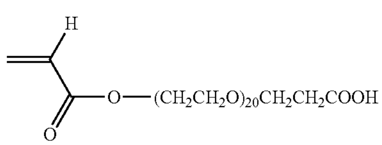

C-24

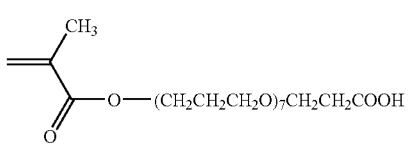

-continued

C-25

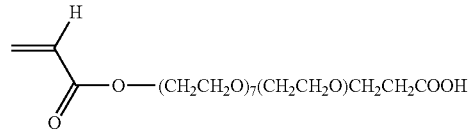

The polymer A may comprise one repeating unit selected from the formula (1a), or plural repeating units selected from the group (1a). The polymer A may further comprise at least one repeating unit other than that selected from the formulae. The other repeating unit is not limited and is desirably selected from units derived from monomers capable of usual radical polymerization. Examples of the monomer which can give the other repeating unit include, however not to be limited to, those shown below. The polymer A may comprise one repeating unit or plural repeating units selected from those shown below.

(Monomer Group I)

(1) Alkenes:

ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoro-propylene, tetrafluoroethylene, vinyl chloride, vinylidene chloride or the like;

(2) Dienes:

1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphtyl-1,3-butadiene, 1-β-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;

(3) α,β-unsaturated carboxylic acid derivatives:

(3a) Alkyl acrylates:

methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethyleneglycol acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;

(3b) Alkyl methacrylates:

methyl methacrylate, ethyl methacrylate, n-propyl methacrylate, isopropyl methacrylate, n-butyl methacrylate, isobutyl methacrylate, sec-butyl methacrylate, tert-butyl methacrylate, amylmethacrylate, n-hexylmethacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, ω-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy) ethyl methacrylate, glycidyl methacrylate, 3-trimetoxysilylpropyl methacrylate, allyl methacrylate, 2-isosyanate ethyl methacrylate or the like;

(3c) Diesters of unsaturated polycarboxylic acids:

dimethyl maleate, dibutyl maleate, dimethyl itaconate, dibutyl itaconate, dibutyl crotonate, dihexyl crotonate, diethyl fumarate, dimethyl fumarate or the like;

(3d) Amides of α,β-unsaturated carboxylic acids:

N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated nitriles:

acrylonitrile, methacrylonitrile or the like;

(5) Styrene or derivatives thereof:

styrene, vinyltoluene, ethylstyrene, p-tert-butylstyrene, p-vinyl methyl benzoate, α-methyl styrene, p-chloromethyl styrene, vinyl naphthalene, p-methoxy styrene, p-hydroxy methyl styrene, p-acetoxy styrene or the like;

(6) Vinyl esters:

vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;

(7) Vinyl ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and (8) Other monomers N-vinyl pyrrolidone, methyl vinyl ketone, phenyl vinyl ketone, methoxy ethyl vinyl ketone, 2-vinyl oxazoline, 2-isoprppenyl oxazoline or the like.

The polymer A may comprise a repeating unit derived from a monomer represented by a formula (3a) described later.

The amount of the monomer containing a fluoro aliphatic group is desirably not less than 5 wt %, more desirably not less than 10 wt %, and much more desirably not less than 30 wt % with respect to the total amount of all monomers constituting the polymer A. The amount of the repeating unit represented by the formula (1a) is desirably not less than 1 wt %, more desirably from 2 to 20 wt %, much more desirably from 2 to 10 wt % and most desirably from 2 to 5 wt % with respect to the total amount of all monomers constituting the polymer A.

The weight-average molecular weight (Mw) of the fluoride-polymer to be used in the first embodiment is desirably from 1,000 to 1,000,000, more desirably from 1,000 to 500,000 and much more desirably from 1,000 to 100,000. The Mw can be measured as a polystyrene (PS) equivalent molecular weight with gel permeation chromatography (GPC).

Examples of the method for producing the polymer A include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoride-polymer. Especially, radical thermal polymerization initiators are preferred. It is noted that a radical thermal polymerization is a compound capable of generating radicals when being heated at a decomposition temperature or a higher temperature than it.

Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 minutes to 30 hours. Inert gas purge is desirably performed before or while carrying out the solution polymerization to avoid deactivation of the generated radicals. Nitrogen gas is usually used as an inert gas.

Radical polymerization with at least one chain transfer agent is useful for producing fluoride-polymers having a proper molecular weight. Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as α-methyl styrene or α-methyl styrene dimer. Among these, $C_{4-16}$ mercaptans are preferred. The amount of the chain transfer agent to be used may be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

The polymer A may have one or more polymerizable groups for fixing liquid crystal molecules in an alignment state.

Examples of the polymer A which can be used desirably in the first embodiment include, however not to be limited to, those shown below. Numerical values ("a", "b", "c", "d" and the like) in formulae shown below mean wt % of each monomer, and Mw in formulae shown below mean PS-equivalent weight-average molecular weight measured by GPC with TSK Gel GMHxL, TSK Gel G4000 HxL and TSK Gel G2000 HxL column (all are provided by TOSOH CORPORATION).

P-1

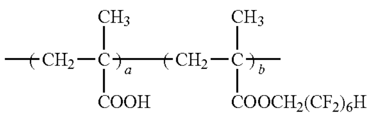

a/b = 20/80
Mw = 23000

P-2

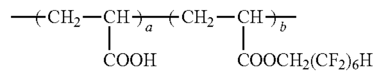

a/b = 15/85
Mw = 23000

P-3

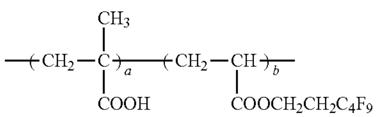

a/b = 20/80
Mw = 38000

P-4

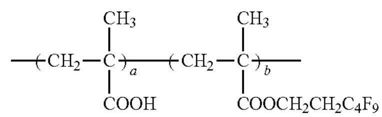

a/b = 15/85
Mw = 51000

P-5

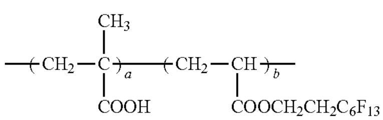

a/b = 10/90
Mw = 22000

P-6

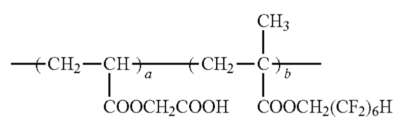

a/b = 10/90
Mw = 35000

P-7

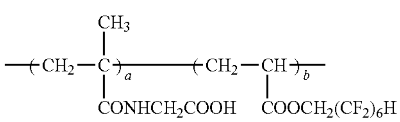

a/b = 20/80
Mw = 42000

P-8

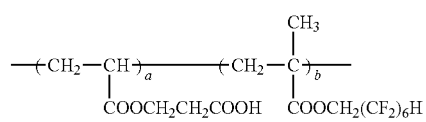

a/b = 15/85
Mw = 22000

P-9

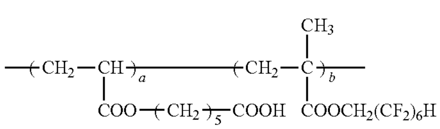

a/b = 20/80
Mw = 33000

P-10

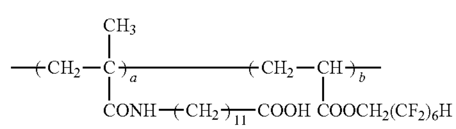

a/b = 10/90
Mw = 26000

P-11

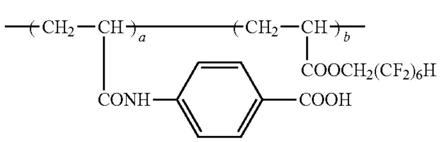

a/b = 20/80
Mw = 29000

P-12

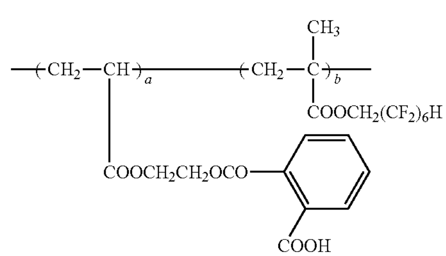

a/b = 15/85
Mw = 51000

-continued
P-13
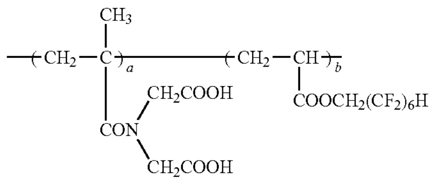
a/b = 5/95
Mw = 21000
P-14
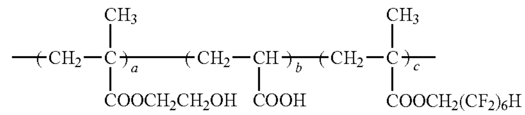
a/b/c = 30/5/65
Mw = 31000
P-15
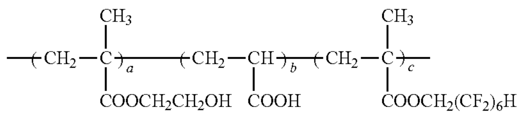
a/b/c = 15/5/80
Mw = 19000
P-16
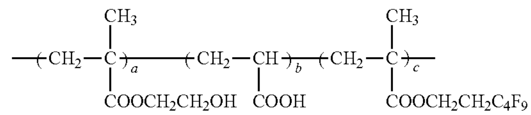
a/b/c = 25/5/70
Mw = 15000
P-17
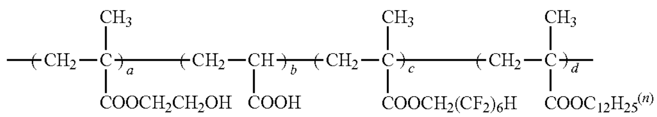
a/b/c/d = 25/5/50/20
Mw = 42000
P-18
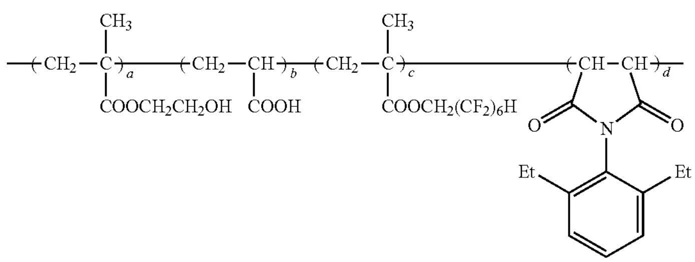
a/b/c/d = 32/6/30/32
Mw = 16000
P-19
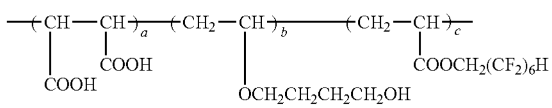
a/b/c = 5/25/70
Mw = 45000
P-20
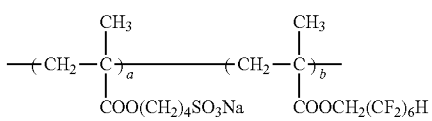
a/b = 35/65
Mw = 24000
P-21
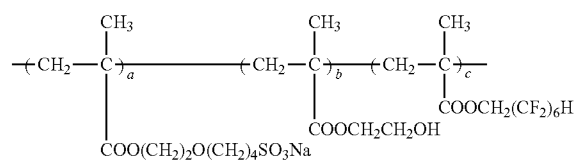
a/b/c = 5/25/70
Mw = 36000
P-22
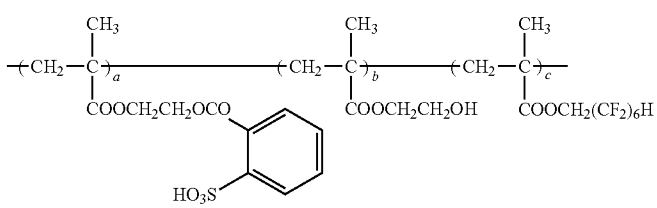
a/b/c = 5/25/70
Mw = 36000

-continued
P-23
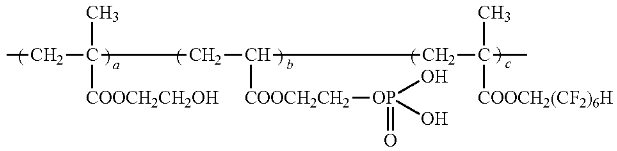
a/b/c = 23/7/70
Mw = 46000
P-24
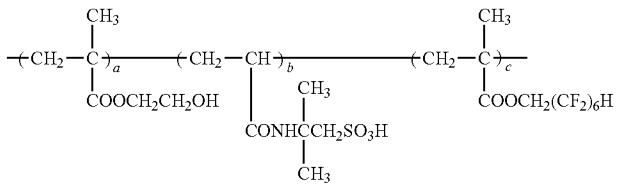
a/b/c = 29/1/70
Mw = 30000
P-25
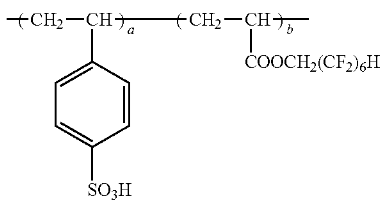
a/b = 10/90
Mw = 33000
P-26
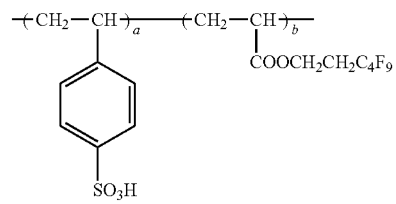
a/b = 35/65
Mw = 25000
P-27
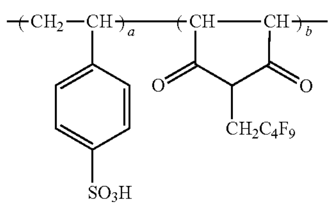
a/b = 50/50
Mw = 26000
P-28
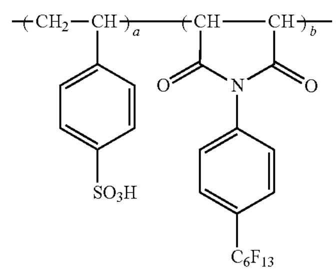
a/b = 50/50
Mw = 30000
P-29
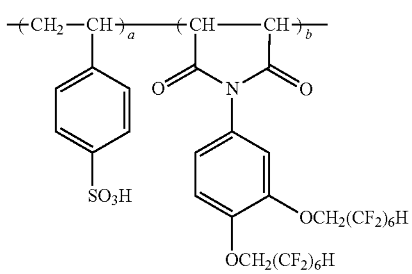
a/b = 50/50
Mw = 21000
P-30
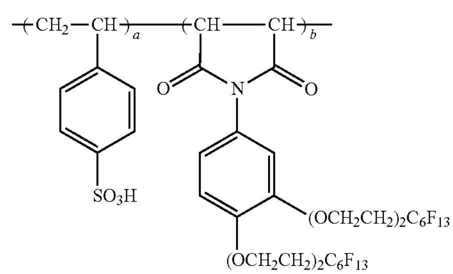
a/b = 50/50
Mw = 18000
P-33
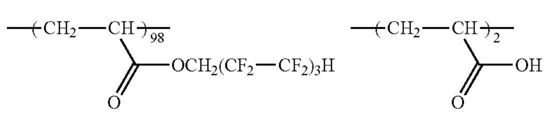
Mw25000
P-34
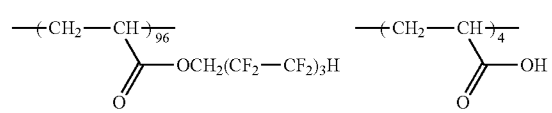
Mw20000

-continued
P-35
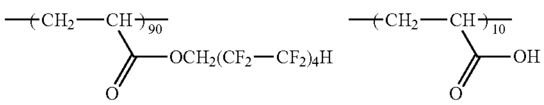
Mw13000
P-36
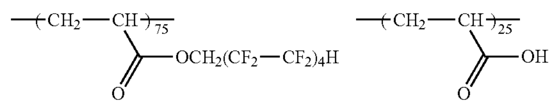
Mw20000
P-37
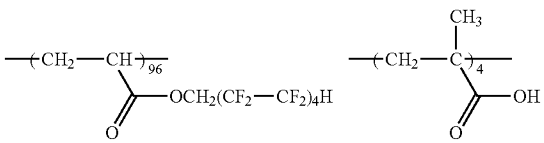
Mw32000
P-38
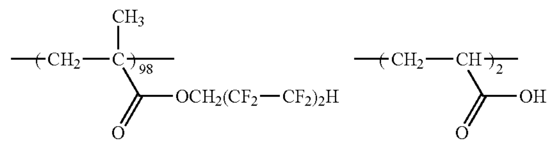
Mw25000
P-39
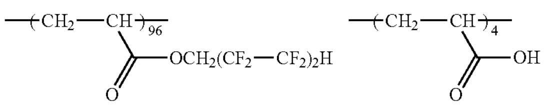
Mw27000
P-40
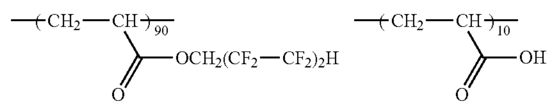
Mw10000
P-41
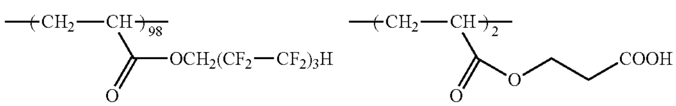
Mw20000
P-42
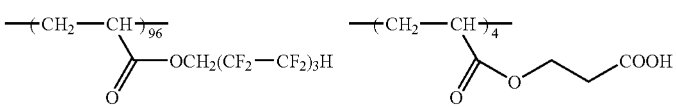
Mw15000
P-43
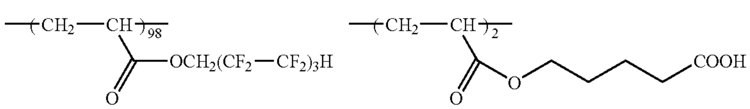
Mw15000
P-44
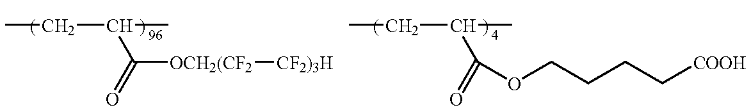
Mw15000
P-45
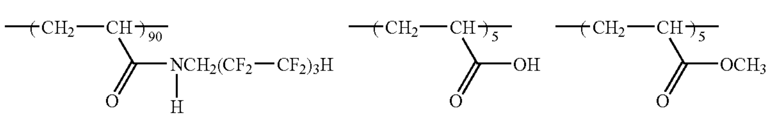
Mw22000
P-46
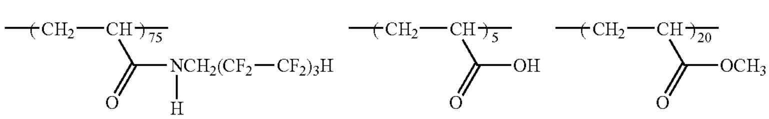
Mw19000
P-47
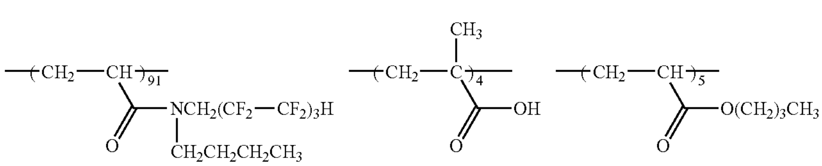
Mw30000

-continued
P-48
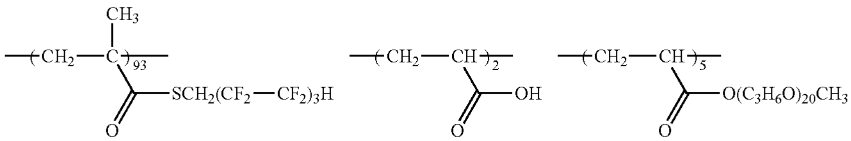
Mw23000
P-49
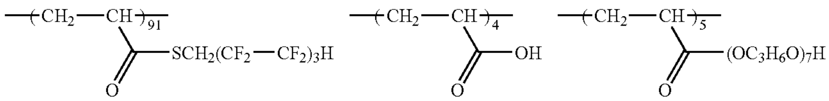
Mw15000
P-50
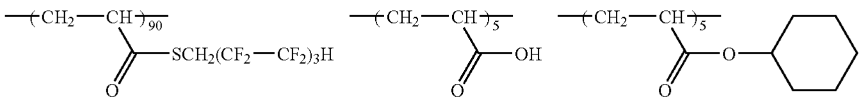
Mw23000
P-51
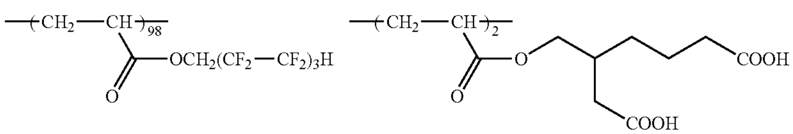
Mw25000
P-52
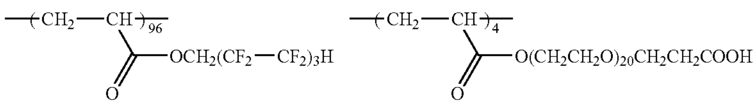
Mw25000
P-53
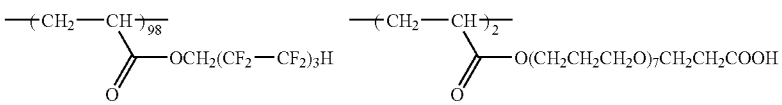
Mw13000
P-54
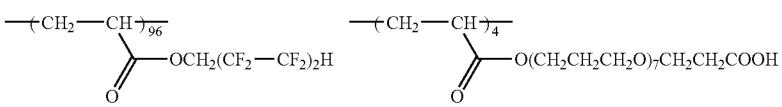
Mw25000
P-55
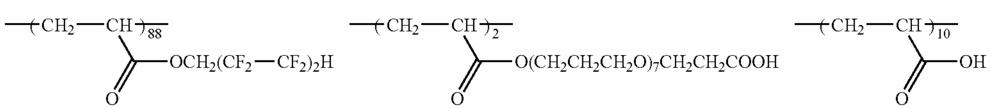
Mw30000
P-56
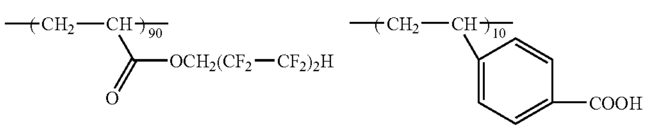
Mw34000
P-57
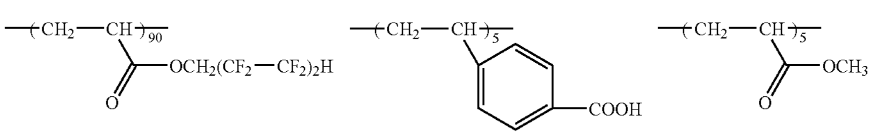
Mw22000

-continued

P-58

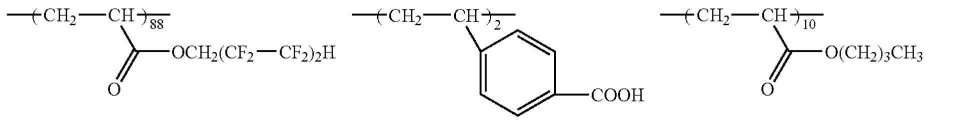

Mw15000

P-59

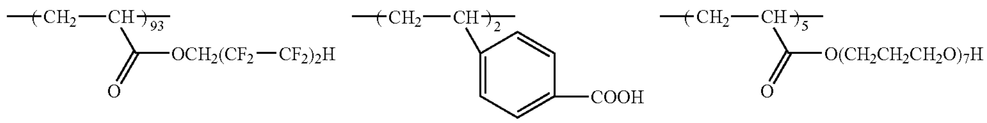

Mw13000

P-60

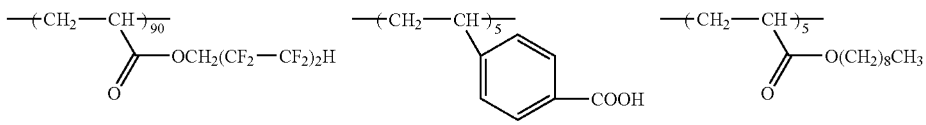

Mw35000

P-61

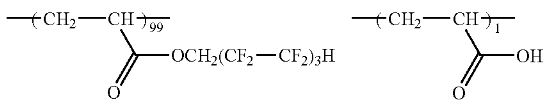

Mw20000

P-62

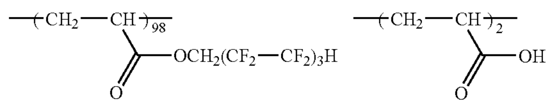

Mw14000

P-63

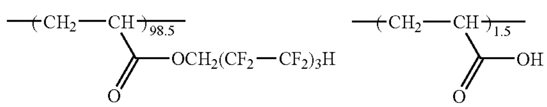

Mw30000

P-64

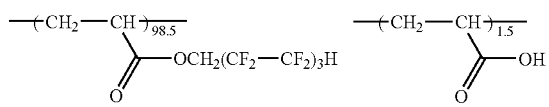

Mw15000

P-65

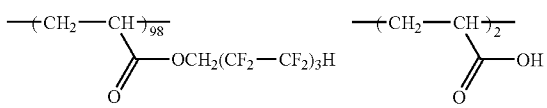

Mw18000

P-66

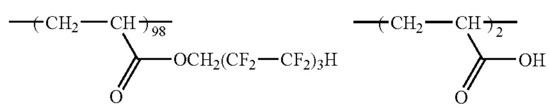

Mw6000

P-67

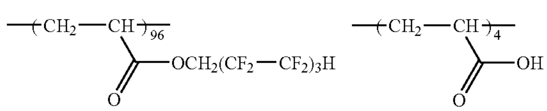

Mw10000

P-68

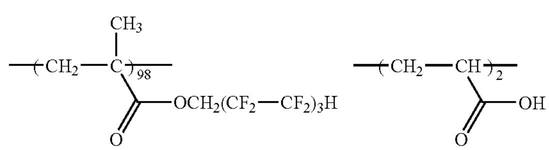

Mw15000

P-69

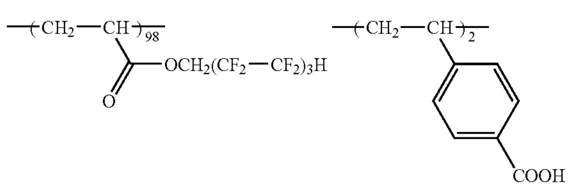

Mw16000

P-70

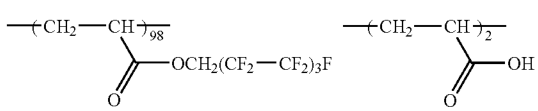

Mw10000

The polymer A which can be employed in the first embodiment may be produced according to any known process as described above. For example, the polymer A may be produced by carrying out polymerization of a monomer having a fluoro-aliphatic group and a monomer having a hydrophilic group in an organic solvent in the presence of a common radical polymerization initiator. Other addition-polymerizable compounds, if necessary, may be further added, and then, the polymerization may be carried out in the same manner. It is useful for obtaining a polymer having a uniform constitution to carry out polymerization while adding dropwise at least one monomer and at least one polymerization initiator from the view point of polymerization activity of each monomer.

The amount of the polymer A is desirably from 0.005 to 8 wt %, more desirably from 0.01 to 5 wt % and much more desirably from 0.05 to 1 wt % with respect to the total weight of a composition (when the composition is a solution, the solvent is excluded) for producing the optically anisotropic layer. When the amount of the polymer A falls within the above scope, substantial effects may be obtained without lowering a drying property of the coating layer, and, thus, an optical film having uniform optical properties such as retardation.

(Polymer B)

The optically anisotropic layer may comprise two or more types of polymer A, and preferably comprise a polymer B, having a fluoro-aliphatic group, with the polymer A. The polymer B is a polymer having a fluoro-aliphatic group, is desirably selected from copolymers comprising a repeating unit derived from a monomer represented by a formula (2a), described above, and a repeating unit derived from a monomer represented by a formula (3a) shown below.

Formula (3a)

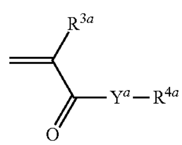

In the formula (3a), $R^{3a}$ is hydrogen or methyl. $Y^a$ represents a linking group. The linking group represented by $Y^a$ is desirably selected from an oxygen atom, a sulfur atom and —N($R^{5a}$)—. $R^{5a}$ represents a hydrogen atom, a $C_{1-4}$ alkyl group such as methyl, ethyl, propyl or butyl. $R^{5a}$ is desirably hydrogen or methyl. $Y^a$ desirably represents an oxygen atom, —NH— or —N($CH_3$)—. $R^{4a}$ represents an optionally substituted poly(alkylene)oxy group or an optionally substituted linear, branched or cyclic $C_{1-20}$ alkyl group.

The poly(alkyleneoxy) group can be represented by $(RO)_x$, where R is an alkylene group and desirably $C_{2-4}$ alkylene group such as —$CH_2CH_2$—, —$CH_2CH_2CH_2$—, —$CH(CH_3)CH_2$— or —$CH(CH_3)CH(CH_3)$—.

The poly(alkyleneoxy) group may have a single type of an alkyleneoxy unit as well as poly(propyleneoxy), may have plural types of alkyleneoxy units (for example a linear propyleneoxy unit, a branched propyleneoxy unit and an ethyleneoxy unit) irregularly-distributed, or may have a unit formed by bonding plural types of alkyleneoxy blocks each other (for example, a unit formed by bonding a linear or branched propyleneoxy block and an ethyleneoxy block each other).

The poly(alkyleneoxy) chain may also comprise a unit formed by bonding plural poly(alkylenoxy) through a single or plural linking groups such as —CONH-Ph-NHCO— where ph is phenylene, or —S—. When the linking group is trivalent or more than trivalent, it is possible to obtain an alkyleneoxy unit having a branched chain structure. The copolymer, which can be used in the first embodiment, may contain a poly(alkylenoxy) group having a molecular weight of 250 to 3000.

Examples of the $C_{1-20}$ alkyl group represented by $R^{4a}$ include linear or branched alkyl groups such as methyl, ethyl, propyl, butyl, pentyl, hexyl, heptyl, octyl, nonyl, decyl, undecyl, dodecyl, tridecyl, tetradecyl, pentadecyl, octadecyl or eicosanyl, single cyclic alkyl groups such as cyclohexyl or cycloheptyl and polycyclic alkyl groups such as bicycloheptyl, bicyclodecyl, tricycloundecyl, tetracyclododecyl, adamantyl, norbornyl or tetracyclodecyl. The poly(alkylenoxy) group or the alkyl group represented by $R^{4a}$ may have a substituent, and examples of the substituent include, however not to be limited to, a hydroxy group, an alkylcarbonyl group, an arylcarbonyl group, an alkylcarbonyloxy group, a carboxyl group, an alkylether group, an arylether group, a halogen atom such as fluorine, chlorine or bromine, a nitro group, a cyano group and an amino group.

The monomer represented by the formula (3a) is desirably selected from alkyl(meth)acrylates or ply(alkyleneoxy) (meth)acrylates.

Examples of the monomer represented by the formula (3a) include, however not to be limited to, those shown below.

A-1

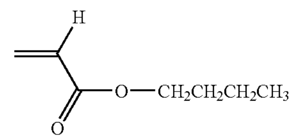

A-2

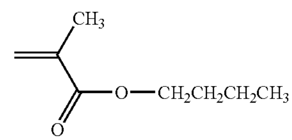

A-3

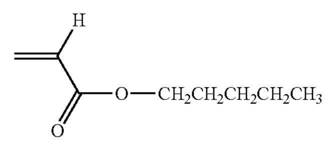

A-4

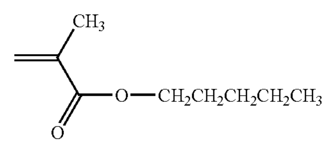

A-5

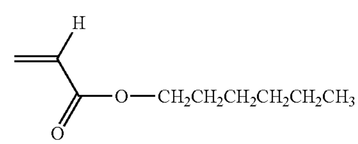

A-6

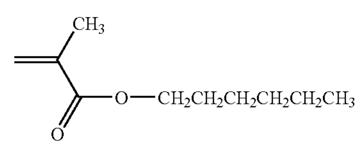

A-7

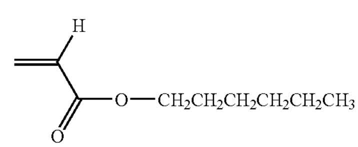

-continued
A-8
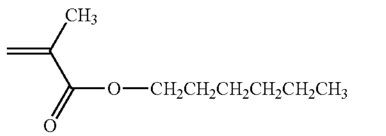
A-9
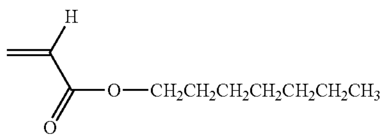
A-10
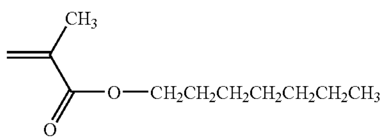
A-11
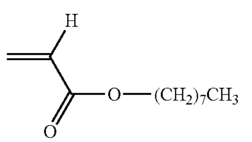
A-12
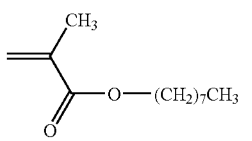
A-13
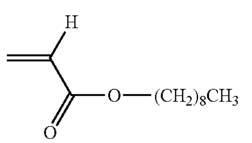
A-14
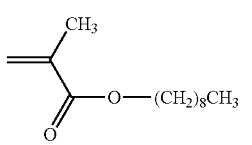
A-15
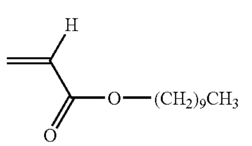
A-16
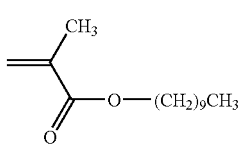
A-17
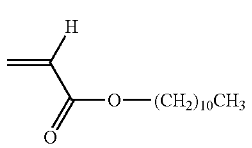
A-18
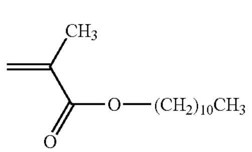
-continued
A-19
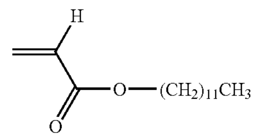
A-20
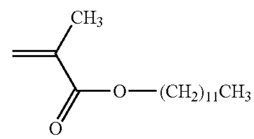
A-21
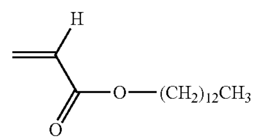
A-22
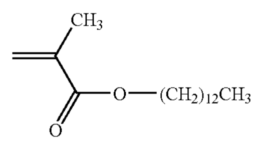
A-23
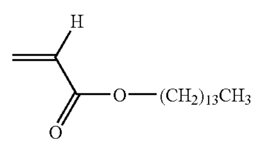
A-24
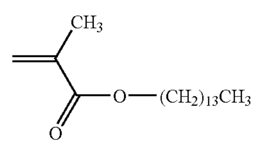
A-25
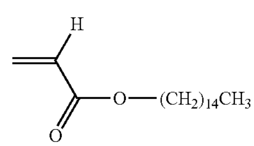
A-26
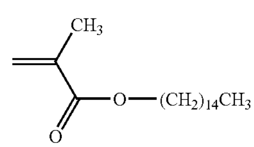
A-27
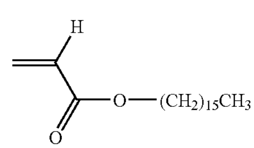
A-28
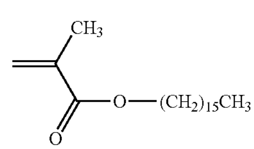
A-29
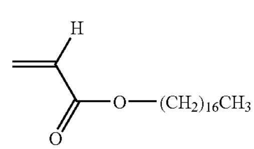

-continued
A-30
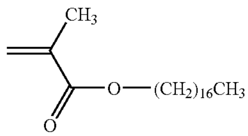
A-31
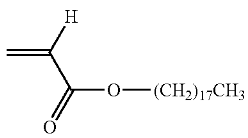
A-32
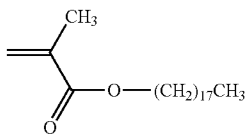
A-33
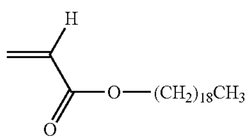
A-34
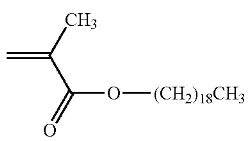
A-35
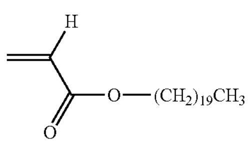
A-36
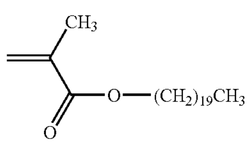
A-37
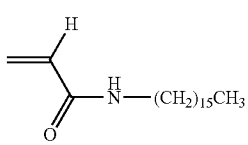
A-38
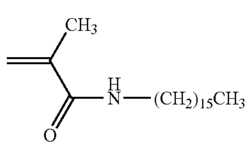
A-39
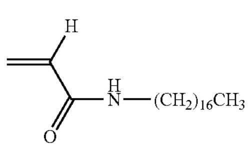
A-40
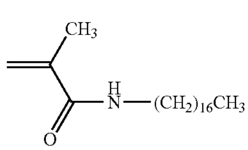
-continued
A-41
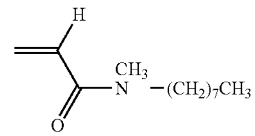
A-42
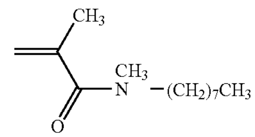
A-43
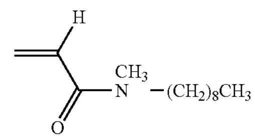
A-44
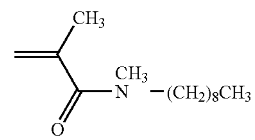
A-45
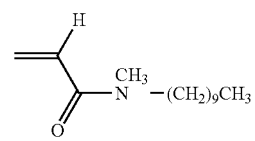
A-46
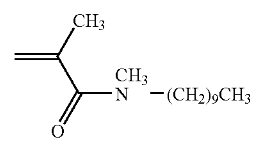
A-47
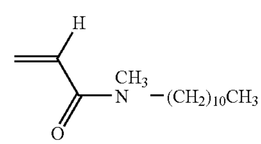
A-48
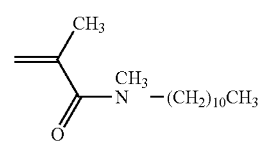
A-49
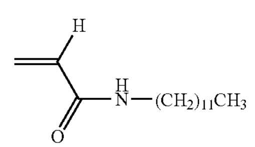
A-50
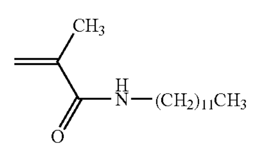
A-51
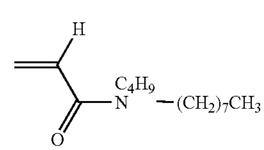

-continued
A-52
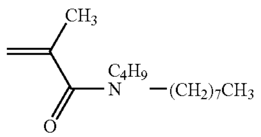
A-53
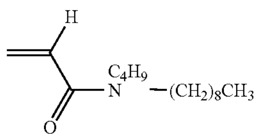
A-54
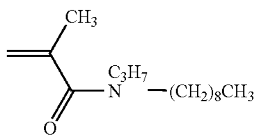
A-55
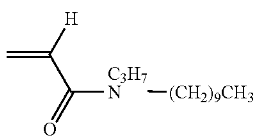
A-56
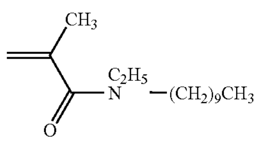
A-57
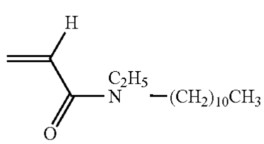
A-58
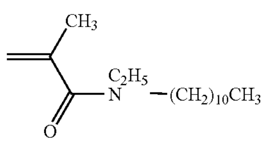
A-59
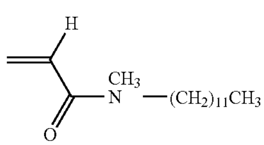
A-60
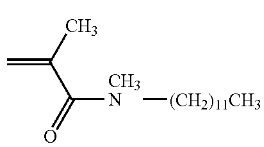
A-61
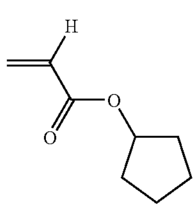
-continued
A-62
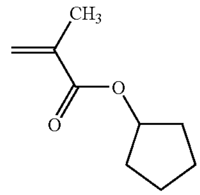
A-63
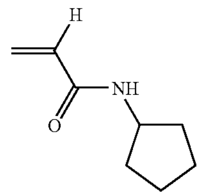
A-64
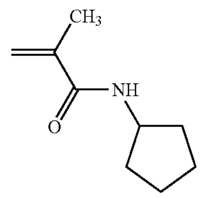
A-65
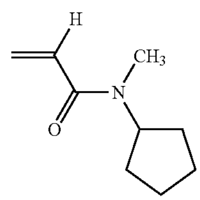
A-66
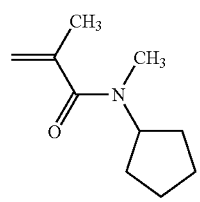
A-67
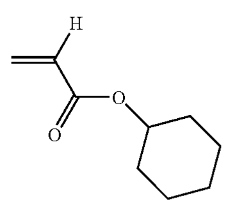
A-68
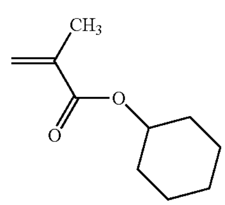
A-69
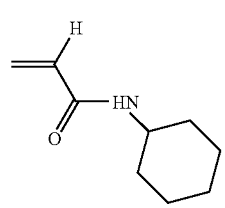

-continued
A-70
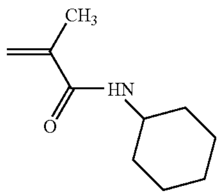
A-71
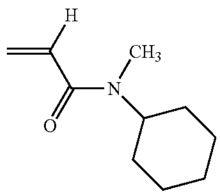
A-72
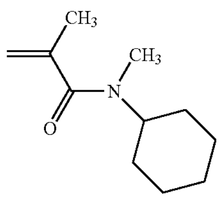
A-73
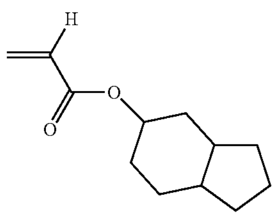
A-74
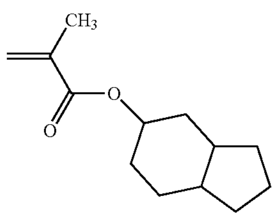
A-75
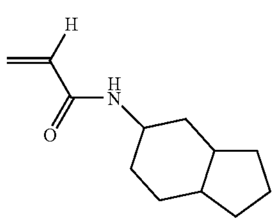
A-76
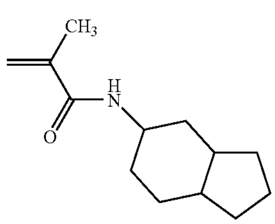
-continued
A-77
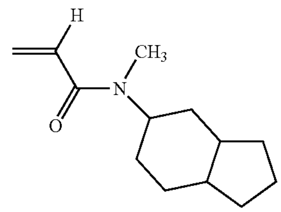
A-78
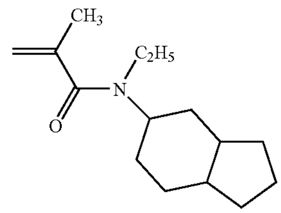
A-79
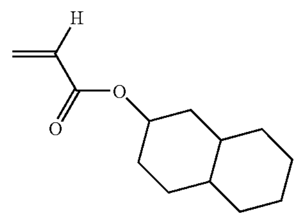
A-80
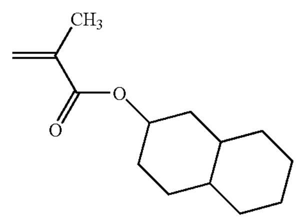
A-81
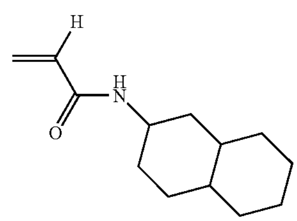
A-82
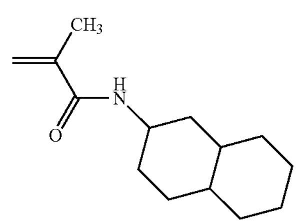
A-83
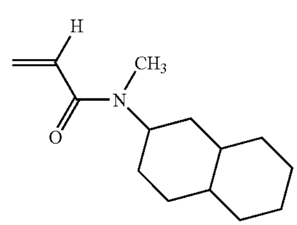

-continued
A-84
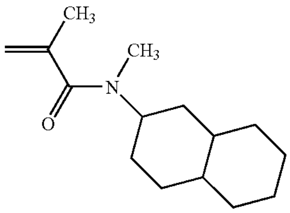
A-85
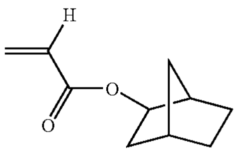
A-86
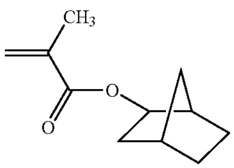
A-87
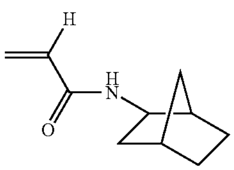
A-88
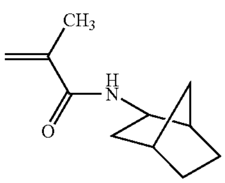
A-89
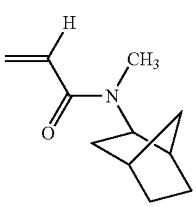
A-90
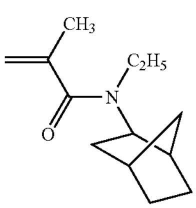
A-91
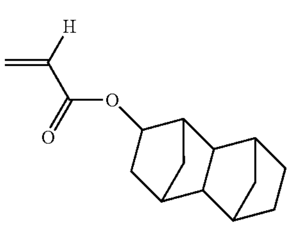
-continued
A-92
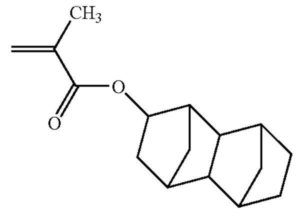
A-93
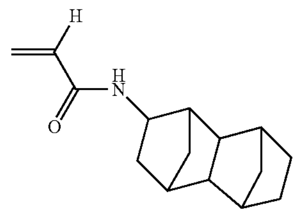
A-94
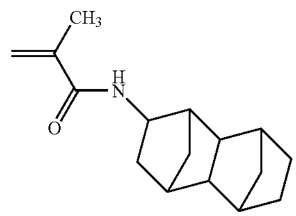
A-95
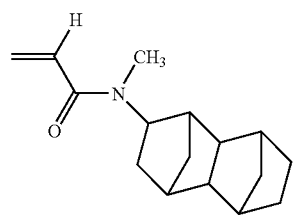
A-96
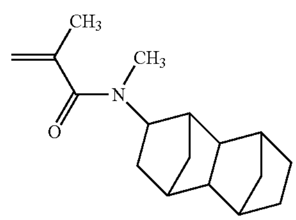
A-97
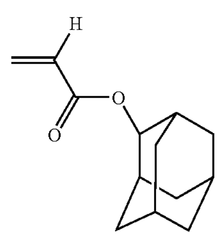
A-98
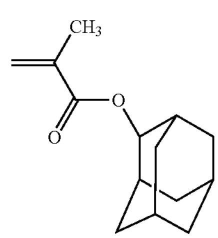

-continued
A-99
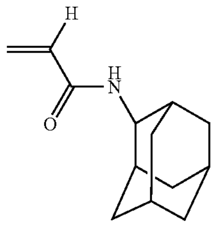
A-100
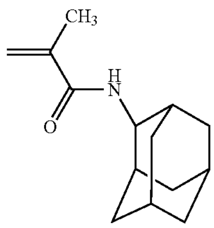
A-101
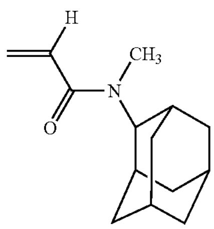
A-102
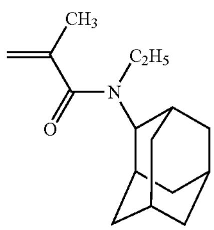
A-103
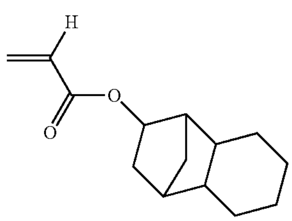
A-104
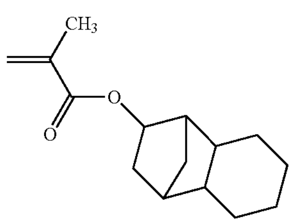
A-105
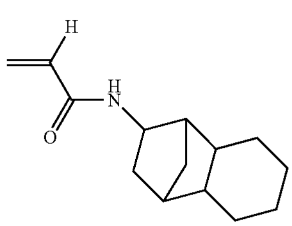
-continued
A-106
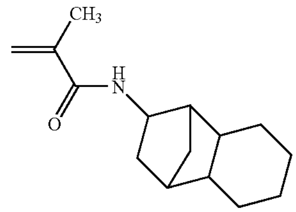
A-107
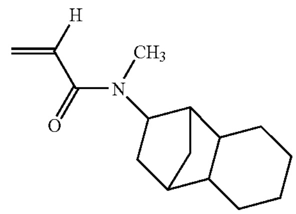
A-108
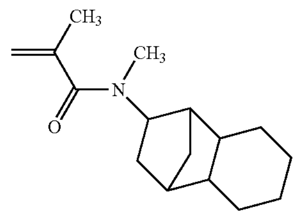
A-109
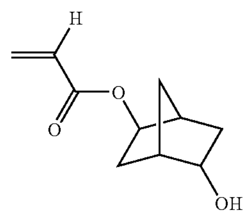
A-110
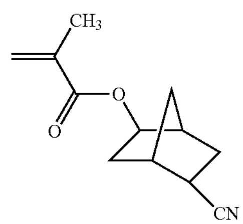
A-111
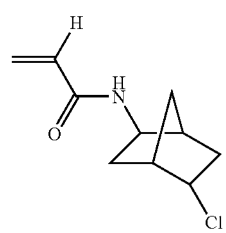
A-112
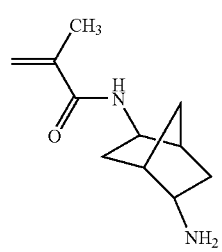

-continued
A-113
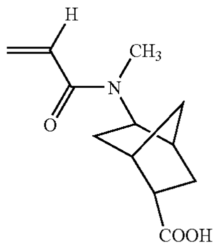
A-114
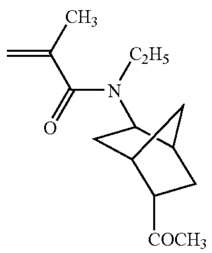
A-115
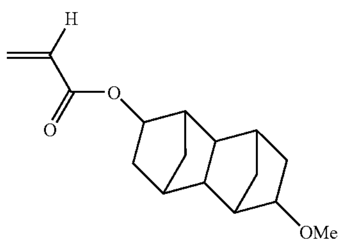
A-116
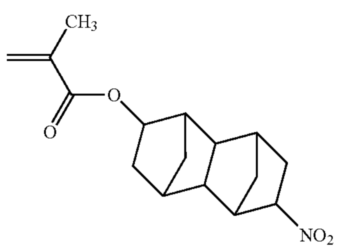
A-117
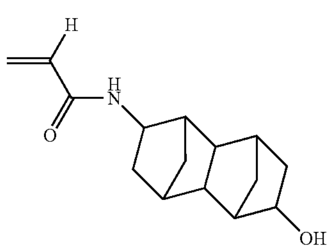
A-118
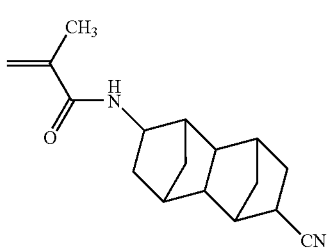
-continued
A-119
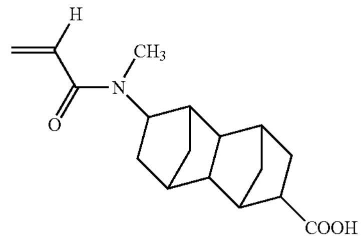
A-120
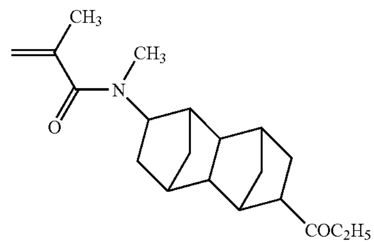
A-121
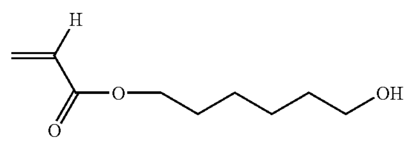
A-122
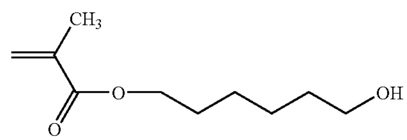
A-123
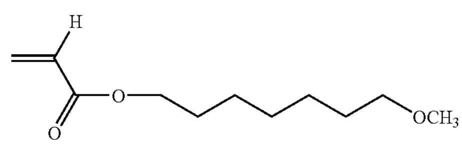
A-124
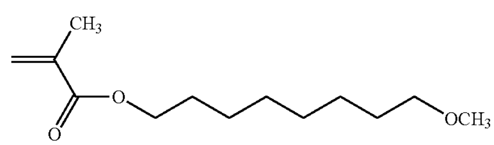
A-125
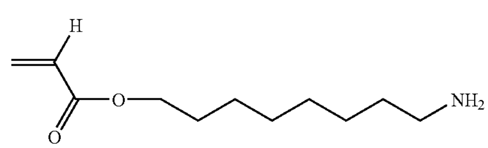
A-126
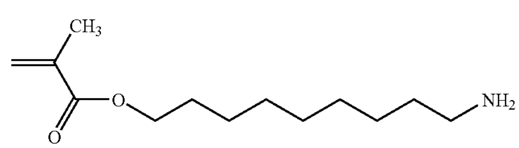
A-127
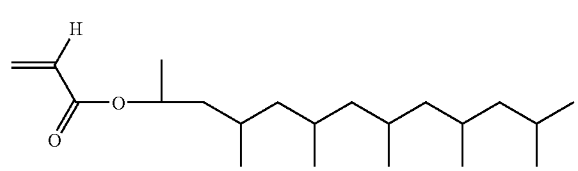

-continued
A-128
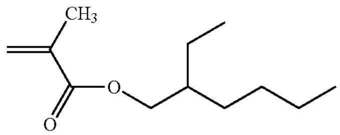
A-129
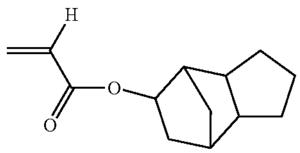
A-130
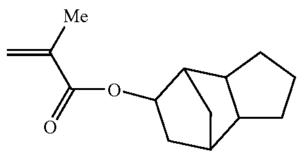
A-131
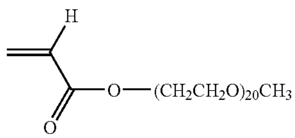
A-132
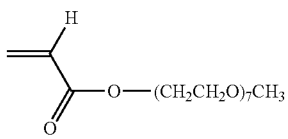
A-133
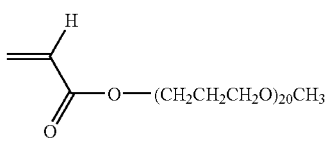
A-134
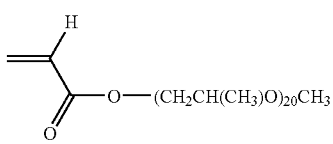
A-135
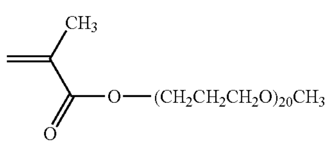
A-136
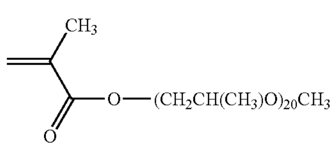
A-137
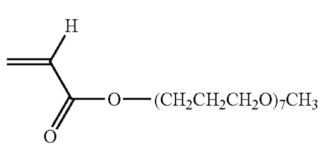
A-138
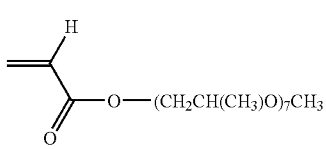
-continued
A-139
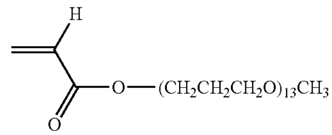
A-140
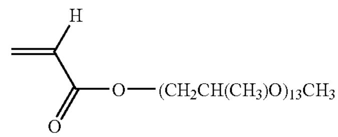
A-141
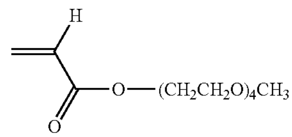
A-142
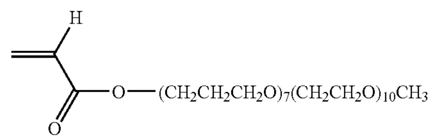
A-143
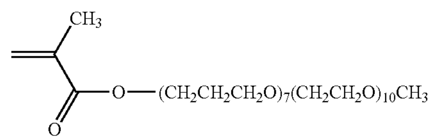
A-144
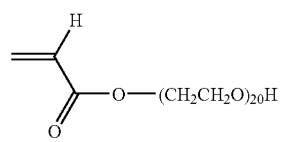
A-145
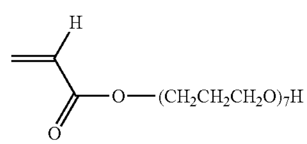
A-146
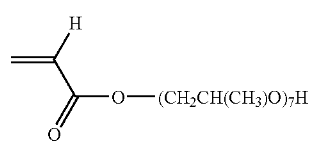
A-147
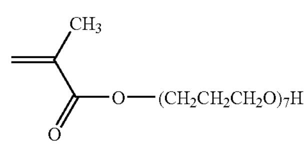
A-148
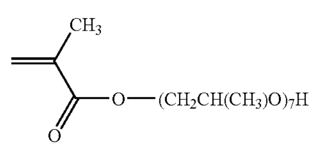
A-149
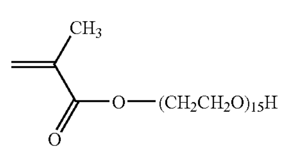

-continued

A-150

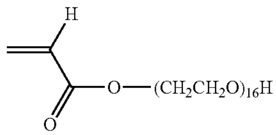

It is noted that poly (alkylenoxy) acrylates or methacrylates may be produced by carrying out a reaction of commercially available hydroxy poly(alkylenoxy) material such as "Pluronic" (manufactured by ASAHI DENKA CO., LTD.), "ADEKA POLYETHER" (manufactured by ASAHI DENKA Co., Ltd.), "Carbowax" (manufactured by Glyco Products "Toriton" (manufactured by Rohm and Haas) or "P.E.G" (manufactured by DAI-ICHI KOGYO SEIYAKU CO., LTD.) with acrylic acid, methacrylic acid, acryl chloride, methacryl chloride, acrylic acid anhydride or the like according to any know method. Poly(oxyalkylene)diacrylates produced by any known method may be also used.

The polymer B may be selected from homopolymers of monomers represented by the formula (2a) and copolymers comprising a repeating unit derived from a monomer represented by the formula (2a) and a repeating unit derived from polyalkyleneoxy(meth)acrylate, preferably polyethyleneoxy (meth)acrylate or polypropyleneoxy(meth)arylate.

The polymer B used in the first embodiment may comprise a repeating unit other than the repeating units derived from the monomers represented by the formulae (2a) and (3a). The polymerization degree of the other monomer is desirably not greater than 20 mole % and more desirably not greater than 10 mole % with respect to the total moles of all monomers. Such polymers may be selected from those described in Chapter 2, Pages 1~483, "Polymer Handbook" 2nd ed., written by J. Brandrup, published by Wiley Interscience (1975). Examples of the other monomer, capable of polymerizing monomers represented by the formulae (2a) and (3a), include compounds having an unsaturated bonding capable of addition polymerization such as acrylic acid, methacrylic acid, acrylates, methacrylates, acrylamides, methacrylaamides, allyl compound, vinyl ethers and vinyl esters.

Specific examples of the other monomer include acrylates such as furfuryl acrylate and tetrahydro furfuryl acrylate; methacrylates such as furfuryl methacrylate and tetrahydrofurfuryl methacrylate; allyl compounds such as allyl esters (allyl acetate, allyl caproate, allyl caprylate, allyl laurate, allyl palmitate, allyl stearate, allyl zenzoate, allyl acetoacetate, allyl lactate or the like) and allyloxyethanol; vinyl ethers such as alkyl vinyl ethers (hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2, 2-dimethylpropyl vinyl ether, 2-ethylbutyl vinyl ether, hydroxyethyl vinyl ether, diethyleneglycol vinyl ether, dimethylaminoethyl vinyl ether, diethylaminoethyl vinyl ether, butylaminoethyl vinyl ether, benzyl vinyl ether, tetrahydrofurfuryl vinyl ether or the like); vinyl esters such as vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinylbutoxy acetate, vinyl lactate, vinyl-β-phenyl butylate and vinyl cyclohexyl carboxylate; dialkyl itaconates such as dimethyl itaconate, diethyl itaconate and dibutyl itaconate; dialkyl or monoalkyl fumarates such as dibutyl fumarate; crotonic acid, icaconic acid, acrylonitrile, methacrylonitrile, maleilonitrile and styrene.

The amount of the monomer containing a fluoro aliphatic group, represented by the formula (2a) is desirably not less than 5 wt %, more desirably not less than 10 wt %, and much more desirably not less than 30 wt % with respect to the total amount of all monomers constituting the polymer B. The amount of the repeating unit represented by the formula (3a) is desirably not less than 10 wt %, more desirably from 10 to 70 wt %, and much more desirably from 10 to 60 wt % with respect to the total amount of all monomers constituting the polymer B.

The weight-average molecular weight (Mw) of the polymer B to be used in the first embodiment is desirably from 3000 to 100,000 and more desirably from 6,000 to 80,000. The Mw can be measured as a polystyrene (PS) equivalent molecular weight with gel permeation chromatography (GPC).

The amount of the polymer B is desirably from 0.005 to 8 wt %, more desirably from 0.01 to 1 wt % and much more desirably from 0.05 to 0.5 wt % with respect to the total weight of the composition (when the composition is a solution, the solvent is excluded) for producing the optically anisotropic layer. When the amount of the polymer B falls within the above scope, substantial effects may be obtained without lowering a drying property of the coating layer, and, thus, an optical film having uniform optical properties such as retardation.

The polymer B which can be employed in the first embodiment may be produced according to any known process as described above. For example, the polymer B may be produced by carrying out polymerization of a monomer having a fluoro-aliphatic group and a monomer having a polyalkyleneoxy group in an organic solvent in the presence of a common radical polymerization initiator. Other addition-polymerizable compounds, if necessary, may be further added, and then, the polymerization may be carried out in the same manner. It is useful for obtaining a polymer having a uniform constitution to carry out polymerization while adding dropwise at least one monomer and at least one polymerization initiator from the view point of polymerization activity of each monomer.

Examples of the polymer B which can be used in the first embodiment include, however not to be limited to, those shown below. Numerical values ("a", "b", "c", "d" and the like) in formulae shown below mean wt % of each monomer, and Mw in formulae shown below mean PS-equivalent weight-average molecular weight measured by GPC with TSK Gel GMHxL, TSK Gel G4000 HxL and TSK Gel G2000 HxL column (all are provided by TOSOH CORPORATION).

X-1

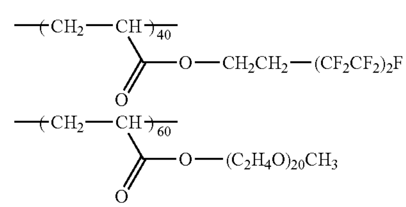

Mw15,000

X-2

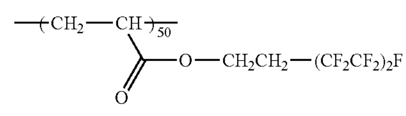

-continued
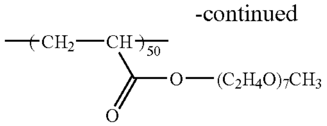
Mw15,000
X-3
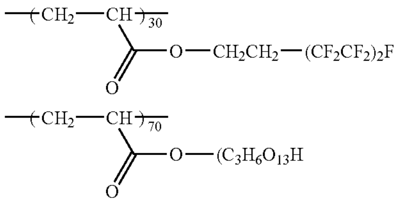
Mw8,000
X-4
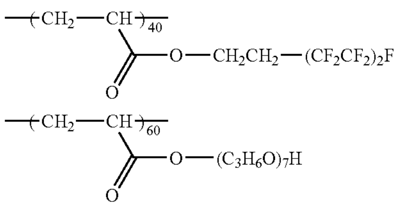
Mw39,000
X-5
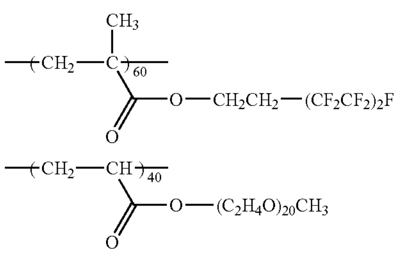
Mw20,000
X-6
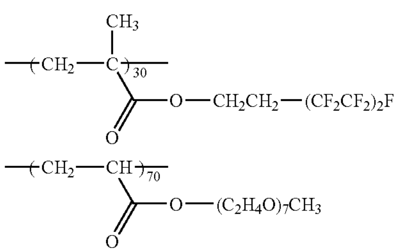
Mw6,000
X-7
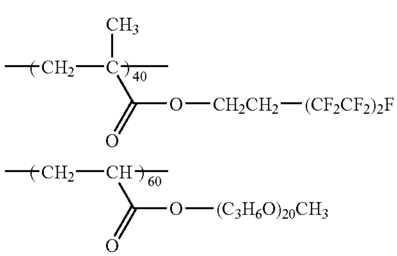
Mw50,000
X-8
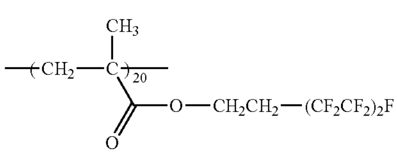
-continued
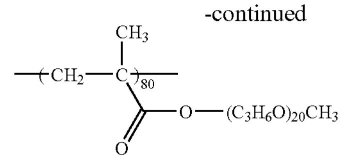
Mw10,000
X-9
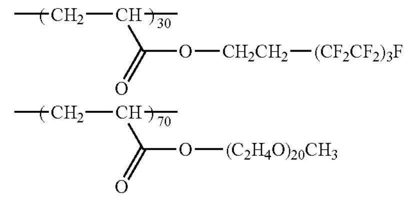
Mw15,000
X-10
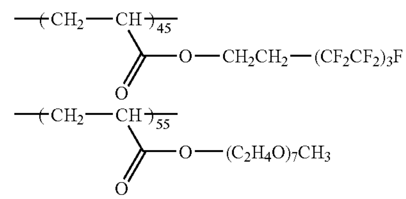
Mw15,000
X-11
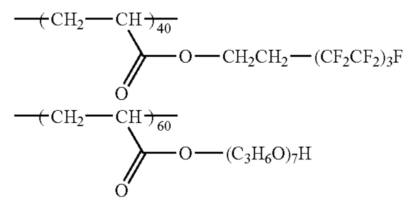
Mw23,000
X-12
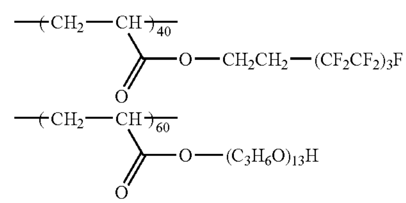
Mw24,000
X-13
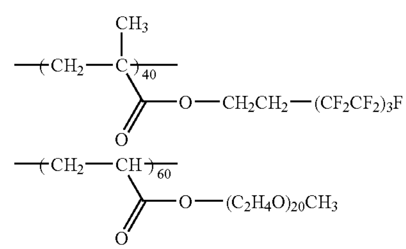
Mw15,000
X-14
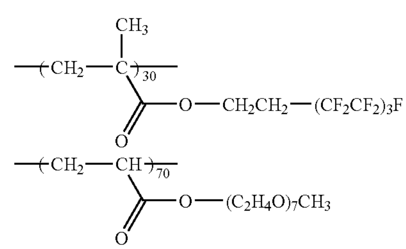
Mw8,000

-continued
X-15
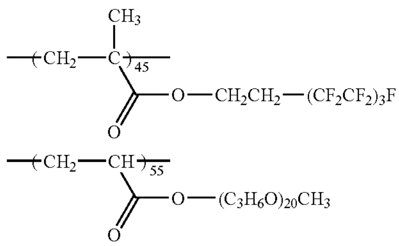
Mw40,000
X-16
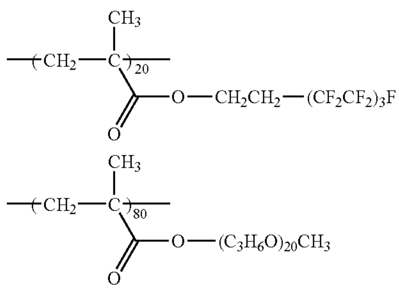
Mw10,000
X-17
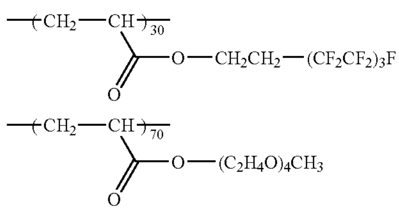
Mw15,000
X-18
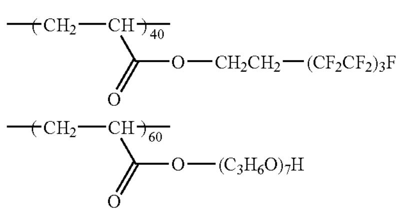
Mw15,000
X-19
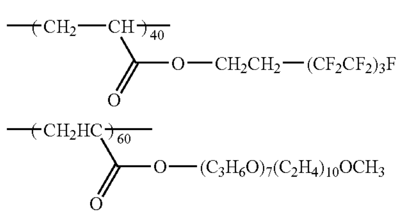
Mw20,000
X-20
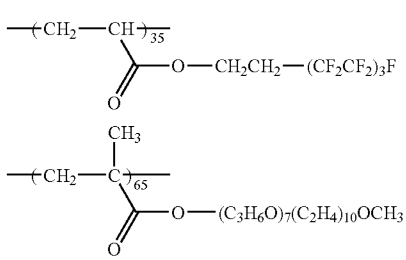
Mw25,000
-continued
X-21
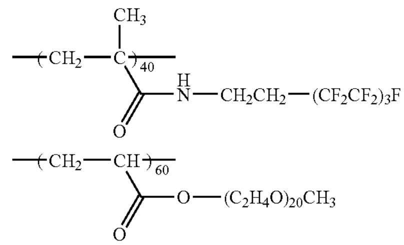
Mw15,000
X-22
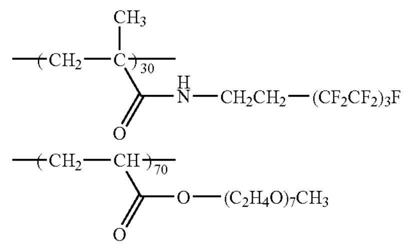
Mw8,000
X-23
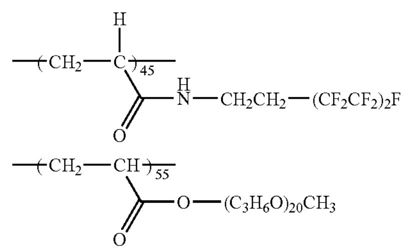
Mw40,000
X-24
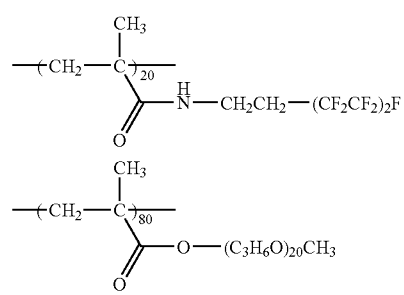
Mw10,000
X-25
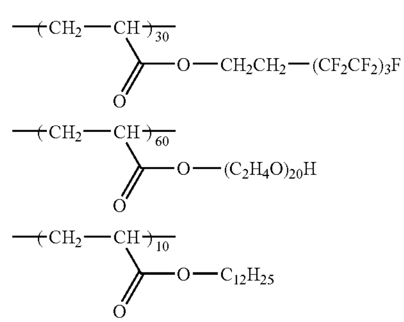
Mw15,000
X-26
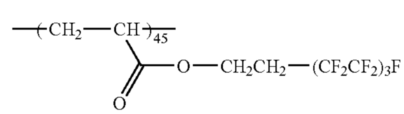

-continued
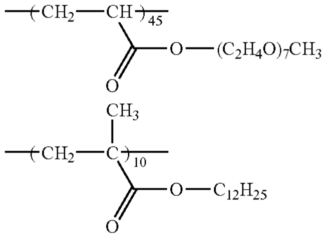
Mw15,000
X-27
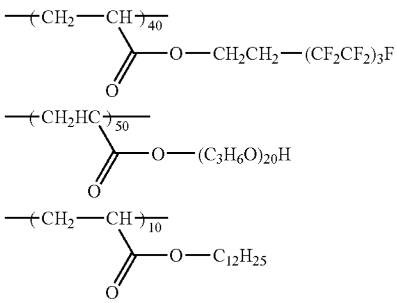
Mw9,000
X-28
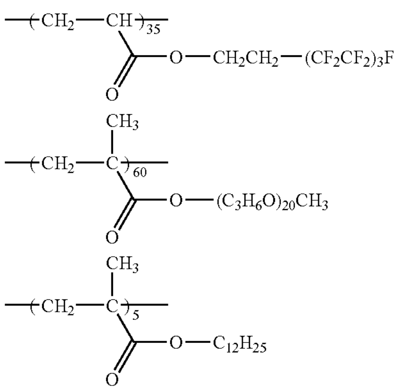
Mw10,000
X-29
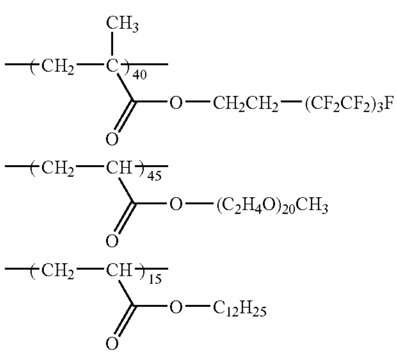
Mw15,000
X-30
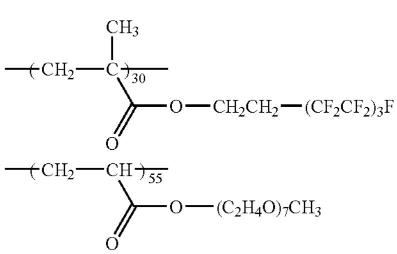
-continued
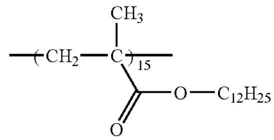
Mw9,000
X-31
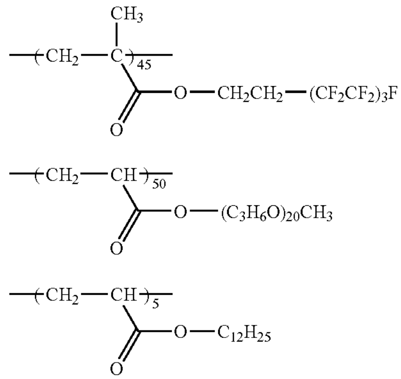
Mw30,000
X-32
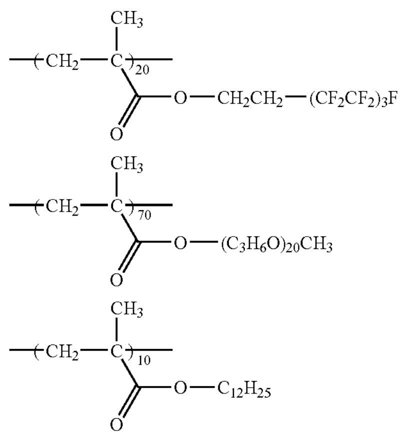
Mw15,000
X-33
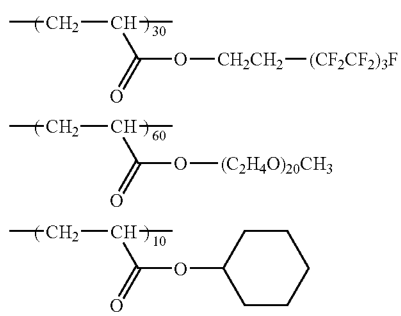
Mw15,000
X-34
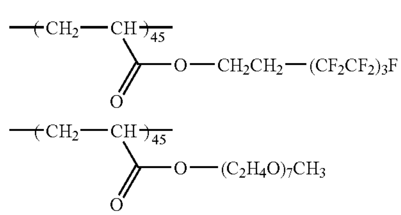

-continued
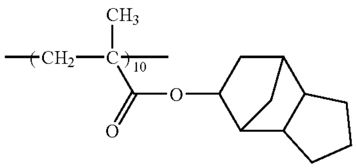
Mw15,000
X-35
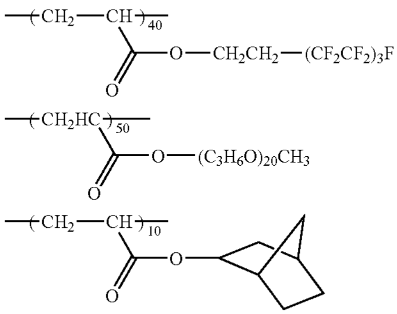
Mw25,000
X-36
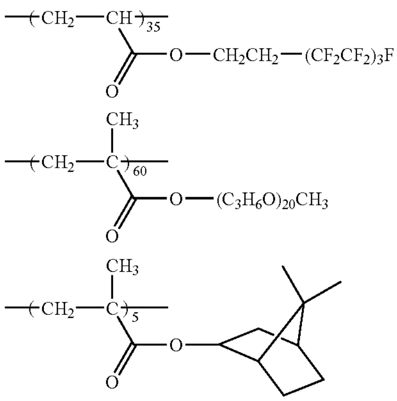
Mw15,000
X-37
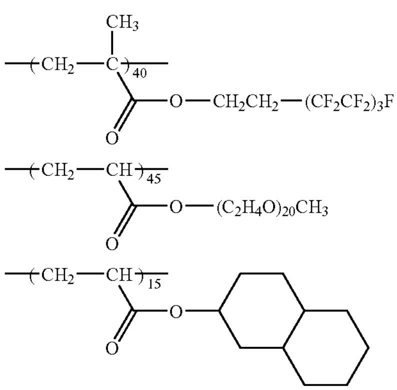
Mw42,000
X-38
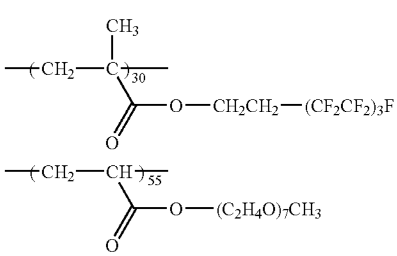
-continued
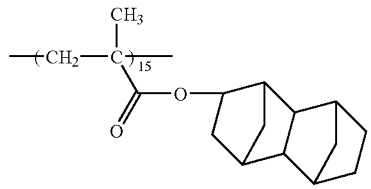
Mw58,000
X-39
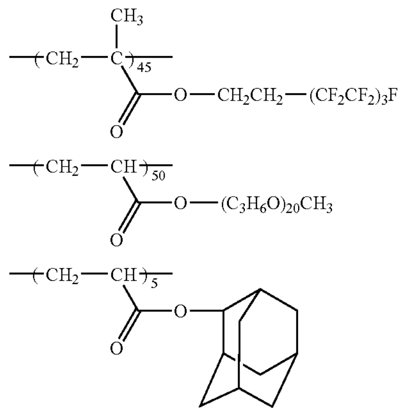
Mw18,000
X-40
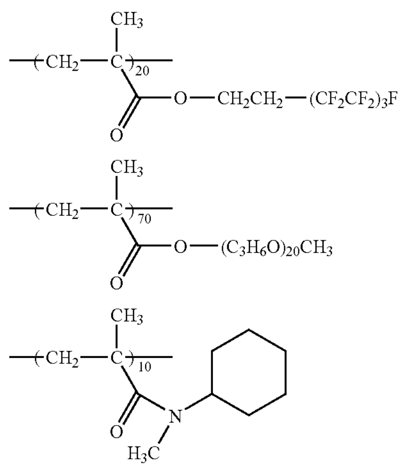
Mw5,000
X-41
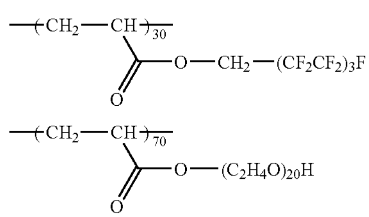
Mw15,000
X-42
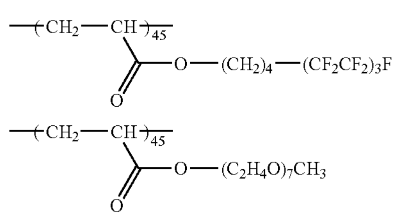

-continued
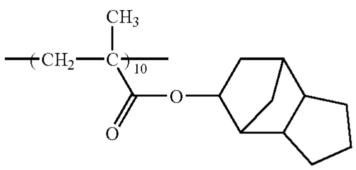
Mw15,000
X-43
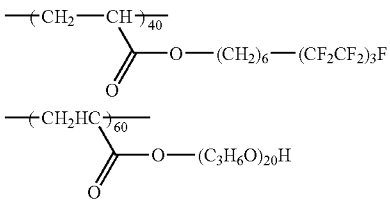
Mw29,000
X-44
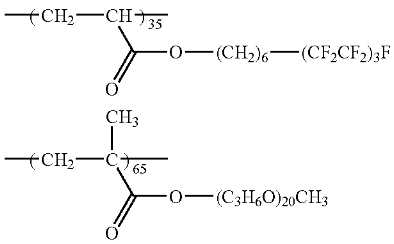
Mw5,000
X-45
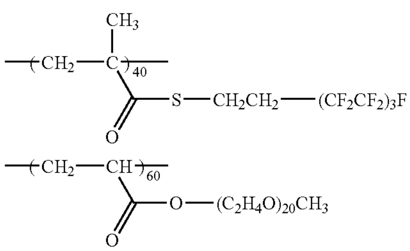
Mw32,000
X-46
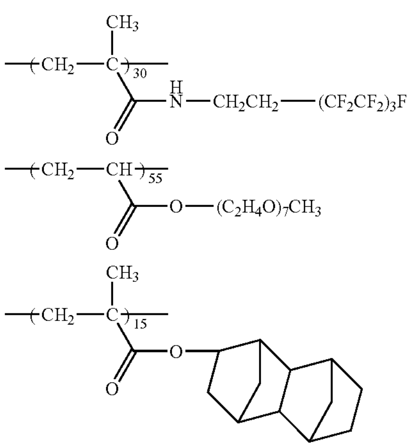
Mw48,000
X-47
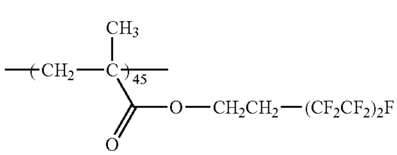
-continued
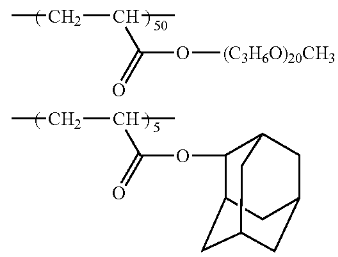
Mw25,000
X-48
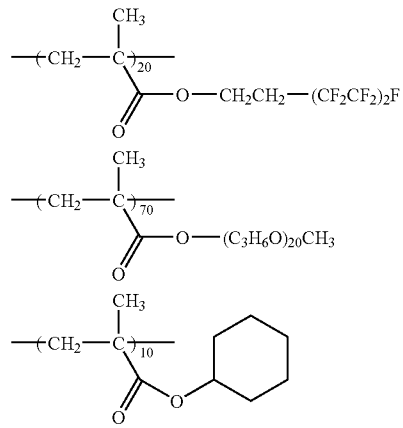
Mw7,000
X-49
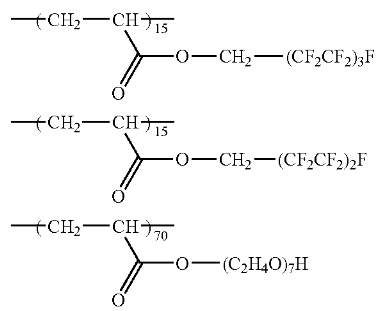
Mw15,000
X-50
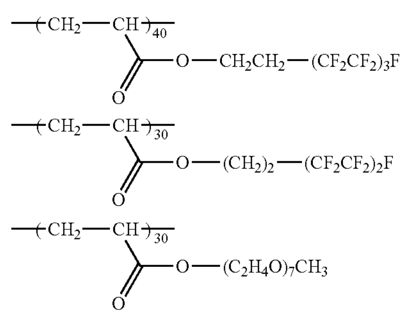
Mw15,000
X-51
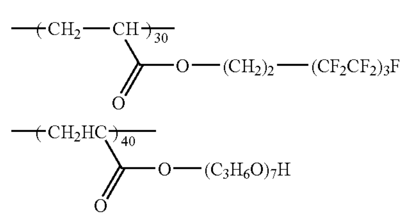

-continued
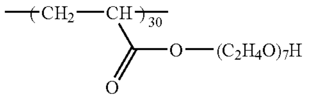
Mw32,000
X-52
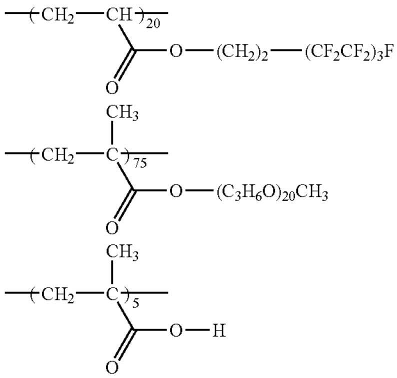
Mw8,000
X-53
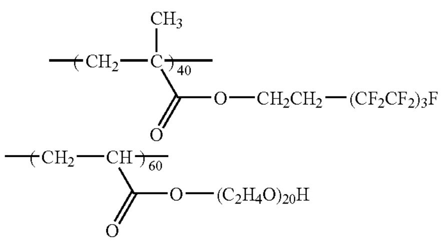
Mw22,000
X-54
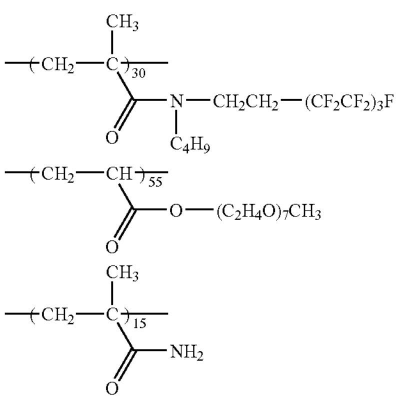
Mw42,000
X-55
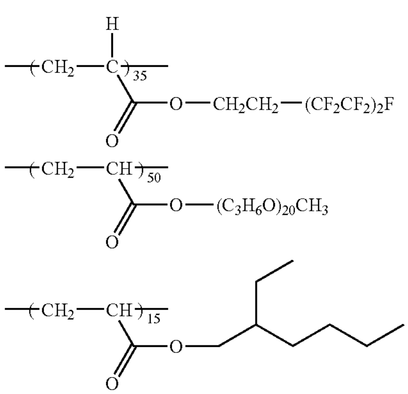
Mw24,000
-continued
X-56
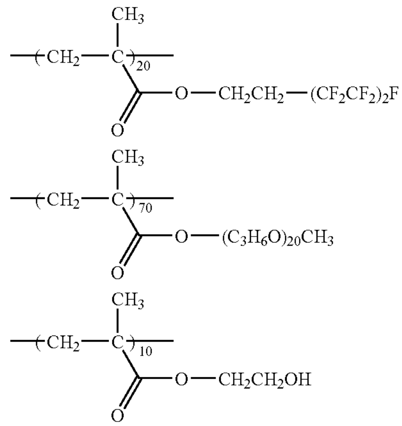
Mw17,000
X-57
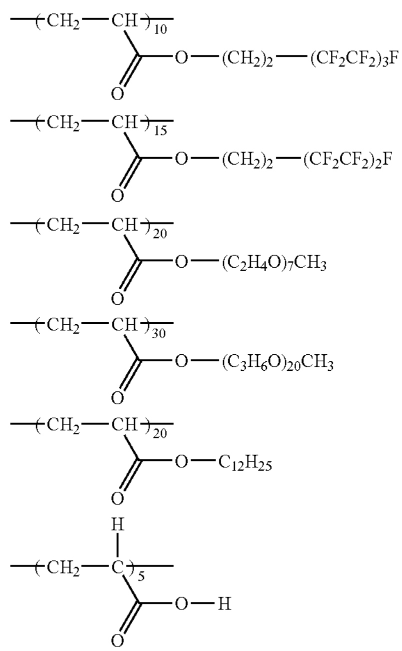
Mw15,000
X-58
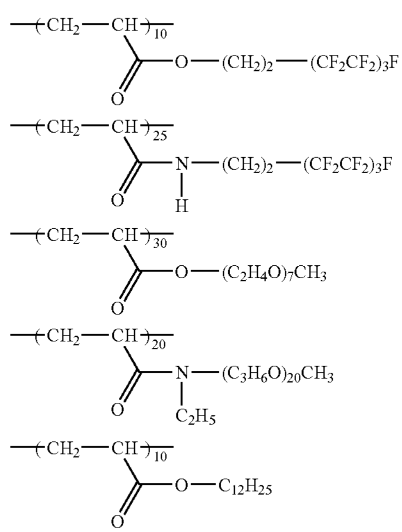

-continued
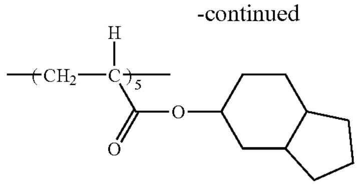
Mw18,000
X-59
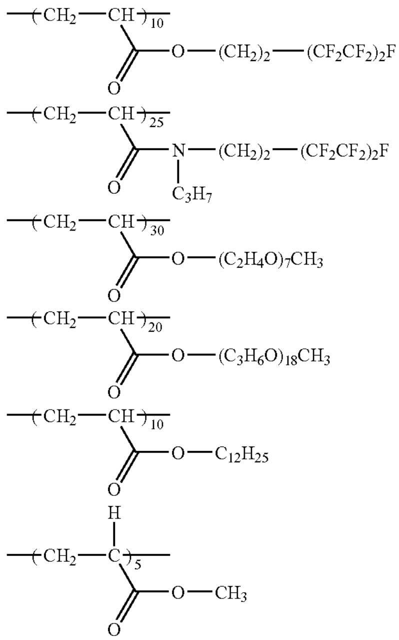
Mw31,000
X-60
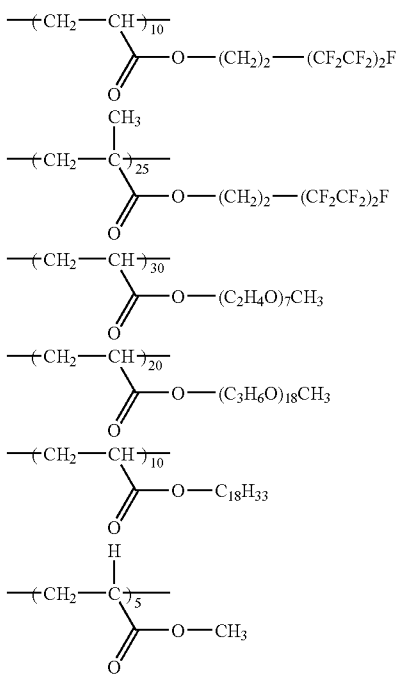
Mw12,000
X-61
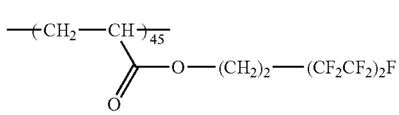
-continued
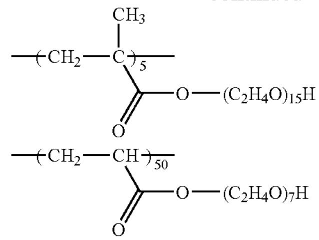
Mw45,000
X-62
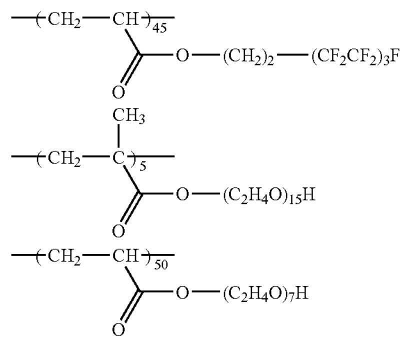
Mw30,000
X-63
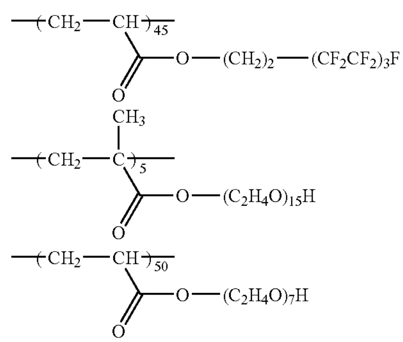
Mw35,000
X-64
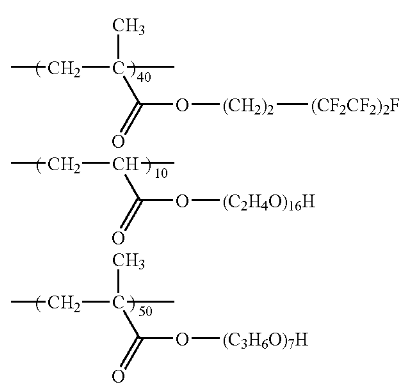
Mw15,000
X-65
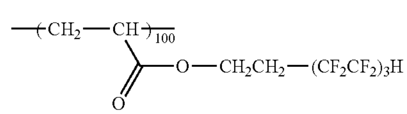
Mw19,000
X-66
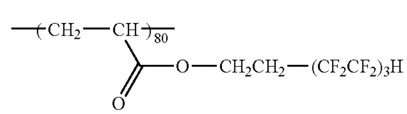

-continued

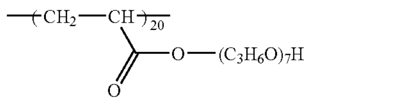

Mw45,000

X-67

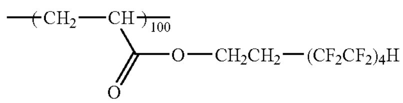

Mw18,000

X-68

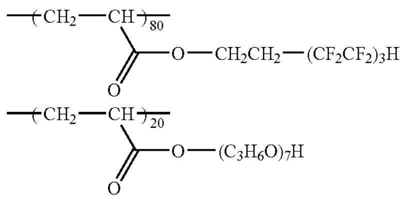

Mw48,000

X-69

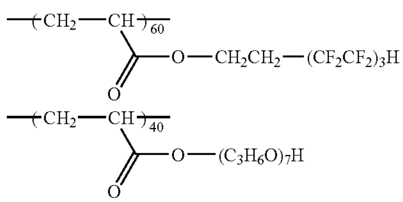

Mw48,000

X-70

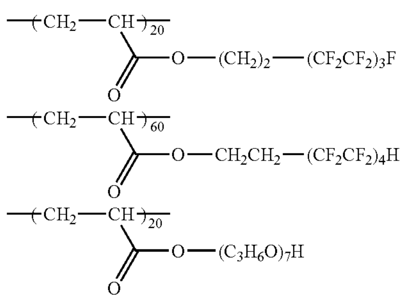

Mw15,000

X-71

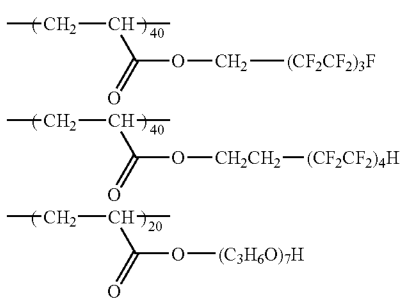

Mw18,000

X-72

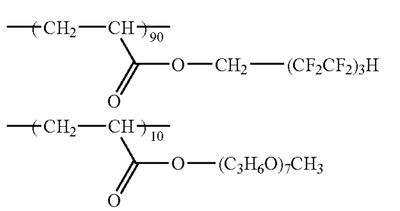

Mw25,000

The optically anisotropic layer may further comprise at least one type of Polymer C or Polymer D, which is used in the second embodiment described below.

Second Embodiment

The second embodiment of the present invention related to an optical compensatory sheet comprising an optically anisotropic layer comprising at least one liquid crystal compound, at least one polymer C, having a weight average molecular weight of not less than 5000 and less than 20000, represented by a formula (1b), and at least one polymer D, having a weight average molecular weight of not less than 20000, represented by a formula (1b). The optically anisotropic layer may be formed on a surface of a substrate or a surface of an alignment layer. The optical compensatory sheet may comprise two or more optically anisotropic layers, at least one of which comprises both of the polymers C and D.

(Polymer Represented by a Formula (1b), Polymer C and Polymer D)

First, the polymers C and D represented by a formula (1b), which are used in the second embodiment, will be described in detail. These polymers may contribute to controlling a tilt angle of a liquid crystal molecule, in particular to controlling a tilt angle at an air-interface side.

$$-(A)_{ai}-(B)_{bj}-(C)_{ck}- \qquad \text{Formula (1b)}$$

In the formula, "A" represents a repeating unit having a group capable of hydrogen bonding and i (i is an integer of bigger than 1) types of "A" are included in the polymer. "B" represents a repeating unit having a group capable of polymerization (polymerizable group) and j (j is an integer) types of "B" are included in the polymer; and "C" represents a repeating unit derived from a ethylene-type unsaturated monomer and k (k is an integer) types of "C" are included in the polymer, provided that at least one of j and k is not zero, or, in other words, at least one type of either "B" or "C" is always included in the polymer. In the formula, "a", "b" and "c" respectively represent weight % (polymerization ratio) of "A", "B" and "C", the total weight % of i types of "A", Σai, is from 1 to 99 wt %, the total weight % of j types of "B", Σbj, is from 0 to 99 wt %, and the total weight % of k types of "C", Σck, is from 0 to 99 wt %, provided that at least one of Σbj and Σck is not zero wt %, or, in other words, at least one of Σbj and Σck is more than 0 wt % and not more than 99 wt %.

Describing more specifically, in the formula (1b), "A" represents a repeating unit derived from a monomer, having a group capable of hydrogen bonding, represented by a formula (2b) (the monomer represented by the formula (2b) is occasionally referred to as monomer A hereinafter).

Formula (2b)

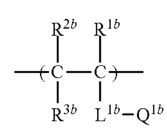

In the formula (2b), $R^{1b}$, $R^{2b}$ and $R^{3b}$ respectively represent a hydrogen atom, an alkyl group, a halogen atom (such as a fluorine atom, a chlorine atom, bromine atom and iodine atom) or a group represented by $L^{1b}$-$Q^{1b}$, in which $L^{1b}$ represents a divalent linking group and $Q^{1b}$ represents a polar group capable of hydrogen bonding.

It is preferred that $R^{1b}$, $R^{2b}$ and $R^{3b}$ respectively represent a hydrogen atom, a $C_{1-6}$ alkyl group, a chlorine atom or a group represented by -$L^{1b}$-$Q^{1b}$; it is more preferred that $R^{1b}$, $R^{2b}$ and $R^{3b}$ respectively represent a hydrogen atom or a $C_{1-4}$ alkyl group; and it is much more preferred that $R^{1b}$, $R^{2b}$ and $R^{3b}$ respectively represent a hydrogen atom or a $C_{1-2}$ alkyl group. Examples of the alkyl group include methyl, ethyl, n-propyl, n-butyl and sec-butyl. The alkyl group may have at least one substituent group. Examples of the substituent group include a halogen atom, an aryl group, a heterocyclic group, an alkoxyl group, an aryloxy group, an alkylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamide group, a sulfolyl group and a carboxyl group. It is noted that the carbons included in the substituent group are not counted for the preferred carbon number of the alkyl group described above.

$L^{1b}$ represents a single bond or a divalent linking group selected from the group consisting of —O—, —CO—, —$NR^{7b}$—, —S—, —$SO_2$—, —$PO(OR^{8b})$—, an alkylene group and, arylene group and any combinations thereof. $R^7$ represents a hydrogen atom, an alkyl group, an aryl group or aralkyl group. $R^{8b}$ represents an alkyl group, an aryl group or an aralkyl group.

It is preferred that $L^{1b}$ comprises a single bond, —O—, —CO—, —$NR^{7b}$—, —S—, —$SO_2$—, an alkylene group or an arylene group; it is more preferred that $L^{1b}$ comprises —CO—, —O—, —$NR^{7b}$—, an alkylene group or an arylene group.

The carbon atom number of the alkylene group contained in $L^{1b}$ is desirably from 1 to 10, more desirably from 1 to 8, and much more preferably from 1 to 6. Preferred examples of the alkylene group include methylene, ethylene, trimethylene, tetrabutylene and hexamethylene.

The carbon atom number of the arylene group contained in $L^{1b}$ is desirably from 6 to 24, more desirably from 6 to 18, and much more desirably from 6 to 12. Preferred examples of the arylene group include phenylene and divalent residue of naphthalene.

The carbon atom number of the divalent linking group formed of any combination of an alkylene group and an arylene group (or in other words aralkylene group) contained in $L^{1b}$ is desirably from 7 to 34, more desirably from 7 to 26, and much more desirably from 7 to 16. Preferred example of the aralkylene group include phenylene methylene, phenylene ethylene and methylene phenylene.

The divalent linking group, $L^{1b}$, may have at least one substituent group. Examples of such a substituent group include those exemplified as the substituent group of $R^{1b}$, $R^{2b}$ or $R^{3b}$.

Examples of $L^{1b}$ include, however not to be limited to, those shown below. Among those, L-1 to L-11 are preferred and L-1 to L-6 are more preferred.

L-1: ——

L-2: —COO—$(CH_2)_2$—

L-3: —COO—$(CH_2)_3$—

L-4: —COO—$(CH_2)_5$—

L-5: —COO—$(CH_2)_8$—

L-6: —COO—$(CH_2)_{11}$—

-continued

L-7: —COO—$(CH_2)_3$—$CH(CH_3)CH_2$—

L-8: —CONH—$(CH_2)_3$—

L-9: —CONH—$(CH_2)_5$—

L-10: —$CON(CH_3)$—$(CH_2)_8$—

L-11: —CONH—$(CH_2)_{11}$—

L-12

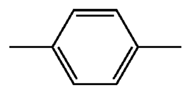

L-13

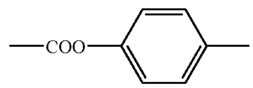

L-14

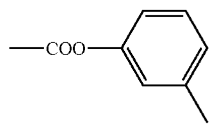

L-15

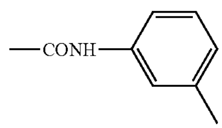

L-16: —$COOCH_2CH_2OCH_2$—

L-17: —COO—$(CH_2CH_2O)_2$—$CH_2$—

L-18

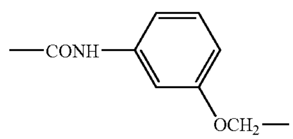

L-19

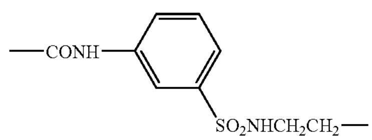

L-20

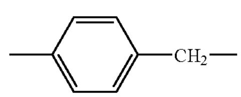

L-21

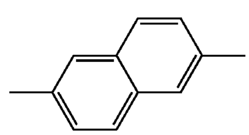

L-22

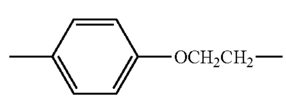

L-23

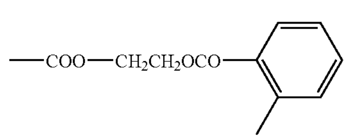

-continued

L-24

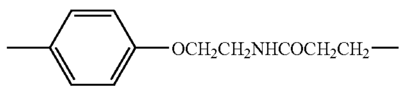

L-25

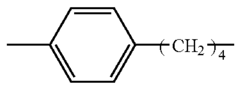

L-26

$-(CH_2)_5-$

L-27

$-O-(CH_2)_4-O-CH_2-$

In the formula (2b), $Q^{1b}$ is selected from any polar groups capable of hydrogen bonding. It is preferred that $Q^{1b}$ represents a hydroxyl group, a carboxyl group, a carboxylate such as lithium, sodium, potassium or ammonium (for example, non-substituted ammonium, tetramethyl ammonium, trimethyl-2-hydroxyethyl ammonium, tetrabutyl ammonium, trimethylbenzyl ammonium or dimethylphenyl ammonium) carboxylate; a pyridinium salt, a carboxylic amide (for example, non-substituted or N-mono substituted carboxylic amide with lower alkyl group such as $—CONH_2$ and $—CONHCH_3$), a sulfo group, a sulfate (examples of the cation are same as those exemplified above for the carboxylate), a sulfonamide (for example, non-substituted or N-mono substituted sulfonamide with lower alkyl group such as $—SO_2NH_2$ and $—SO_2NHCH_3$), a phospho group, a phosphate (examples of the cation are same as those exemplified above for the carboxylate), a phosphoamide group (for example, non-substituted or N-mono substituted phosphonamide with lower alkyl group such as $—OP(=O)(NH_2)_2$ and $—OP(=O)(NHCH_3)_2$), a ureido group ($—NHCONH_2$), and a non-substituted or N-mono substituted amino group (for example, $—NH_2$ or $—NHCH_3$). Examples of the lower alkyl group include methyl and ethyl.

It is more preferred that $Q^{1b}$ represents a hydroxyl group (—OH), a caroboxyl group (—COOH), a sulfo group ($—SO_3H$) or a phosho group $\{—P(=O)(OH)_2\}$; and it is much more preferred that $Q^{1b}$ represents a hydroxyl group (—OH) or a caroboxyl group (—COOH).

In the formula (1b), "B" represents a repeating unit (occasionally referred as to "repeating unit B" hereinafter) derived from a monomer having a polymerizable group (occasionally referred as to "monomer B" hereinafter) represented by a formula (3b).

Formula (3b)

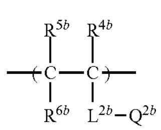

In the formula (3b), $R^{4b}$, $R^{5b}$ and $R^{6b}$ respectively represent a hydrogen atom, an alkyl group, a halogen atom (such as a fluorine atom, a chlorine atom, a bromine atom and a iodine atom) or a group represented by $-L^{2b}-Q^{2b}$. It is preferred that $R^{4b}$, $R^{5b}$ and $R^{6b}$ respectively represent a hydrogen atom, a $C_{1-6}$alkyl group, a halogen atom or a group represented by $-L^{2b}-Q^{2b}$; it is more preferred that $R^{4b}$, $R^{5b}$ and $R^{6b}$ respectively represent a hydrogen atom or a $C_{1-4}$ alkyl group; and it is much more preferred that $R^{4b}$, $R^{5b}$ and $R^{6b}$ respectively represent a hydrogen atom or a $C_{1-2}$ alkyl group. Examples of the alkyl group are same as those exemplified above for $R^{1b}$, $R^{2b}$, and $R^{3b}$ in the formula (2b). The alkyl group may have a substituent group selected from the examples exemplified above as the substituent group of the alkyl group represented by $R^{1b}$, $R^{2b}$ or $R^{3b}$ in the formula (2b).

In the formula (3b), $L^{2b}$ represents a divalent lining group and $L^{2b}$ desirably represents a divalent linking group selected from the group consisting of —O—, —S—, —C(=O)—, $—NR^{9b}—$, a divalent cahin group, a divalent cyclic group and any combinations thereof. $R^{9b}$ represents a $C_{1-7}$ alkyl group or a hydrogen atom.

Examples of $L^{2b}$ include, however not to be limited to, those shown below. Among those, L-1 to L-3 are preferred and L-2 is more preferred.

L-1: —CO—O— (a divalent chain group) —O—
L-2: —CO—O— (a divalent chain group) —O—CO—
L-3: —CO—O— (a divalent chain group) —O—CO—O—
L-4: —CO—O—
L-5: —O—CO—
L-6: —CO— (a divalent chain group) —O—CO—

In the formula (3b), $Q^{2b}$ represents a polymerizable group. The polymrizable group is desirably selected from the group consisting of groups capable of addition polymerization (including ring-opening polymerization) and groups capable of condensation polymerization. Examples of the polymerizable group include, however not to be limited to, those shown below. Among those, the polymerizable groups containing C=C are preferred.

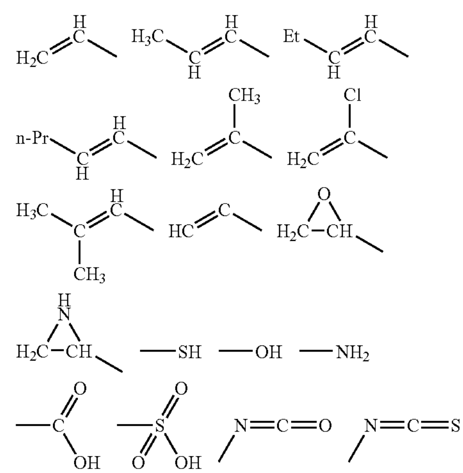

A single type or plural types of the monomer B may be used.

In the formula (1b), "C" represents a repeating unit derived from an ethylene-type unsaturated monomer (occasionally referred as to "monomer C" hereinafter). The monomer C is desirably selected from the monomers capable of radical polymerization. One or more types may be selected from the Group of Monomer C, shown below, as the monomer C.

Group of Monomer C:

(1) Alkenes:

ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoropropylene, tetrafluoroethylene, vinyl chloride, vinylidene chloride or the like;

(2) Dienes:

1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphtyl-1,3-butadiene, 1,4-divinyl cyclohexane or the like;

(3) α,β-Unsaturated Carboxylic Acid Derivatives:

(3a) Alkyl Acrylates:

methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethyleneglycol acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;

(3b) Alkyl Methacrylates:

methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, 2-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy) ethyl methacrylate, glycidyl methacrylate, 3-trimetoxysilylpropyl methacrylate, allyl methacrylate, 2-isosyanate ethyl methacrylate or the like;

(3c) Diesters of Unsaturated Polycarboxylic Acids:

dimethyl maleate, dibutyl maleate, dimethyl itaconate, dibutyl itaconate, dibutyl crotonate, dihexyl crotonate, diethyl fumarate, dimethyl fumarate or the like;

(3d) Amides of α,β-Unsaturated Carboxylic Acids:

N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated Nitriles:

acrylonitrile, methacrylonitrile or the like;

(5) Styrene or Derivatives Thereof:

styrene, vinyltoluene, ethylstyrene, p-tert-butylstyrene, p-vinyl methyl benzoate, α-methyl styrene, p-chloromethyl styrene, vinyl naphthalene, p-methoxy styrene, p-hydroxy methyl styrene, p-acetoxy styrene or the like;

(6) Vinyl Esters:

vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;

(7) Vinyl Ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and (8) Other Monomers N-vinyl pyrrolidone, methyl vinyl ketone, phenyl vinyl ketone, methoxy ethyl vinyl ketone, 2-vinyl oxazoline, 2-isopropenyl oxazoline, the compounds represented by a formula (6b):

Formula (6b)

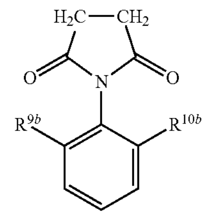

In the formula (6b), $R^{9b}$ and $R^{10b}$ respectively represent a hydrogen atom or a $C_{1-3}$ alkyl group (preferably methyl or ethyl); or the like.

In the formula (1b), one or more types of "A", "B" or "C" may be included. It is possible that either "B" or "C" is not included in the formula (1b); and it is preferred that at least one type of "A", "B" and "C" are respectively included in the formula (1b). When i is 1 in the formula (1b), only one type of "A", A1, is included in the formula (1b) in an amount of a1 (=a) wt %; and when i is 2, two types of "A" are included in the formula (1b) respectively in the amounts of a1 wt % and a2 wt % (a=a1+a2). For "B" and "C", "j", "bj", "k" and "ck" are understandable in the same manner as "A". In the formula 81b), i, j or k may be 3 or more. It is preferred that i is for 1 to 5, and more preferred 1 or 2. The total amount of "A", Σa, is from 1 to 99 wt %, The total amount of "B", Σb, is from 0 to 99 wt %, and the total amount of "C", Σc, is from 0 to 99 wt %. It is preferred that Σa is from 5 to 90 wt %, Σb is from 5 to 90 wt %, and Σc is from 5 to 90 wt %. It is more preferred that Σa is from 10 to 80 wt %, Σb is from 10 to 80 wt %, and Σc is from 10 to 80 wt %. It is also preferred that the relative proportion (mass) of "A", "B" and "C" is, when the ration of "A" is 1, "B" is from 0.1 to 5 and "C" is from 1 to 10.

Examples of the method for producing the polymer represented by the formula (1b) include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkennhoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 minutes to 30 hours. Inert gas purge is desirably performed before or while carrying out the solution polymerization to avoid deactivation of the generated radicals. Nitrogen gas is usually used as an inert gas.

Radical polymerization with at least one chain transfer agent is useful for producing the polymers, which can be used in the second embodiment, having a proper molecular weight. Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as α-methyl styrene or α-methyl styrene dimer. Among these, $C_{4-16}$ mercaptans are preferred. The amount of the chain transfer agent to be used may be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

According to the second embodiment, at least two types of polymers selected from the formula (1b), polymer C and polymer D, are used. The polymer C and the polymer D may have a same or different formulation from each other and have a different molecular weight from each other. The weight-average molecular weight of the polymer C is not less than 5000 and less than 20000, preferably from 6000 to 18000, and more preferably from 6000 to 15000. The weight-average molecular weight of the polymer D is not less than 20000, preferably from 20000 to 40000, and more preferably from 25000 to 35000. The weight-average molecular weight can be measured as a polystyrene (PS) equivalent molecular weight with gel permeation chromatography (GPC).

Examples of the polymer represented by the formula (1b), which can be used desirably in the second embodiment, include, however not to be limited to, those shown below. Numerical values in formulae shown below mean wt % of each monomer.

Q-1

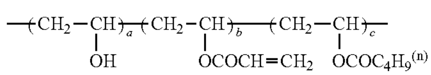

a/b/c = 20/12/68

Q-2

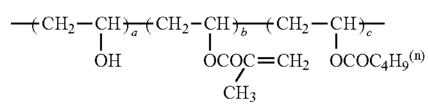

a/b/c = 30/12/58

Q-3

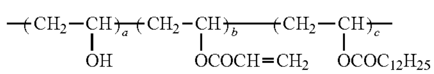

a/b/c = 25/15/60

Q-4

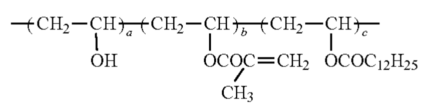

a/b/c = 20/60/20

Q-5

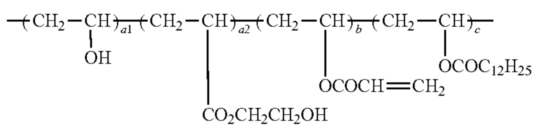

a1/a2/b/c = 10/20/20/50

Q-6

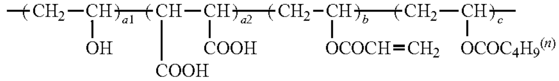

a1/a2/b/c = 10/10/10/70

-continued
Q-7
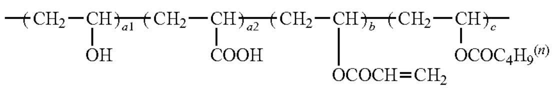
a1/a2/b/c = 20/20/20/40
Q-8
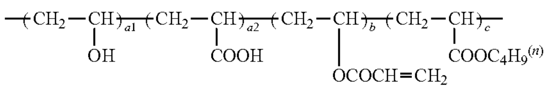
a1/a2/b/c = 10/20/20/50
Q-9
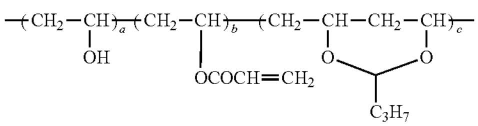
a/b/c = 30/12/58
Q-10
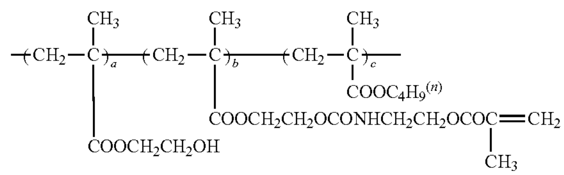
a/b/c = 20/15/65
Q-11
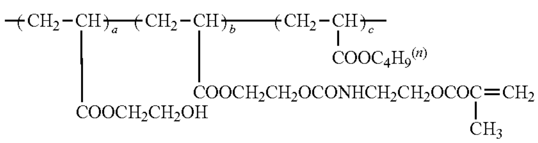
a/b/c = 15/15/70
Q-12
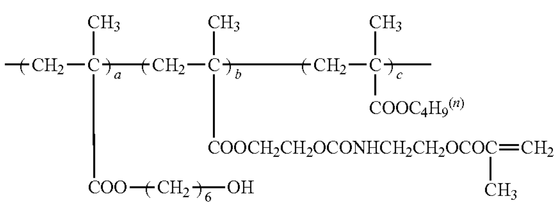
a/b/c = 10/20/70
Q-13
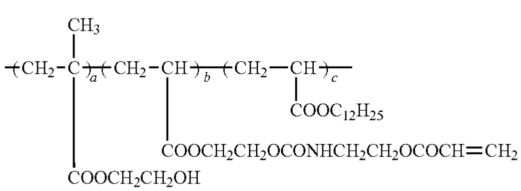
a/b/c = 60/20/20
Q-14
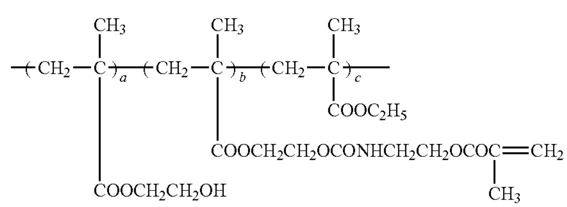
a/b/c = 15/15/70
Q-15
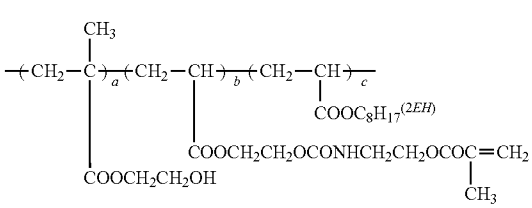
a/b/c = 30/20/50

-continued
Q-16
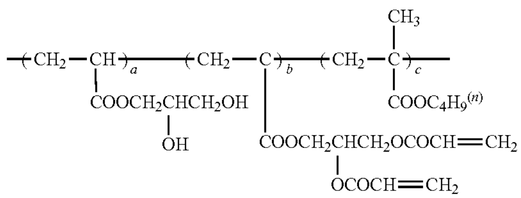
a/b/c = 10/10/80
Q-17
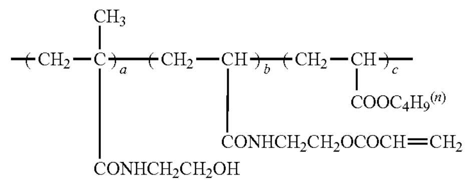
a/b/c = 20/10/70
Q-18
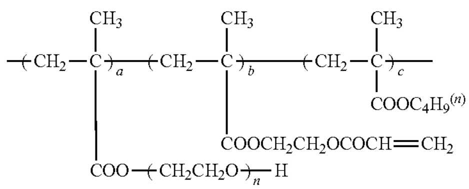
a/b/c = 10/10/80
Q-19
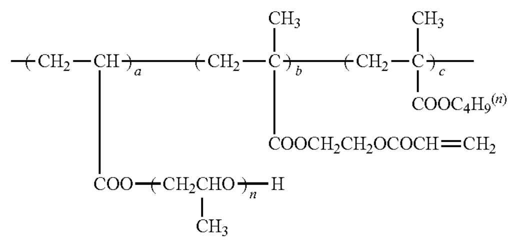
a/b/c = 10/10/80
Q-20
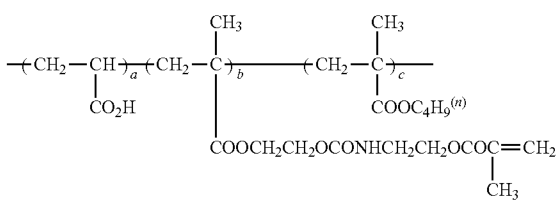
a/b/c = 5/5/90
Q-21
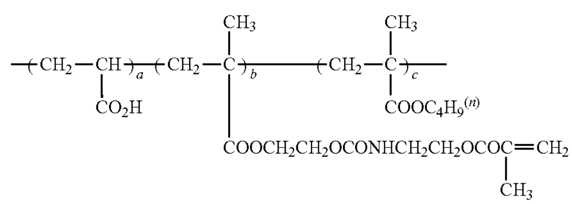
a/b/c = 5/15/80
Q-22
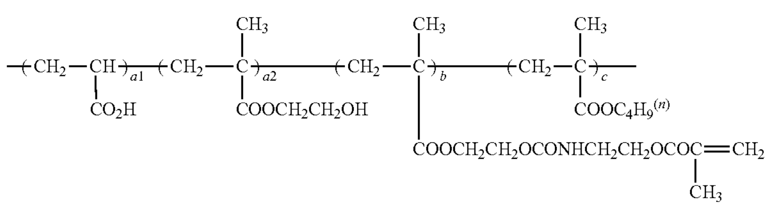
a1/a2/b/c = 5/3/12/80
Q-23
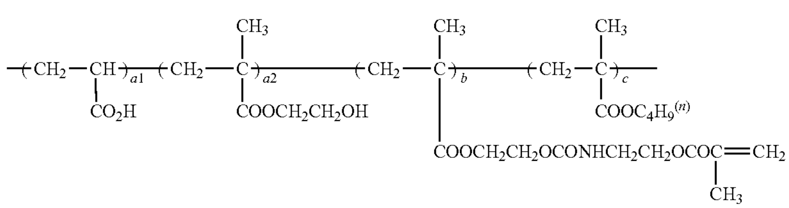
a1/a2/b/c = 5/18/12/65
Q-24
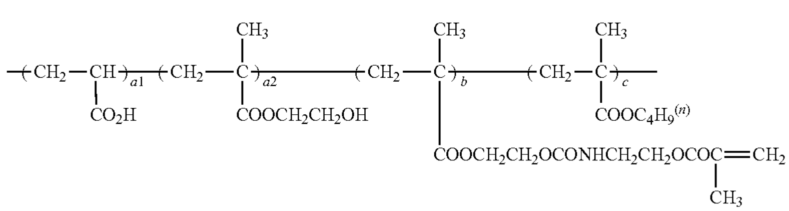
a1/a2/b/c = 5/33/12/50

-continued
Q-25
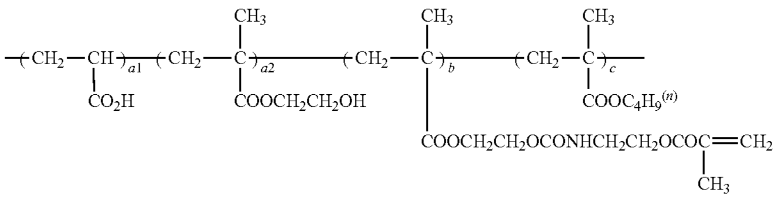
a1/a2/b/c = 5/7/23/65
Q-26
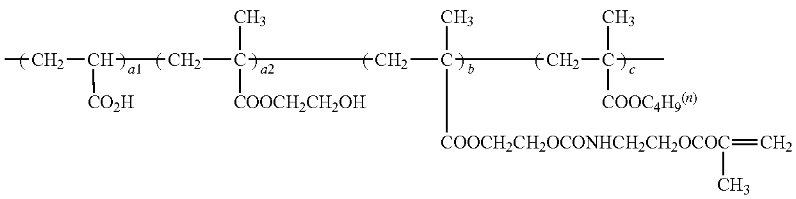
a1/a2/b/c = 5/22/23/50
Q-27
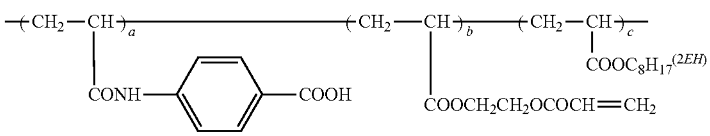
a/b/c = 20/20/60
Q-28
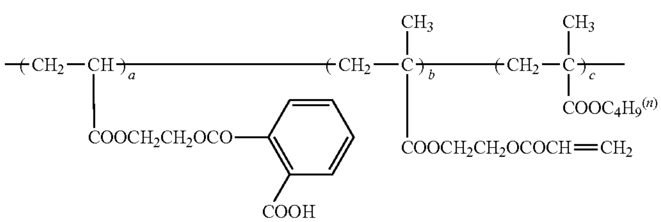
a/b/c = 15/15/70
Q-29
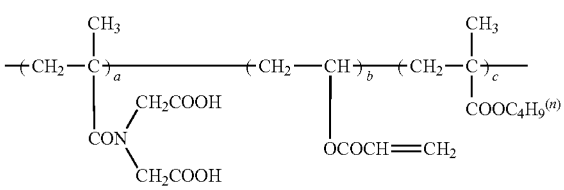
a/b/c = 5/15/80
Q-30
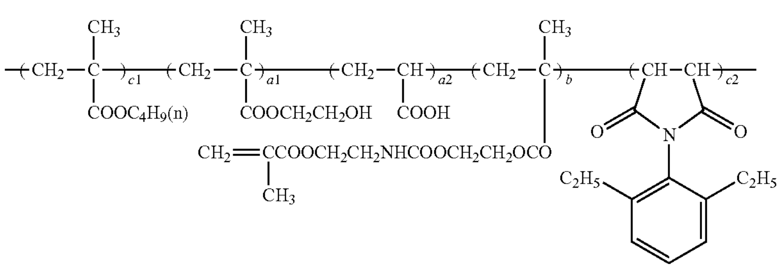
a1/a2/b/c1/c2 = 16/6/12/33/33

-continued

Q-31

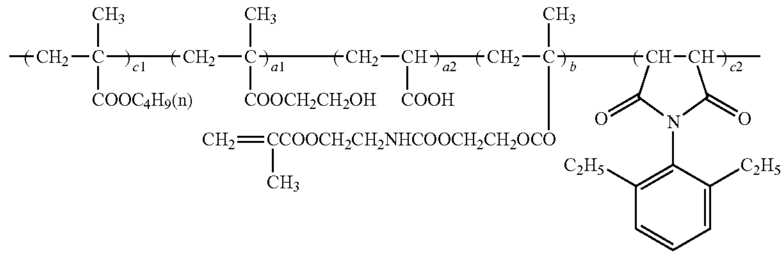

a1/a2/b/c1/c2 = 5/6/23/33/33

Q-32

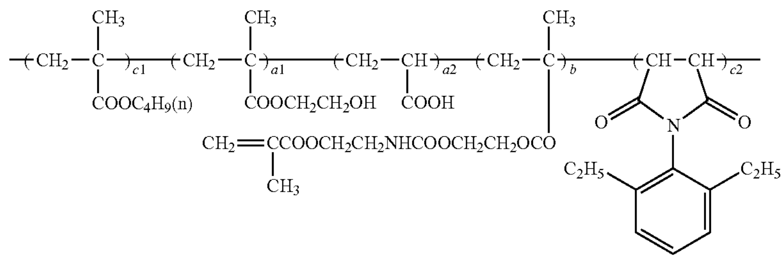

a1/a2/b/c1/c2 =5/12/23/33/27

In the second embodiment, the amount of the polymers represented by the formula (1b) is preferably from 0.01 to 20 wt %, more preferably from 0.05 to 10 wt % and much more preferably from 0.1 to 5 wt % with respect to the amount of the liquid crystal compound (preferably discotic liquid crystal compound).

(Cellulose-Types Polymer)

According to the second embodiment, cellulose-type polymer may be used with the polymers represented by the formula (1b).

Adding cellulose-type polymer to a composition comprising a liquid crystal compound may contribute to avoiding the occurrence of cissing ("hajiki") when the composition is applied to a surface. Cellulose-type polymer may also contribute to control tilt angles of liquid crystal molecules. Examples of the cellulose-type polymer, which can be used in the second embodiment preferably, include cellulose acetate, cellulose acetate butyrate, cellulose acetate propionate, hydroxypropyl cellulose, methylcellulose and carboxy methyl cellulose. Among these, cellulose esters are preferred and cellulose acetate butyrate is more preferred, and cellulose acetate butyrate having a butyrylation degree of 40% or more is much more preferred. The amount of cellulose-type polymer is desirably from 0.01 to 8 wt %, and more desirably from 0.05 to 2 wt % with respect to the total weight of a single or plural liquid crystal compounds.

According to the second embodiment, at least one type of fluoro-aliphatic polymer may be employed with the polymers C and D. The polymer having fluoro-aliphatic group may contribute to avoiding unevenness ("mura") in the optically anisotropic layer. Thus, the optical compensatory sheet of the second embodiment, further comprising the fluoro-alipahtic polymer, may contribute to improving the displaying quality without generating unevenness even when being used in a big screen liquid crystal display. The polymer having fluoro-aliphatic group, which can be preferably used in the second embodiment, is preferably selected from the polymer B described above for the first embodiment, and the preferred scope of the polymer having fluoro-apliphatic group are same as the polymer B.

The polymer A, which is used in the first embodiment, may be used in the second embodiment as an ingredient added to the optically anisotropic layer.

Next, materials, which can be used for producing the optical compensatory sheets of the first and second embodiments, other than the polymers described above, will be described in detail.

The optically anisotropic layer is desirably designed with various materials to compensate a liquid crystal cell in a black state. The alignment state of liquid crystal molecules in the cell in a black state varies depending on how mode is employed. Various alignment states of the liquid crystal molecules in the cell are described on pages from 411 to 414 in "IDW'00, FMC7-2".

The optically anisotropic layer may be produced by applying a composition comprising a liquid crystal compound and at least one polymer (for the first embodiment cellulose acetate and polymer A, or, for the second embodiment, polymer C and polymer D) on a surface of a substrate or an alignment layer formed on a substrate. The thickness of the alignment layer is desirably not more than 10 μm. And preferred examples of the alignment layer are described in Japanese Laid-Open Patent Publication No. hei 8-338913.

According to the first and second embodiments of the present invention, examples of the liquid crystal compound, which can be employed in an optically anisotropic layer, include rod-like liquid crystal compounds and discotic liquid crystal compounds. The liquid crystal compound may be selected from high-molecular weight or low-molecular weight liquid crystals. The liquid crystal compound is not required to have a liquid-crystalinity after forming the optically anisotropic layer, in which the molecules of the low-molecular-weight liquid crystal compound are crosslinked.

The liquid crystal compound is desirably selected from discotic liquid crystal compounds.

(Rdod-Like Liquid Crystal Compound)

Examples of the rod-like liquid crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention.

Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142th committee of Japan Society for the Promotion of Science.

The rod-like crystal compounds desirably have a birefringence index of 0.001 to 0.7.

The rod-like crystal compounds desirably have one or more polymerizable groups for fixing themselves in an alignment state. Unsaturated polymerizable groups or epoxy polymerizable groups are preferred, and ethylene-type unsaturated polymerizable groups are more preferred.

(Discotic Liquid Crystal Compound)

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al.

Examples of the discotic liquid crystal compounds also include compounds having a discotic core and substituents, radiating from the core, such as a linear alkyl or alkoxy group or substituted benzoyloxy groups. Such compounds exhibit liquid crystallinity. It is preferred that molecules have rotational symmetries respectively or as a whole of molecular assembly to be aligned in an alignment state. The discotic liquid crystal compounds employed in preparing optically anisotropic layers are not required to maintain liquid crystallinity after contained in the optically anisotropic layers. For example, when a low-molecular-weight discotic liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid crystal compound are described in Japanese Laid-Open Patent Publication No. hei 8-50206. The polymerization of discotic liquid-crystal compounds is described in Japanese Laid-Open Patent Publication No. hei 8-27284.

It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during polymerization reaction. Accordingly, the discotic liquid-crystal molecules desirably have a linking group between the disk-shaped core and the polymerizable group. That is, the discotic liquid-crystal compound is desirably selected from the group denoted by Formula (5) below.

$D(-L^1Q^1)_n$ Formula (5)

In the formula (5), "D" represents a discotic core, $L^1$ represents a divalent linking group, $Q^1$ represents a polymerizable group and n is an integer from 4 to 12.

Examples of the core, "D", are shown below. In the examples, LQ or QL means a combination of a divalent linking group ($L^1$) and a polymerizable group ($Q^1$).

(D1)

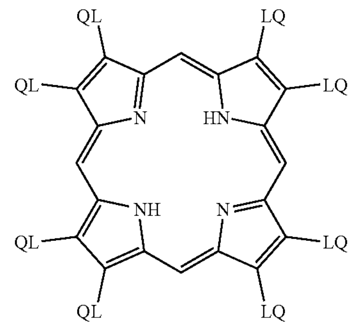

(D2)

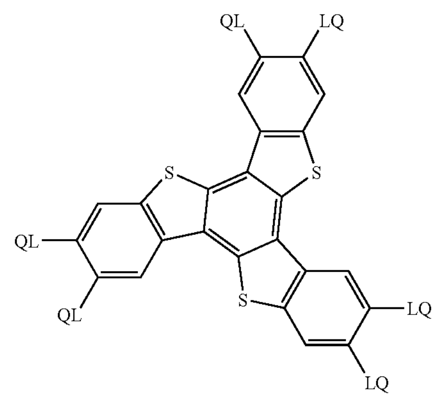

(D3)

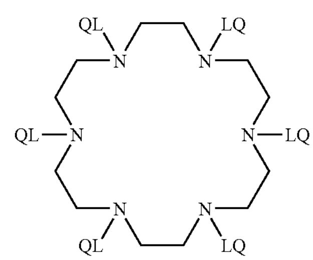

(D4)

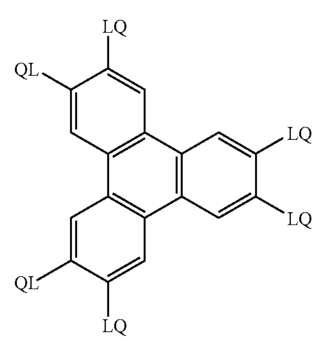

-continued
(D5)
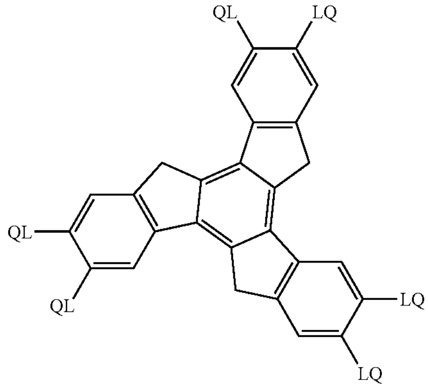
(D6)
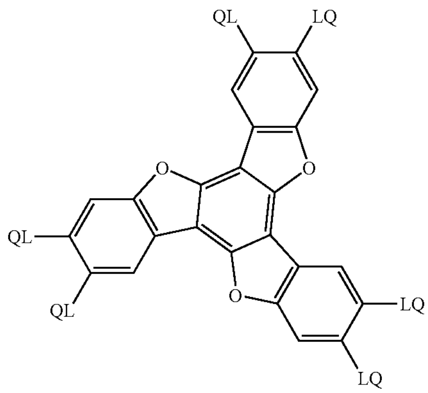
(D7)
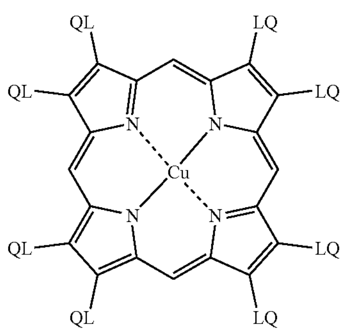
(D8)
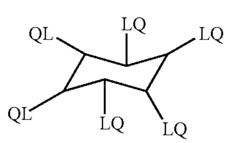
(D-9)
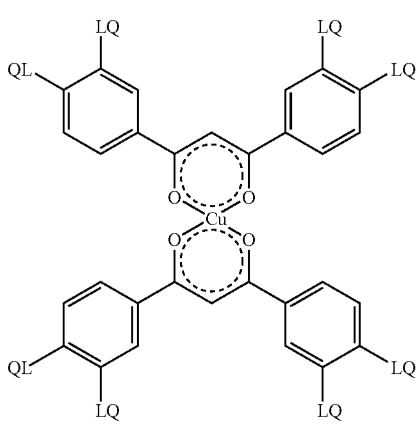
-continued
(D-10)
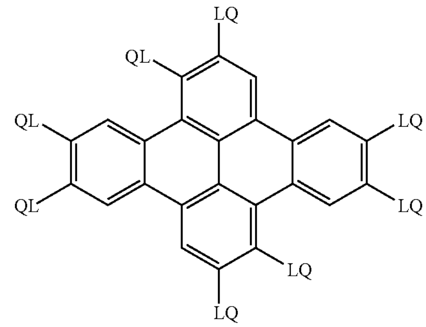
(D-11)
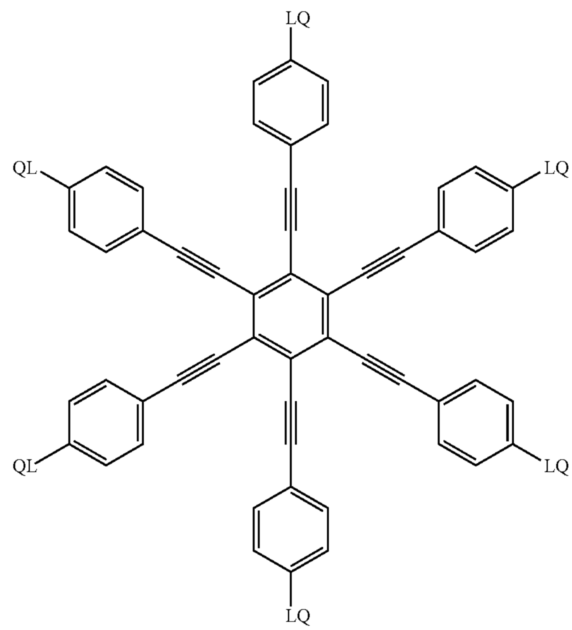
(D12)
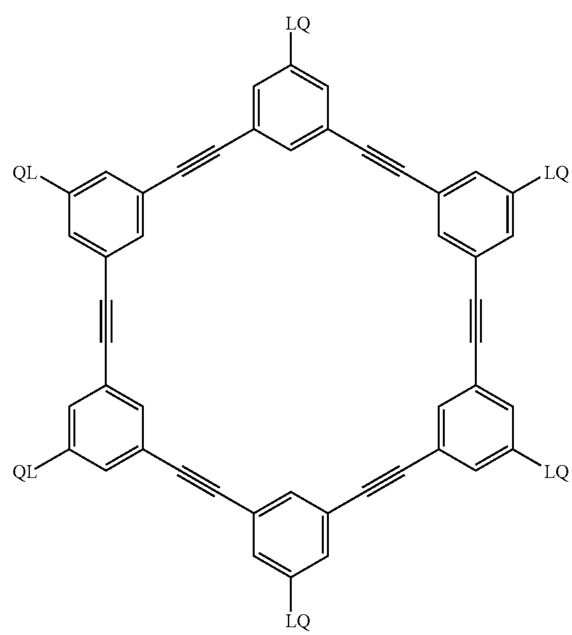

-continued (D13)

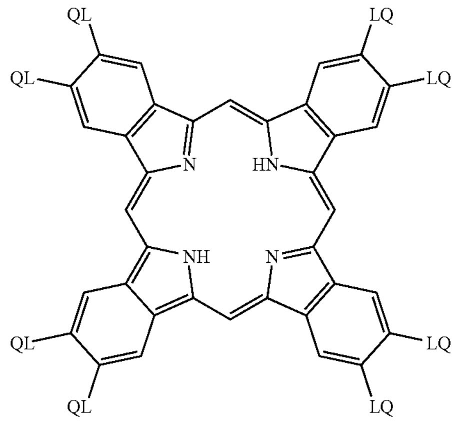

(D14)

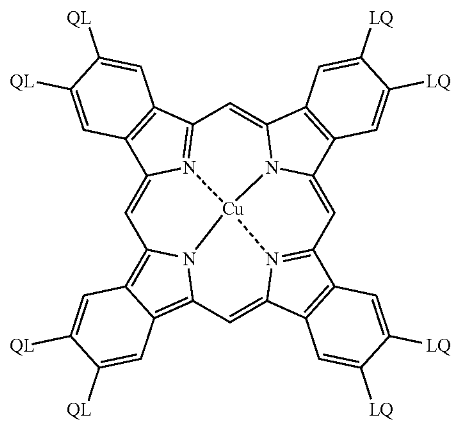

(D15)

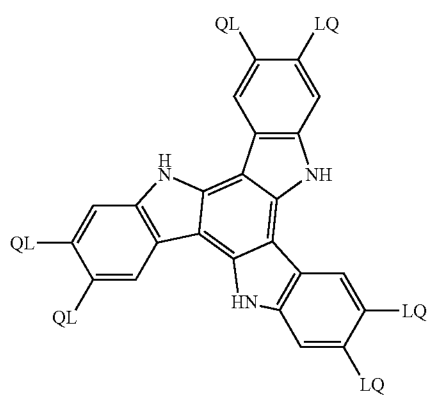

In a hybrid alignment, discotic molecules are aligned with a tilt angle, an angle between a long axis (disk face) of discotic molecule and a surface of the substrate, increasing or decreasing according to a distance from a substrate supporting the optically anisotropic layer, or in other words increasing or decreasing in a depth-direction; and are partially aligned in a random manner. It is preferred that the tilt angle increases according to a distance from the substrate. Examples of the manner of changing in a tilt angle include continuous increase, continuous decrease, intermittent increase, intermittent decrease, change comprising continuous increase and continuous decrease and intermittent change comprising increase and decrease. Embodiments of the intermittent changes comprise an area in which the tilt angle doesn't change in depth-direction. According to the present invention, it is preferred that the tilt angle increases or decreases as a whole whether the tilt angle change continuously or not. It is more preferred that the tilt angle increases as a whole with the position of the molecules being far from the substrate, and it is much more preferred that the tilt angle increases continuously as a whole with the position of the molecules being far from the substrate.

The mean direction of the long axes of discotic molecules at an alignment layer side may be controlled by rubbing directions of alignment layers or the like. The long axes of discotic molecules at an air interface side may be controlled by selecting the types of liquid crystal compounds, adding appropriate additives or the like.

Examples of such an additive include plasticizers, surfactants, polymerizable monomers and polymers. The degree of the variation of the mean direction of the long axes can be controlled by selecting the types of liquid crystal compounds or additives.

The additives such as plasticizers, surfactants or polymerizable monomers, are desirably selected from the compounds which can be mixed with the liquid crystal compound compatibly and can change the tilt angle of liquid crystal molecules or don't disorder the alignment of liquid crystal molecules substantially. Among the additives, the polymerizable monomers, compounds having vinyl, vinyloxy, acryloyl, methacryloyl or the like, are desirably used. The amount of the additive is desirably from 1 to 50 wt %, and more desirably from 5 to 30 wt % with respect to the amount of the discotic liquid crystal compound. Adding monomers having 4 or more reactive function groups may contribute improving the adhesiveness between the alignment layer and the optically anisotropic layer.

The optically anisotropic layer may further comprise at least one polymer other than those (for the first embodiment, polymer A and cellulose ester, or, for the second embodiment, polymer C and polymer D) described above. Any polymers which can be mixed with a liquid crystal compound compatibly and can change the tilt angle of the liquid crystal compound are desirably used.

The phase transfer temperature from a discotic nematic phase to a solid phase of the liquid crystal compound is desirable from 70 to 300° C., and more desirably from 70 to 170° C.

(Production of Optically Anisotropic Layer)

The optically anisotropic layer can be produced by applying a composition comprising a liquid crystal compound to a surface of a substrate or a surface of an alignment layer. The composition may comprise a liquid crystal compound and various additives. The composition is desirably prepared as a coating fluid by dissolving ingredients in a solvent. various alignment layer may be used for producing the optically anisotropic layer, and, for example, alignment layers prepared by rubbing surfaces of a polyvinyl alcohol films in predetermined directions may be used. Preferred examples of the alignment layer are described in Japanese Laid-Open Patent Publication No. hei 8-338913. The thickness of the alignment layer is desirably not more than 10 μm. It is noted that the alignment state can be kept without the alignment layer after aligning liquid-crystalline molecules in an alignment state and fixing them in the state. Accordingly, the optical compensatory sheet of the present invention can be produced by transferring only the optically anisotropic layer, which is formed on an alignment layer disposed on a temporary substrate, from on the temporary substrate to on a transparent substrate. Namely, the scope of the present invention includes embodiments not comprising an alignment layer.

Examples of the organic solvent, which can be used for preparing the coating fluid, include amides such as N,N- dimethylformamide, sulfoxides such as dimethylsulfoxide, heterocyclic compounds such as pyridine, hydrocarbons such as benzene or hexane, alkyl halides such as chloroform or dichloromethane, esters such as methyl acetate or butyl acetate, ketones such as acetone or methylethyl ketone and ethers such as tetrahydrofuran or 1,2-dimethoxyethane. Among these, alkyl halide or ketones are preferred. plural types of organic solvents may be used in combination.

The surface tension of the coating fluid is preferably not more than 25 mN/m and more preferably not more than 22 mN/m, in order to form a uniform optically anisotropic layer.

The coating fluid may be applied by known techniques (e.g., wire bar coating, extrusion coating, direct gravure coating, reverse gravure coating and die coating).

After applying the coating fluid to a surface of a substrate or an alignment layer, the liquid crystal molecules are aligned in a preferred alignment state.

After being aligned in a preferred alignment state, the liquid crystal molecules are fixed in the alignment state to form an optically anisotropic layer. The liquid-crystal molecules are desirably fixed by polymerization reaction. Polymerization reactions include thermal polymerization reactions employing a thermal polymerization initiator and photo-polymerization reactions employing a photo-polymerization initiator. A photo-polymerization reaction is preferred. Some materials such as polymerizable monomers and polymerization initiators, which can contribute to fixing the liquid crystal molecules, are desirably added to the coating fluid. Preferred examples of the polymerizable monomer include compounds having vinyl, vinyloxy, acryloyl or methacryloyl. The amount of the monomer is desirably from 1 to 50 weight percent, preferably from 5 to 30 weight percent, of the mount of the liquid crystal compound. Adding the monomer having 3 or more reactive function groups may contribute to improving the adhesiveness between the alignment layer and the optically anisotropic layer.

Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclear-quinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 weight percent, preferably from 0.5 to 5 weight percent, of the solid portion of the coating fluid.

Ultraviolet radiation is desirably employed for initiating polymerization of liquid crystal compound. The irradiation energy is desirably from 20 mJ/cm$^2$ to 50 J/cm$^2$, preferably from 20 to 5000 mJ/cm$^2$, and more preferably from 100 mJ/cm$^2$ to 800 mJ/cm$^2$. Irradiation may be conducted under heated conditions to promote the photo-polymerization reaction.

The thickness of the optically anisotropic layer is desirably from 0.1 to 20 μm, more desirably from 0.5 to 15 μm and much more desirably from 1 to 10 μm. A protective layer may be formed on the optically anisotropic layer.

[Alignment Layer]

The optical compensatory sheet of the present invention may comprise an alignment layer. Alignment layer has a function for defining the orientation direction of liquid crystal molecule. Therefore, alignment layer is preferably used for achieving the preferable embodiment of the invention. When a liquid crystal compound is once oriented and is fixed in that state, alignment layer is not necessary because the role of the alignment layer is preliminarily satisfied by the liquid crystal compound in the orientated state. In other words, it is also possible to prepare an optical compensatory sheet or a polarizing plate of the invention by transferring only an optically anisotropic layer on an alignment layer in the fixed oriented state onto a substrate or a polarizer.

According to the present invention, the optically anisotropic layer is preferably produced by applying a coating fluid to a surface with a slot die. Next, preferred examples of the process for producing the optical compensatory sheet of the present invention will be described in detail.

Figure 3:
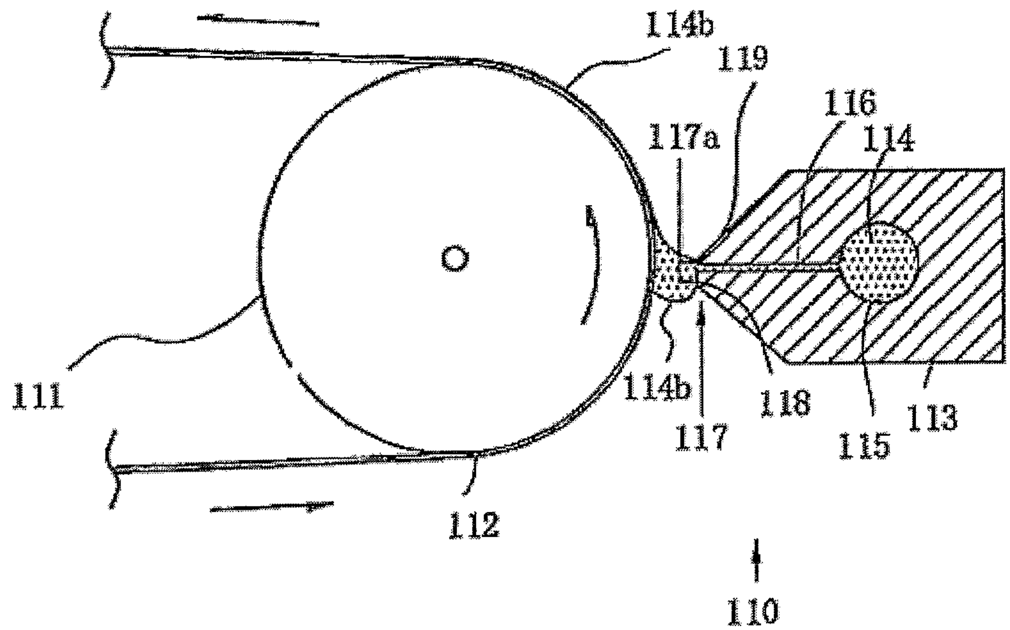
FIG. 3 is a schematic cross-sectional view of one example of a slot die coater which can be used in accordance with the invention.

FIG. 3 is a schematic cross-sectional view of one example of a coater using slot die, for use in accordance with the invention. Coater 110 works to form coated film 114*b* on the surface of web 112, by coating coating fluid 114 in the form of bead (not shown in the figure) from slot die 113 on the web 112 continuously running under support with backup roll 111.

The slot die 113 depicted in FIG. 4(A) in enlargement includes pocket 115 and slot 116, both of which are formed inside. The cross section of the shape of the pocket 115 is composed of curved line and linear line. For example, the cross section may be an approximate circle or semi-circle as shown in FIG. 4(A). The pocket 115 is an extension of the slot die 113 in its width direction and of the cross sectional shape, and a liquid reservoir space of coating fluid. In general, the length of the effective extension is equal to on slightly longer than the coating width. The feeding of the coating fluid 114 into the pocket 115 is done from the side face of the slot die 113 or the center of the face opposite to the slot. On both the ends of the pocket 115 along the coating width, a stopper is arranged so as to stop the leak of the coating fluid 114.

Slot 116 is a flow path of the coating fluid 114 from the pocket 115 to the web 112. Like the pocket 115, the slot 116 has a cross sectional shape along the width direction of the slot die 113, where opening 116*a* positioned on the web side is generally adjusted approximately to the width of the same length as the coating width, using a width regulating plate not shown in the figure. Generally, the angle of the slot 116 toward the tangent of the backup roll 111 along the web running direction at the slot tip is preferably 30° to 90°. However, the advantage of the invention is not limited to the slot die of the above-described shape.

Tip lip 117 of the slot die 113 where the opening 116*a* of the slot 116 is positioned is prepared in a tapered form. Its tip is a flat part 117*a* called land. The portion of the flat part 117*a* which is upstream side along the running direction of the web 112 with respect to the slot 116 is referred to as upstream lip land 118, while the downstream side thereof is referred to as downstream lip land 119 hereinbelow.

The length $I_{LO}$ of the downstream lip land 119 along the running direction of the web is preferably 30 μm to 500 μm, more preferably 30 μm to 100 μm, still more preferably 30 μm to 60 μm. Additionally, the length $I_{UP}$ of the upstream lip land 118 along the running direction of the web is not specifically limited but is preferably used within a range of 500 μm to 1 mm.

Figure 4:
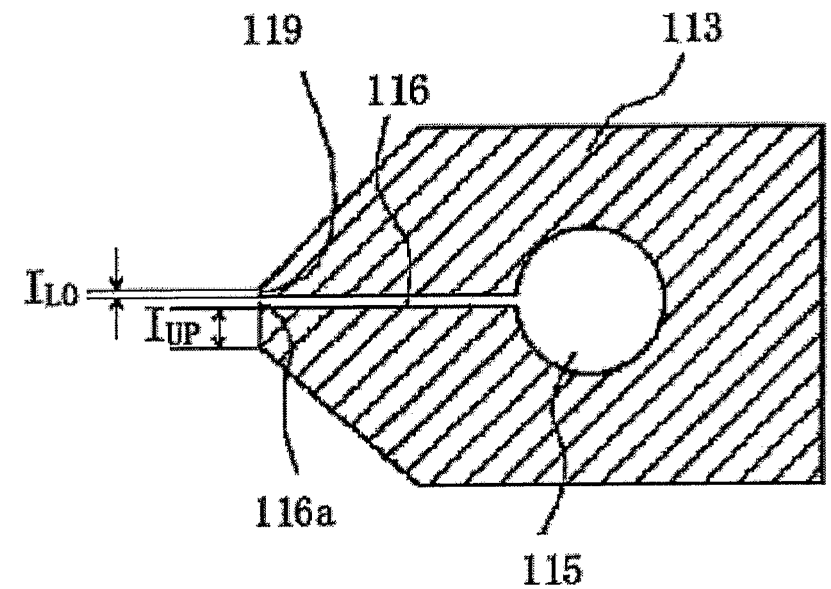
FIG. 4 is a schematic view of one example of a slot die which can be used in accordance with the FIG. 5 is a schematic cross-sectional view of a drying apparatus which can be used in accordance with the invention.
Figure 4:
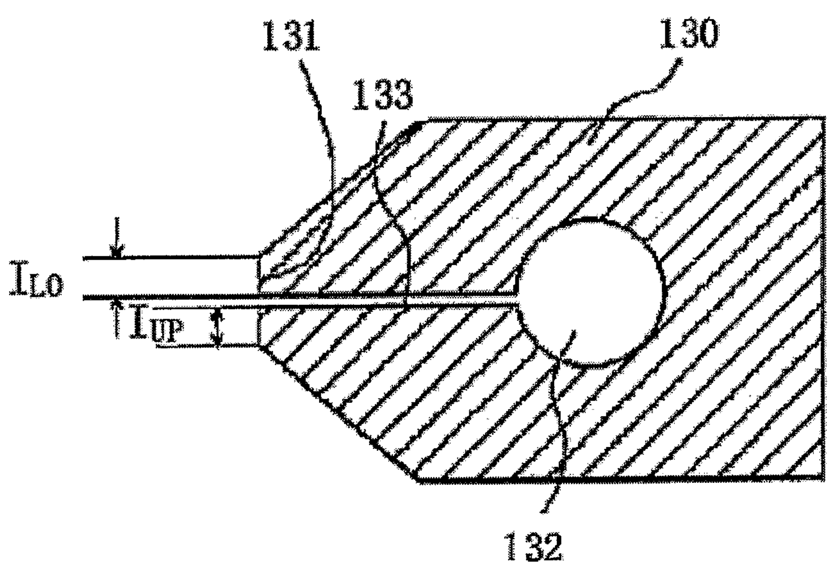

FIG. 4 shows the cross sectional shape of the slot die 113, compared with those in the related art, where (A) depicts slot die 113 preferable for use in accordance with the invention and (B) depicts slot die 130 in the related art. With no account of the land length $I_{LO}$ of the downstream lip land 131, the slot die 130 in the related art is approximately the same length as the length $I_{UP}$ of the upstream lip land. Herein, the symbol 132 represents pocket, and the symbol 133 represents slot.

Alternatively, the slot die 113 preferable for use in accordance with the invention has a shortened downstream lip land length $I_{LO}$, which enables highly precise coating with moist film thickness of 20 μm or less. Additionally by setting the land length $I_{LO}$ of the downstream lip land 119 within a range of 30 μm to 100 μm, a lip land with great dimensional precision can be formed.

So as to make the film thickness of the coated film uniform at high precision, additionally, the deviation in width of the land length $I_{LO}$ of the downstream lip land 119 along the width direction of the slot die 113 is preset within a range of 20 μm or less. This is because bead formation gets unstable when the land length $I_{LO}$ of the downstream lip land 119 is larger. Additionally, even with a slight external disorder the bead gets unstable, so that the bead loses its satisfactory properties for production. Therefore, the slot die 113 may be produced so that the deviation of the slot die 113 along the width direction may be within 20 μm.

As an approach for improving the strength and surface state of the tip lip 117 including the opening 116*a* of the slot 116, the material of the slot die at least including the parts is an ultra-hard material containing WC as a main component. The use of the ultra-hard material, works for improving the homogeneity of the surface form and also works against the wear of the tip lip with the coating fluid continuously discharged. The approach is particularly effective in case of coating a magnetic solution containing a grinding material as a coating fluid. As the ultra-hard material, a material prepared by binding WC carbide crystal of a mean particle size of 5 μm with a binding metal mainly including Co is used. The binding metal is not limited to the metal described above. Various metals including Ti, Ta and Nb may also be used. Additionally, WC crystal of an appropriate mean particle size of 5 μm or less may satisfactorily be used.

So as to retain the coated film thickness of thin film uniformly at high precision, further, the dimensional precision of the land length $I_{LO}$ of the downstream lip land 119 along the width direction of coating may be retained. In addition, the straightness levels of both the tip lip 117 of the slot die 113 and the backup roll 111 are important. This can be achieved by a combination of the two straightness levels of the tip of the slot die 113 and the backup roll 11. Therefore, it is meaningless to improve the precision of only one of them. Using the following formula (1), the required straightness level can approximately be determined in practically sufficient precision, with no specific limitation. Herein, "$P_0$" is the pressure outside the bead meniscus on the side of the running direction of the web 112. "$P_p$" is the inner pressure of the pocket 115. Not shown in the figure, "σ" is the surface tension of the coating fluid 114; "μ" is the viscosity of the coating fluid 114; "U" is the coating speed; "h" is film thickness; "d" is the length of the space between the downstream lip land 119 and the web 112; "L" is the length of the slot 116 of the slot die 113; and "D" is the slot space of the slot die 113. By subsequently setting the difference in pressure ($P_0$−$P_p$) constantly along the width direction of the slot die 113 provided that $P_p$ is the inner pressure of the pocket 115 of the slot die 113 and $P_0$ is the pressure outside the bead meniscus on the side of the web running direction, the required straightness level is determined using the following formula (1). This is due to the occurrence of the flow in the pocket 115 in the slot die 113, leading to a flow distribution, so that the difference in pressure between the inside of the pocket 115 of the slot die 113 and the outside of bead meniscus might be constant even when the length "d" of the space between the tip of the slot die 113 and the backup roll 111 changes.

$$P_0-P_p=1.34\ \sigma/h\cdot(\mu U/\sigma)^{2/3}+12\mu UI_{LO}(d/2-h)/d^3-12\mu hUL/D^3 \quad (1)$$

By using the formula (1), a distribution of coated film thickness emerges at about 2% under a straightness level of about 5 μm along the die block width direction in a coating system for use in general industrial production, although the distribution varies strictly under some conditions. Accordingly, the numerical figure is considered as the limit in practicing the coating of thin film at high precision. Based on the figure, the straightness levels of the tip lip and the backup roll are calculated so that the deviation in width of the space between the tip lip and the web along the width direction of the slot die might be within 5 μm, when the slot die 113 is set at the coating position.

Then, the drying method following the coating of the optical compensatory sheet of the invention is now described.

Figure 5:
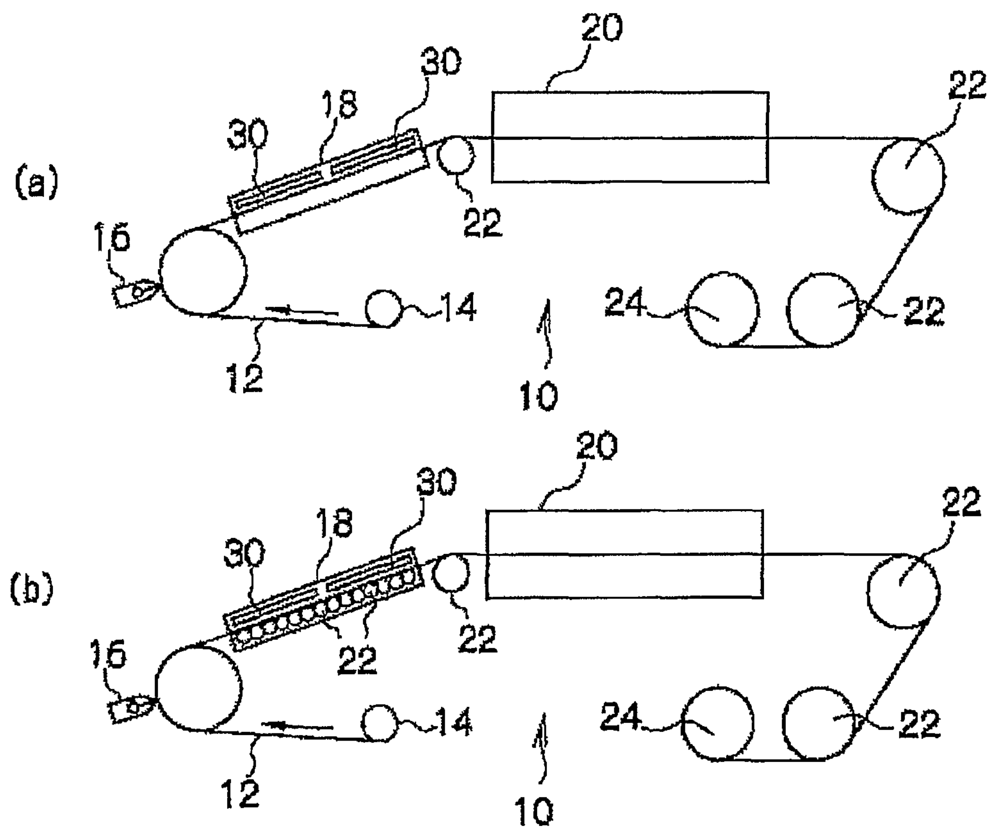

FIG. 5 is one example of the drying apparatus, and is a conceptual view depicting one example of coating and drying line 10 with a drying apparatus integrated therein, to which the drying method and apparatus of coated film is applicable.

As shown in the figure, the coating and drying line 10 mainly includes transfer apparatus 14 for transferring band-like flexible support 12 wound in a roll shape, coating unit 16 for coating a coating fluid on the band-like flexible support 12, dryer 18 for condensing and recovering the solvent in the coating fluid in the coated film coated and formed on the band-like flexible support 12, ventilating drying unit 20 for drying coated film as arranged if necessary, and winding-up apparatus 24 for winding up the product produced through coating and drying, and numerous guide rollers 22, 22, . . . , for forming transfer paths where the band-like flexible support 12 runs. Herein, the solvent is preferably condensed and recovered, using a condensation plate without ventilation at the first half of the drying step in accordance with the invention. Drying is preferably done while the vapor pressure of the solvent in the coating fluid at the side of the coating face at the drying step is retained at 50 to 100%, preferably 80 to 100% of the saturated vapor pressure.

The coating unit 16 can be driven by known methods (for example, slot die coating, wire bar coating, extrusion coating, direct gravure coating, reverse gravure coating, slide hopper coating mode, curtain coating mode). The extrusion coating using the slot die exemplified in FIG. 3 is preferably used for fabricating the optical compensatory sheet of the invention.

Additionally, the coating unit 16 may be in a constitution where the coating face is either on the upper side or lower side from the horizontal direction or shown in FIGS. 3 and 4. Further, the coating unit may be in a constitution slanting toward the horizontal direction.

Dryer 18 includes condense plate 30 as a plate member arranged in parallel to and at an interval apart from the band-like flexible support 12, and a casing composed of a side panel vertically arranged downward from approximately the front or back of the condense plate 30. In such manner, the dryer is in a constitution to condense the solvent in the coating fluid in the coated film, when evaporated onto the condense plate 30 for recovery.

In the drying apparatus of the coated film in accordance with the invention, a space with two plates interposed therein is formed between the coating face and the condense plate 30. The solvent is evaporated into the space. The evaporated solvent is then recovered from the condensation face of the condense plate 30. For uniform drying of the coating face, a border layer with no disorders is required to be formed between the coating face and the condense plate 30, to allow uniform material transfer and heat transfer.

Spontaneous heat convection is generally known to inhibit such uniform heat transfer between two planes with different temperatures as in the drying apparatus of coated film in accordance with the invention. Once spontaneous heat convection occurs, the border layer gets unstable, so that the border layer is disordered. Thus, a non-uniform distribution of drying speed occurs. Consequently, the coated film cannot be dried uniformly.

Research works about spontaneous convection have been done traditionally. For example, "Heat Transfer", vol. 1, (1953), Max Jacob, ed. (issued by John Wiley & Sons) describes experimental research works concerning spontaneous convection in various cases. Handbooks for Chemical Engineering (Kagaku Kogaku Binran in Japanese), the revised 6-th edition, edited by Chemical Engineering Association (issued by Maruzen) collectively introduces research works about spontaneous convection.

These relate to spaces interposed with vertical planes, horizontal square planes, slanting planes, horizontal cylindrical face, slanting cylindrical face, and vertical planes therein and spaces interposed with horizontal plain plate therein and the like. As clearly described in these research works, the shape of solid surface has serious influences on heat transfer level.

However, these research works mainly relate to plates or columns simply left to stand in air. Research works about problems concerning two planes one of which is continuously running and including the face coated with a coating fluid as the present subject are not so many in number. Conditions for suppressing spontaneous convection to form uniform border layer are not clearly defined.

Because spontaneous convection is caused by the buoyant force of fluid mass, the ratio of viscosity to buoyant force and the ratio of heat transfer ratio to momentum transfer ratio are important. These can be expressed in non-dimensional numbers according to the following formulas.

$$\text{Rayleigh number}=\text{Grashof number}\times\text{Prandtl number} \quad \text{(Formula 1)}$$

$$\text{Grashof number}=[\text{Heat expansion coefficient}\times(T_1-T_2)\times L^3\times d^2\times g]/\sigma^2 \quad \text{(Formula 2)}$$

$$\text{Prandtl number}=(\text{specific heat}\times\sigma)/\text{heat transfer degree} \quad \text{(Formula 3)}$$

$T_1-T_2$: temperature difference (° C.) between two planes
L: distance (m) between two planes
d: density of fluid ($g/m^3$)
σ: viscosity of fluid (g/m·sec)
g: gravity acceleration ($m/sec^2$)
heat expansion coefficient (1/° C.)
specific heat (J/g·° C.)
heat transfer degree (J/m·sec·° C.)

Generally, the former (Formula 2) is called Grashof number, while the latter (Formula 3) is called Prandtl number. The relation between these values and the occurrence of spontaneous convection is only represented in the form of experimental formula for a specific case. Herein, the value obtained by multiplying these two non-dimensional numerical figures is generally called Rayleigh number.

As a consequence of detailed research works, it was found that by setting the distance between the condense plate and the band-like flexible support, the temperature of the condense plate and the temperature of the coated film in the drying apparatus of coated film in accordance with the invention so that the Rayleigh number be less than 5,000, a coated film with great faces without uneven drying could be obtained irrespective of the solvent type, the shape of the condense plate 30, the angle of arranging the condense plate 30, the running angle of the band-like flexible support 12 and the like.

When individual conditions are set so that the Rayleigh number be less than 2,000, the surface properties of the coated film can further be improved.

The material of the face of the condense plate 30 for condensing the solvent thereon includes for example, but not limited there to, metals, plastics and wood. In case that any organic solvent is contained in the coating fluid, preferably, a material resistant to the organic material is used or the surface of a material is treated by coating.

In dryer 18, the unit for recovering the solvent condensed onto the condense plate 30 is for example constituted by arranging grooves in the condensation face of the condense plate 30 and utilizing capillary force. The direction of the grooves may be the running direction of the band-like flexible support 12 or a direction orthogonal to the direction. In case that the condense plate 30 is slanting, such grooves may be arranged along a direction for easy solvent recovery.

Other than the constitution of using the condense plate 30 as a plate member in the dryer 18, constitutions with similar function such as using porous plate, net structure, slatted drain board, and roll may also be used. Additionally, the recovery apparatus as described in U.S. Pat. No. 5,694,701 may also be used in combination.

Because dryer 18 works to prevent uneven drying of coated film due to the occurrence of spontaneous convection immediately after coating a coated solution, the dryer 18 is preferably arranged as closely as possible to the coating unit 16. Specifically, the inlet of the dryer 18 is arranged at a position preferably within 5 m from the coating unit 16, more preferably within 2 m from the coating unit 16, most preferably within 0.7 m from the coating unit 16.

Due to the same reason, the running speed of the band-like flexible support 12 is such a speed that the band-like flexible support 12 reaches the dryer 18 within preferably 30 seconds, more preferably 20 seconds after the coating with the coating unit 16.

A larger amount of the coating fluid used for coating and larger thickness of the coated film more readily cause unevenness because of the ready occurrence of flow inside the coating fluid. However, in accordance with the invention, sufficient effects can be obtained even when the amount of the coating fluid and the thickness of the coated film are large. When the thickness of the coated film is 0.001 to 0.08 mm, the coated film can be dried highly efficiently without unevenness.

When the running speed of the band-like flexible support 12 is too large, the accompanying air disorders the border layer in the vicinity of the coated film, so that the coated film is adversely affected. Therefore, the running speed of the band-like flexible support 12 is preferably preset to 1 to 100 m/min, more preferably 5 to 80 m/min.

Because the coated film readily gets uneven at an initial drying stage, in particular, the dryer 18 preferably condenses and recovers 10% or more of the solvent in the coating fluid, while the ventilating drying unit 20 dries up the residual coating fluid. On general consideration of the influences on the uneven drying of the coated film, production efficiency and the like, it is determined what percentages of the solvent in the coating fluid may be condensed and recovered. Preferably, 10 to 80% by weight of the solvent is condensed and recovered.

So as to promote the evaporation and condensation of the solvent in the coating fluid, preferably, the band-like flexible support 12 and/or the coated film is heated; the condense plate 30 is cooled; or both the approaches are used. For example, a cooling unit may be arranged on the dryer or a heating unit may be arranged on the opposite side of the dryer 18, while interposing the band-like flexible support 12 therebetween.

In any of the cases, the dryer is preferably temperature-controlled so as to control the drying speed of the coated film. The condense plate 30 may be designed to be temperature-controlled. In case of intending cooling, equipment for cooling may be arranged. For cooling, water-cooling heat exchange mode, air-cooling mode, and electric mode for example a mode using Perche device can be used.

In case of intending heating the band-like flexible support 12 or the coated film or both of them, a heater may be arranged on the side opposite to the coated film for heating. By arranging a transfer roll (heating roll) to be heated, heating can also be done. Additionally, an infrared heater, microwave heating unit and the like may be used for heating.

In determining the temperature of the band-like flexible support 12, the coated film or the condense plate 30, care may be taken in avoiding dewing the evaporated solvent on places except the condense plate 30, for example the surface of the transfer roll. Therefore, such type of dewing can be avoided, for example by elevating the temperature of the parts except the condense plate 30 above the temperature of the condense plate 30.

The distance (interval) between the surface of the coated film and the surface of the condense plate 30 of the dryer 18 may be adjusted to an appropriate distance, taking account of the desired drying speed of the coated film. When the distance is shorter, the drying speed is larger but is more readily influenced by the precision of the preset distance. When the distance is larger, in contrast, the drying speed is not only markedly decreased but also uneven drying occurs due to the occurrence of spontaneous convection with heat.

It is required to determine the distance between the surface of the coated film and the surface of the condense plate 30 of the dryer 18 within a range satisfying the conditions to allow the Rayleigh number to be less than 5,000 as represented by the formula (1). The distance is adjusted within a range of preferably 0.1 to 200 mm, more preferably 0.5 to 100 mm.

Figure 6:
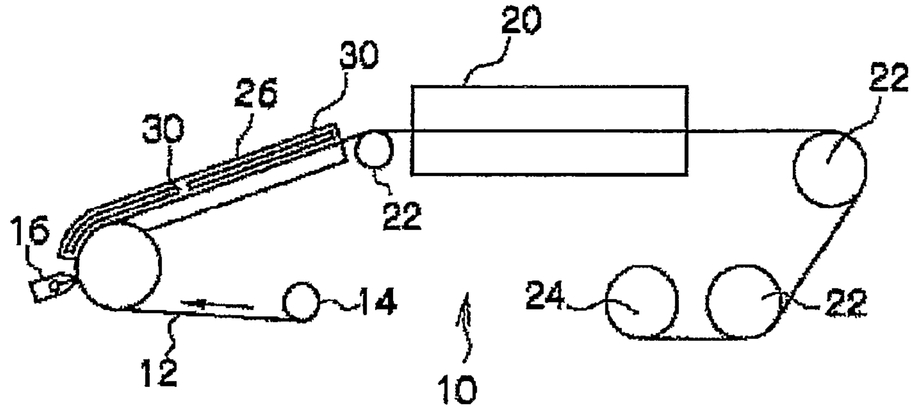
FIG. 6 is a schematic cross-sectional view of a drying apparatus which can be used in accordance with the invention.
Figure 6:
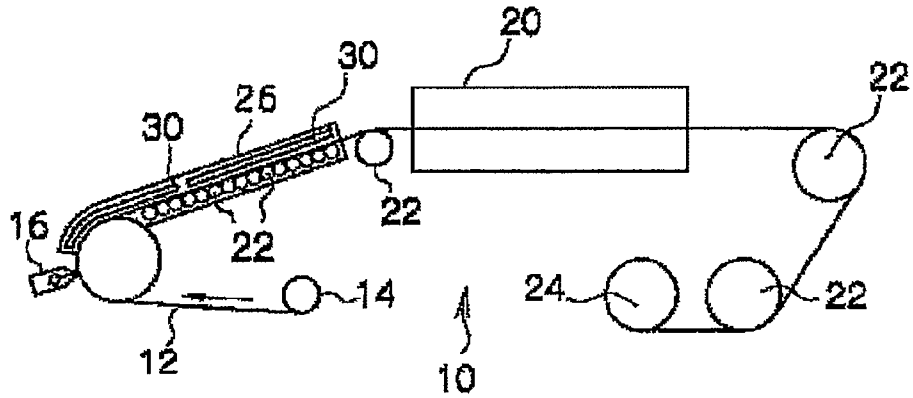

Constitutions of FIG. 5(*b*) and FIG. 6(*b*) are also possible where numerous guide rollers 22, 22, . . . are arranged on the opposite side of the condense plate 30, while interposing the band-like flexible support 12 therebetween. Otherwise, constitutions of FIG. 5(*a*) and FIG. 6(*a*) are also possible, where no guide rollers 22, 22, . . . are arranged.

The dryer 18 is not necessarily linear as shown in FIG. 5. For example, the dryer 18 may be a dryer 26 in an arc shape as shown in FIG. 6. Additionally, the dryer may be arranged on a large drum arranged.

In the examples of FIG. 6, furthermore, the dryer 26 in an arc shape is closely placed to the coating unit 16, to improve the recovery efficiency of the solvent.

As the ventilating drying unit 20, a drying apparatus of roller transfer dryer mode or of air floating dryer mode having been used in the related art can be used. Dryers of any of the modes have a common feature that dry air is fed to the surface of the coated film to dry the coated film.

Figure 7:
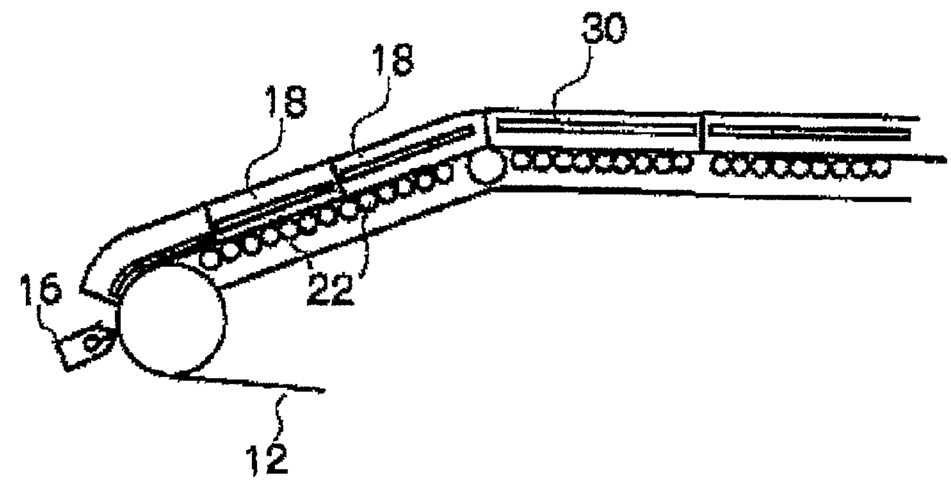
FIG. 7 is a partially enlarged schematic cross-sectional view of a drying apparatus which can be used in accordance with the invention.
Figure 8:
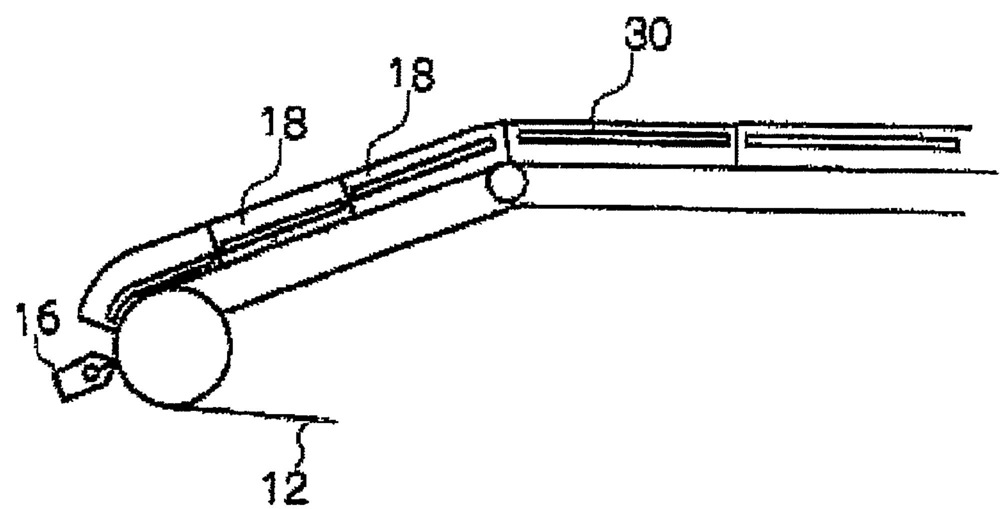
FIG. 8 is a partially enlarged schematic cross-sectional view of a drying apparatus which can be used in accordance with the invention.
Figure 9:
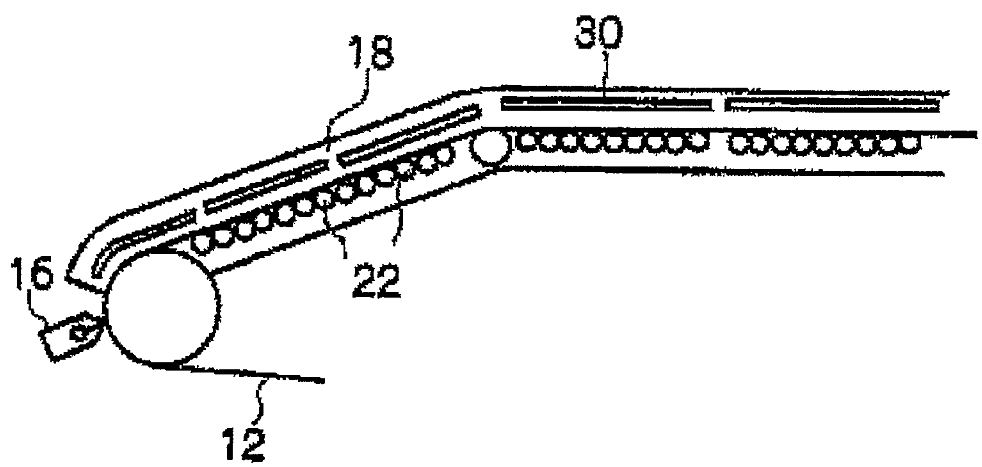
FIG. 9 is a partially enlarged schematic cross-sectional view of a drying apparatus which can be used in accordance with the invention.

A process of drying the coated film with the dryer 18 alone without any ventilating drying unit 20 arranged is also possible. FIGS. 7, 8 and 9 are examples of constitutions for drying the coated film with the dryer 18 alone.

In the example of FIG. 7, the dryer 18 is in a constitution with divided plural zones, where the distance between the condense plate 30 and the coated film changes in a step-wise manner. Additionally, numerous guide rollers 22, 22, . . . are arranged on the opposite side of the condense plate 30, while interposing the band-like flexible support 12 therebetween.

In the example of FIG. 8, the dryer 18 is in a constitution with divided plural zones, where the distance between the condense plate 30 and the coated film changes in a step-wise manner. No guide rollers 22, 22, . . . are arranged.

In the example of FIG. 9, the dryer 18 is in a constitution without divided plural zones, where the distance between the individual condense plates 30 and the coated film is constant. Additionally, numerous guide rollers 22, 22, . . . are arranged on the opposite side of the condense plate 30, while interposing the band-like flexible support 12 therebetween.

Furthermore, routine members are used in the transfer unit 14, guide roller 22, winding unit 24 and the like for use in the coating and drying line 10 having a drying apparatus integrated therein, to which the method for drying coated film and the apparatus therefor in accordance with the invention are applicable. Their descriptions are not included herein.

According to the method for drying coated film and the apparatus therefor in accordance with the invention, unevenness emerging on the coated film immediately after coating can be suppressed to efficiently and more uniformly dry the coated film. Additionally, the formulation of a coating fluid and the unit thereof can be designed more flexibly, without any great modification of coating and drying steps and under no limitation by the physico-chemical properties of the coating fluid and the type of the solvent.

The method for drying coated film and the apparatus therefor in accordance with the invention are effective for energy saving and cost reduction. Because among evaporating gas generated on the coating and drying line, a solvent except water cannot be released as it is into atmosphere, the evaporating gas, may be liquefied and recovered, indispensably. Therefore, equipment for recovering such solvent gas is needed in that case. However, solvents can be directly recovered at their liquefied state with a dryer for condensing and recovering a part of coating fluid on the coating and drying line 10. Therefore, no cost for such equipment for recovering solvent gas can be needed.

[Substrate Supporting Optically Anisotropic Layer]

The optically anisotropic sheet comprises a substrate supporting the optically anisotropic layer. The substrate is preferably glass or a transparent polymer film. The substrate preferably has a transmission (at 400 to 700 nm) of 80% or higher and a haze of 2.0% or less. More preferably, the transmission is 86% or higher, while the haze is 1.0% or less. Examples of the polymer composing the polymer film include cellulose ester (for example, mono- to tri-acylated cellulose), norbornene-based polymers and polymethyl methacrylate. Commercially available polymers (Arton and Zeonex, both under trade names as norbornene-based polymers) may also be used. As described in the readily causing birefringence such as polycarbonate and polysulfone may also be used in the optical film of the invention, when the molecules of the polymers are modified to control the occurrence of birefringence.

[Cellulose Acylate Film]

As the substrate, cellulose acylate film is preferable. The cellulose for use as a raw material of the cellulose acylate film includes for example cotton linter, kenaf and wood pulp (broad-leaved tree pulp and conifer pulp). Cellulose ester obtained from any type of the raw material cellulose may be used. In some case, these types of celluloses may be mixed together for use. In accordance with the invention, cellulose is esterified to prepare cellulose acylate, however, the particularly preferable types of celluloses described above cannot be used as they are. Linter, kenaf and pulp are preliminarily purified for use.

In accordance with the invention, cellulose acylate means carboxylate esters in which the cellulose has a total of 2 to 22 carbon atoms.

The acyl group with 2 to 22 carbon atoms in the cellulose acylate for use in accordance with the invention may be aliphatic acyl group and aromatic acyl group but not limited thereto. The acryl group includes for example alkylcarbonyl ester of cellulose, alkenylcarbonyl ester thereof, cycloalkylcarbonyl ester thereof or aromatic carbonyl ester thereof or aromatic alkylcarbonyl ester thereof. Additionally, these may individually have substituted groups. Such preferable acyl group includes for example acetyl, propionyl, butanoyl, heptanoyl, hexanoyl, octanoyl, cyclohexanecarbonyl, adamantancarbonyl, phenylacetyl, benzoyl, naphthylcarbonyl, (meth)acryloyl, and cinnamoyl groups. Among them, more preferable acyl groups are acetyl, propionyl, butanoyl, pentanoyl, hexanoyl, cyclohexanecarbonyl, (meth)acryloyl and phenylacetyl.

The method for synthetically preparing cellulose acylate is described in detail in the Japan Institute of Invention and Innovation, Journal of Technical Disclosure, No. 2001-1745 on page 9 (issued on Mar. 15, 2001 by the Japan Institute of Invention and Innovation).

In the cellulose acylate preferable for use in accordance with the invention, the substitution degree of hydroxyl groups in cellulose satisfies the following formulas (1) and (2). Formula (1): $2.3 \leqq SA'+SB' \leqq 3.0$; Formula (2): $0 \leqq SA' \leqq 3.0$.

Herein, SA' means the substitution degree of hydrogen atoms with acetyl group in the hydroxyl groups in cellulose; and SB' means the substitution degree of hydrogen atoms with acyl group having 3 to 22 carbon atoms in the hydroxyl groups in cellulose. Herein, SA represents acetyl group substituting the hydrogen atoms of the hydroxyl groups in cellulose. SB represents acyl group having 3 to 22 carbon atoms, which substitutes the hydrogen atoms in the hydroxyl groups in cellulose.

The β-1,4-glucose unit composing cellulose contains free hydroxyl groups at positions 2, 3 and 6. Cellulose acylate is a polymer prepared by the esterification of a part or the whole of these hydroxyl groups with acyl group. The substitution degree with acyl group means the ratio of esterified cellulose at each of the positions 2, 3 and 6 (100% esterification at each of the positions % is defined as substitution degree 1). In accordance with the invention, the total sum (SA'+SB') of the substitution degrees of SA and SB is more preferably 2.6 to 3.0, particularly preferably 2.80 to 3.00. Additionally, the substitution degree of SA (SA') is more preferably 1.4 to 3.0, particularly preferably 2.3 to 2.9.

Furthermore, preferably, the following formula (3) is simultaneously satisfied. Formula (3): $0 \leqq SB'' \leqq 1.2$. Herein, SB" means an acyl group with 3 or 4 carbon atoms, which substitutes the hydrogen atoms in the hydroxyl groups of cellulose.

Furthermore, 28% or more of SB" is preferably a substituent of the hydroxyl group at position 6. More preferably, 30% or more of SB" is a substituent of the hydroxyl group at position 6. Still more preferably, 31% or more of SB" is a substituent of the hydroxyl group at position 6. Particularly preferably, 32% or more of SB" is a substituent of the hydroxyl group at position 6. Still additionally, a cellulose acylate film with a total of the substitution degrees of SA' and SB" at position 6 in cellulose acylate being 0.8 or more, preferably 0.85 or more and particularly preferably 0.90 or more is preferable. These cellulose acylate films can allow the preparation of a solution with preferable solubility, particularly the preparation of a suitable solution in a non-chlorine-based organic solvent.

Herein, the substitution degree can be calculated and determined by measuring the binding degree of fatty acids bound to the hydroxyl groups in cellulose. The measurement is done according to ASTM-D817-91 and ASTM-D817-96. Additionally, the state of the substitution of the hydroxyl groups with acyl group can be measured by $^{13}C$ NMR.

The cellulose acylate film is preferably composed of cellulose acylate in which the polymer components composing the film can substantially satisfy the formulas (1), (2) and (3). The term "substantially" means 55% by weight or more (preferably 70% by weight, more preferably 80% by weight) of all the polymer components. The cellulose acylate may be of a single type or of combined type of two or more.

The viscosity average polymerization degree (DP) of the cellulose acylate is preferably 250 or more, more preferably 290 or more. Additionally, the cellulose acylate has a narrow molecular weight distribution (Mw/Mn; Mw means weight average molecular weight while Mn means number average molecular weight) by gel permeation chromatography. Specifically, the value of Mw/Mn is preferably 1.0 to 5.0, more preferably 1.0 to 3.0.

In case that a polymer film is to be used in an optical compensatory sheet, the polymer film preferably has a desired retardation value. In the specification, Re(λ) and Rth (λ) of a polymer film respectively mean an in-plane retardation and a retardation in a thickness-direction at wavelength λ. The Re(λ) is measured by using KOBRA-21ADH (manufactured by Oji Scientific Instruments) for an incoming light of a wavelength λ nm in a direction normal to a film-surface. The Rth(λ) is calculated by using KOBRA-21ADH based on three retardation values; first one of which is the Re(λ) obtained above, second one of which is a retardation which is measured for an incoming light of a wavelength λ nm in a direction rotated by +40° with respect to the normal direction of the film around an in-plane slow axis, which is decided by KOBRA 21ADH, as an a tilt axis (a rotation axis), and third one of which is a retardation which is measured for an incoming light of a wavelength λ nm in a direction rotated by −40° with respect to the normal direction of the film around an in-plane slow axis as an a inclining axis (a rotation axis); a hypothetical mean refractive index and an entered thickness value of the film. The mean refractive indexes of various materials are described in published documents such as "POLYMER HANDBOOK" (JOHN WILEY&SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethylmethacrylate (1.49), polystyrene (1.59).

When the hypothetical mean refractive index and a thickness value are put into KOBRA 21ADH, nx, ny and nz are calculated. And Nz, which is equal to (nx−nz)/(nx−ny), is calculated based on the calculated nx, ny and nz.

In accordance with the invention, the substrate preferably has optically negative birefringence.

The retardation value of polymer film has a preferable range, which varies depending on the liquid crystal cell for which the optically compensatory film is used and the way of use thereof. Preferably, however, the Re retardation value is adjusted within a range of 0 to 200 nm, while the Rth retardation value is adjusted within a range of 0 to 400 nm. In case that two optically anisotropic layers are to be used in a liquid crystal display device, the Rth retardation value of the polymer film is preferably within a range of 70 to 250 nm. In case that one optically anisotropic layer is to be used in a liquid crystal display device, the Rth retardation value of a substrate is preferably within a range of 150 to 400 nm. Additionally, the birefringence value (Δn: nx−ny) of the substrate film is preferably within a range of 0 to 0.020. Additionally, the birefringence value [(nx+ny)/2−nz] of the cellulose acetate film along the thickness direction is preferably within a range of 0 to 0.04.

So as to adjust the retardation of polymer film, it is general to give outer force such as stretching. Additionally, in some case, a retardation-increasing agent to adjust optical anisotropy is added. So as to adjust the retardation of the cellulose acylate film, preferably, an aromatic compound with at least two aromatic rings is used as the retardation-increasing agent. The aromatic compound is preferably used within a range of 0.01 to 20 parts by weight to 100 parts by weight of the cellulose acylate. Further, such aromatic compounds of two or more types may be used in combination. The aromatic ring of the aromatic compound contains an aromatic hetero-ring in addition to the aromatic hydrocarbon ring. For example, such compounds are described in the specification of European Patent 0 911 656A2, the official gazettes of JPA-2000-111914 and JPA-2000-275434, and the like.

The additive to be added to the polymer film or additives to be possibly added in a manner dependent on the various purposes (for example, ultraviolet-preventing agent, release agent, antistatic agent, deterioration-preventing agent (for example, antioxidant, decomposing agent of peroxides, radical prohibitor, metal-inactivating agent, acid-capturing agent, amine, infrared absorbent, etc.)) may be in solid or in oily matter. In case that the film is formed of multiple layers, the types and amounts of additives to be added in the individual layers may be variable. Materials described in detail in the Japan Institute of Invention and Innovation, Journal of Technical Disclosure, No. 2001-1745 on pages 16 to 22 (issued on Mar. 15, 2001 by the Japan Institute of Invention and Innovation) are preferably used. The amounts of these additives to be used are not specifically limited, when the function can be exerted at that amounts. Preferably, the additives are appropriately used within a range of 0.001 to 25% by weight in the total composition of the polymer film.

[Method for Producing Polymer Film]

Polymer film is preferably produced by solvent cast process. By the solvent cast process, a solution (dope) prepared by dissolving polymer materials in an organic solvent is used to produce the film.

The dope is cast on a drum or a band, from which the solvent is evaporated to form the film. The dope before casting is preferably adjusted to a concentration of 18 to 35% of the solid content. Preferably, the surface of the drum or band is preliminarily finished to a mirror state. The dope is preferably cast on the drum or band with a surface temperature of 10° C. or less. After casting, the dope is dried in air for 2 seconds or more. The resulting film is peeled off from the drum or band and may further be dried in hot air at a stepwisely changing temperature of 100 to 160° C. to evaporate the residual solvent. The process described above is described in the official gazette of JP-B-5-17844. According to the method, the time period required from the casting to the peeling off can be shortened. So as to carry out the process, the dope is required to be gelled at the surface temperature of the drum or band at the time of casting.

At the casting step, one type of a cellulose acylate solution may be cast in monolayer, or two or more types of cellulose acylate solutions may simultaneously or sequentially be cast. The method for co-casting multiple cellulose acylate solutions in two layers or more includes for example a process of individually casting solutions each containing cellulose acylate from multiple casting ports arranged at an interval along the running direction of the substrate for lamination (for example, the process described in the official gazette of JPA No. hei 11-198285), a process of casting cellulose acylate solutions from two casting ports (the process described in the official gazette of JPA No. hei 6-134933), and a process of wrapping the flow of a highly viscous cellulose acylate solution with a cellulose acylate solution at a low viscosity and then simultaneously extruding the highly viscous cellulose acylate solution and the cellulose acylate solution at the low viscosity (the process described in the official gazette of JPA No. sho 56-162617). In accordance with the invention, the method is not limited to them. The fabrication steps of these solvent cast processes are described in detail in Japan Institute of Invention and Innovation, Journal of Technical Disclosure, No. 2001-1745 on pages 22 to 30 (issued on Mar. 15, 2001 by the Japan Institute of Invention and Innovation). The fabrication steps are classified in to dissolution, casting (including co-casting), metal supporting, drying, peeling off and elongation.

The thickness of the film of the invention is preferably 15 to 120 μm, more preferably 30 to 80 μm.

[Characteristic Properties of Polymer Film]

[Hygroscopic Expansion Coefficient of Film]

Still additionally, the hygroscopic expansion coefficient of the cellulose acylate film for use in the optical compensatory sheet of the invention is preferably adjusted to $30\times10^{-5}$/% RH or less. The hygroscopic expansion coefficient is preferably adjusted to $15\times10^{-5}$/% RH, or/smaller more preferably $10\times10^{-5}$/% RH or smaller. Additionally, a smaller hygroscopic expansion coefficient is preferable, however, the hygroscopic expansion coefficient is generally $1.0\times10^{-5}$/% RH or larger. Hygroscopic expansion coefficient represents the change in length of a sample at a constant temperature, while the relative moisture is changed. By adjusting the hygroscopic moisture coefficient, the increase of the transmission in a frame-like form (optical leak due to distortion) can be prevented while the optically compensatory function of the optical compensatory sheet is maintained. The method for measuring the hygroscopic expansion coefficient is described below. A sample of a 5-mm width and a 20-mm length was scissored out. By fixing one of the ends, the sample was suspended in atmosphere of 25° C. and 20% RH (R0). By attaching a 0.5-g weight onto the other end, the sample was left as it was for 10 minutes, to measure the length (L0). Then, the moisture was adjusted to 80% RH (R1), while the temperature remained at 25° C., to measure the resulting length (L1). The hygroscopic expansion coefficient was calculated by the following formula. 10 samples out of one film were measured, to determine the average. The average value was used. Hygroscopic expansion coefficient [/% RH]=[(L1−L0)/L0]/(R1−R0)

So as to decrease the dimensional change of the polymer film due to hygroscopicity, a compound with hydrophobic groups or a particle or the like is preferably added. As the compound with hydrophobic groups, such compound materials among appropriate plasticizers with hydrophobic groups such as aliphatic groups or aromatic groups or deterioration-preventing agents are particularly preferably used. The amount of such compound to be added is preferably within a range of 0.01 to 10% by weight of the prepared solution (dope). Additionally, making the free volume in the polymer film smaller suffices. Specifically, the free volume is smaller, when the amount of the residual solvent is less at the time of filming according to the solvent cast method described below. Preferably, drying is done under conditions to allow the amount of the residual solvent to be within a range of 0.01 to 1.00% by weight in the cellulose acylate film.

[Dynamic Properties of Film]

(Mechanical Properties of Film)

The curl value of the polymer film along the width direction for use in accordance with the invention is preferably −7/m through +7/m. When the curl value of a transparent protective film along the width direction is within the range described above for a long and wide polymer film, preferably, no disadvantage in film handling or no film break occurs or no dust from the strong contact of the film to transfer roll at the film edge or center or no contaminant deposition onto the film emerges, so that the frequency of point defects or coating streak on the optical compensatory sheet of the invention never exceeds the acceptable value. At the curl value, additionally, air permeation can be prevented at the time of attaching polarizing film, preferably.

The curl value can be measured according to the measurement method defined by the American National Standards Institute (ANSI/ASCPH1.29-1985).

The amount of the residual solvent in the polymer film for use in accordance with the invention is preferably adjusted to 1.5% by weight or less, to suppress curls. The amount thereof is more preferably adjusted to 0.01 to 1.0% by weight. This may be mainly because the free volume becomes smaller when the amount of the residual solvent at the time of filming by the film fabrication method by solution casting is less.

The tear propagation strength of the cellulose acylate film is preferably 2 g or more as measured according to the tear propagation method of JIS K-7128-2:1998 (Elmendorf tear propagation method). In that case of the film thickness described above, the film strength can be retained sufficiently. More preferably, the tear propagation strength is 5 to 25 g. Still more preferably, the tear propagation strength is 6 to 25 g. On a 60-μm basis, the tear propagation strength is preferably 8 g or more, more preferably 8 to 15 g. Specifically, the tear propagation strength of a sample piece of 50 mm×64 mm can be measured with a tester of tear propagation strength under a mild load, after the moisture thereof is adjusted under conditions of 25° C. and 65% RH for 2 hours.

Additionally, the tear scratching strength thereof is preferably 2 g or more, more preferably 5 g or more and particularly preferably 10 g or more. By adjusting the tear scratching strength to the range, the damage resistance of the film surface and handling properties thereof can be retained without any problem. The tear scratching strength can be examined by scratching the surface of the transparent protective film using a sapphire needle with a conical top angle of 90° and a tip radius of 0.25 m and then determining the load (g) by which a scratched mark which can be visually confirmed is made.

(Equilibrated Water Content Ratio of Film)

The equilibrated water content ratio of the cellulose acylate film of the invention is preferably 0 to 4% by weight at 250 and 80% RH irrespective of the film thickness, so as to avoid the deterioration of the adhesion to water-soluble polymers such as polyvinyl alcohol when the resulting sheet with the optically compensatory layer is to be used as a transparent protective film for one of polarizing plates. The equilibrated water content ratio is preferably 0.1 to 3.5% by weight, particularly preferably 1 to 3% by weight. When the equilibrated water content ratio is equal to the upper limit described above or smaller, the dependency of the retardation on the moisture change is never increased too much when the cellulose acylate film is used as a transparent protective film of polarizing plates.

The water content ratio was measured by the Karl Fisher's method, using a sample of 7 mm×35 mm from the cellulose acylate film of the invention with a moisture meter "CA-03" and a sample drying apparatus "VA-05" (both manufactured by Mitsubishi Chemical Corporation). The water content ratio is calculated by dividing water content (g) with sample weight (g).

(Water-Vapor Permeability of Film)

The water-vapor permeability of the cellulose acylate film of the invention is measured under conditions of a temperature of 60° C. and a humidity of 95% RH according to a JIS standard of JIS Z-0208, which is then converted on a 80-μm film thickness basis. The water-vapor permeability is within a range of preferably 400 to 2,000 g/m$^2$·24 H, more preferably 500 to 1,800 g/m$^2$·24 H and particularly preferably 600 to 1,600 g/m$^2$·24 H. When the water-vapor permeability is equal to the upper limit or less, the absolute value of the moisture dependency of the retardation value of the film less frequently exceeds 0.5 nm/% RH, which is preferable. In the optically compensatory film prepared by laminating an optically anisotropic layer on the cellulose acylate film of the invention, the absolute values of the moisture dependency of the Re value and the Rth value less frequently exceed 0.5 nm/% RH, which is preferable. In case that a polarizing plate with such optical compensatory sheet is integrated in a liquid crystal display device, disadvantages such as color change or the decrease of the angle of viewing field scarcely occur, which is preferable. When the water-vapor permeability is equal to the lower limit or more, alternatively, disadvantages such as the induction of poor adhesion because of the suppression of the drying up of adhesives with the cellulose acylate film, scarcely emerge in case that the film is to be attached onto both the faces of the polarizing film to prepare a polarizing plate.

When the film thickness of the cellulose acylate film is larger, the water-vapor permeability gets smaller. When the film thickness is smaller, the water-vapor permeability gets larger. Therefore, samples of any film thickness may be converted on a basis of the standard 80 μm. The conversion of film thickness is done by the formula:

(water-vapor permeability on an 80-μm basis=actually measured water-vapor permeability×actually measured film thickness in μm/80 μm).

The water-vapor permeability can be measured by the methods described in "Polymer properties II", [Kobunshi Jikken Koza (Experimentals and Lectures of Polymers 4), Kyoritu Shuppan] on pages 285 to 294 entitled Measuring Vapor Permeation (including weight method, thermometer method, vapor pressure method, and adsorption method). The cellulose acylate film sample of 70 mmϕ was moisture-adjusted at 25° C. and 90% RH, and at 60° C. and 95% RH for 24 hours, respectively to calculate the water content per unit area with a permeability tester ("KK-709007", manufactured by Toyo Seiki Seisakusho, Ltd.) according to JIS Z-0208, to determine the permeability according to the formula:

permeability=weight after moisture adjustment−weight before moisture adjustment.

[Surface Treatment of Polymer Film]

Preferably, the surface of the polymer film is treated. Surface treatment includes for example corona discharge process, glow discharge process, fire flame process, acid process, alkali process and ultraviolet irradiation process. The details of them are described in the Japan Institute of Invention and Innovation, Journal of Technical Disclosure, No. 2001-1745 on pages 30 to 32. Among them, alkali saponification process is particularly preferable and is very effective as the surface treatment of the cellulose acylate film.

Alkali saponification process may be done by any of immersion process in saponification solutions or coating process with saponification solution, but the coating process is preferable. The coating process includes for example dip coating, curtain coating, die coating (extrusion coating, slide coating, extrusion coating), gravure coating and bar coating. The alkali saponification solution includes for example potassium hydroxide solution and sodium hydroxide solution. The concentration of hydroxyl ion is preferably within a range of 0.1 to 3.0 N. Furthermore, the alkali solution may contain a solvent with great wettability of the film (for example, isopropyl alcohol, n-butanol, methanol, ethanol, etc.), surfactant, and moistening agent (for example, diols, glycerin, etc.), so that the wettability of the transparent substrate with the saponification solution, the stability of the saponification solution over time and the like are improved. Specifically, descriptions in for example, JPA No. 2002-82226, the publication of WO 02/46809. and JPA No. 2003-43673 are listed.

Instead of surface treatment, the following processes are listed: a monolayer process of coating an underlining coating layer in addition to the surface treatment (as described in the official gazette of JPA No. hei 7-333433) or of coating only one layer of a resin layer such as gelatin containing both a hydrophobic group and a hydrophilic group; and a so-called lamination process (described in for example the official gazette of JPA No. hei 11-248940) of arranging a layer highly adhering to the polymer film as a first layer (abbreviated as first underlining coating layer hereinbelow) and then coating a hydrophilic resin layer of gelatin highly adhering to the alignment layer as a second layer (abbreviated as second underlining coating layer hereinbelow).

The optical compensatory sheet of the present invention can be used for optical compensations of liquid crystal displays employing various modes. Especially, the optical compensatory sheet comprising the optically anisotropic layer having the Re of 40 nm or more, the Re(40)/Re ratio of less than 2.0 and the Re(−40)/Re ratio of 0.40 or more, provided that the retardation value of the optically anisotropic layer as measured along the film normal direction is defined as Re, the retardation value thereof as measured in the face orthogonal to the film including the orientation direction, along a direction rotating by +40° from the film normal line is defined as Re(40) and the retardation value thereof as measured in the face orthogonal to the film including the orientation direction, along a direction rotating by −40° from the film normal line is defined as Re(−40), is effective for a liquid crystal display employing a TN-mode, OCB-mode, a VA-mode or the like. The optical compensatory sheet having such optical properties can be produced by preparing the optically anisotropic layer by using polymer A or polymer C and D in an appropriate amount to control tilt angles of the molecules of the liquid crystal The optical compensatory sheet may be set in a liquid crystal display as a single member. Being integrated into a polarizing plate, the optical compensatory sheet may be set in a liquid crystal display as a member of a polarizing plate. The polarizing plate comprising the optical compensatory sheet of the present invention may have not only a polarization ability but also an ability of improving viewing angle. Using the polarizing plate comprising the optical compensatory sheet as a protective film of a polarizing film also contributes to reducing the thickness of the liquid crystal display.

Next, the polarizing plate comprising the optical compensatory sheet of the present invention will be described in detail.

[Polarizing Plate]

A polarizing plate generally comprises a linear polarizing film and a protective film thereof.

The linear polarizing film may be selected from coating-type polarizing films as typified by Optiva Inc., iodine-based polarizing films and dichroic-dye based polarizing films. Iodine or dichroic dye molecules are oriented in binder so as to have a polarizing capability. Iodine or dichroic dye molecules may be oriented along with binder molecules, or iodine molecules may aggregate themselves in the same manner of liquid crystal and be aligned in a direction.

Generally, commercially available polarizing films are produced by soaking a stretched polymer film in a solution of iodine or dichroic dye and impregnating the polymer film with molecules of iodine or dichroic dye.

Generally, molecules of iodine or dichroic dye may enter into a polymer film from the surface of the film and may be dispersed in the area about 4 μm in thickness from the surface of the film (about 8 μm in thickness from both of two surfaces of the film) And in order to obtain sufficient polarizing ability, it is required to use a polarizing film having a thickness not less than 10 μm. The penetrance degree can be adjusted within a preferred range by iodide or dichroic dye concentration of the solution, temperature of the solution or soaking time.

As described above, the thickness of the polymer film is desirably not less than 10 μm. From the viewpoint of lowering light leakage from a liquid-crystal display, the polymer film having a less thickness is preferred. The thickness of is not greater than those of commercially available polarizing films (about 30 μm), more desirably not greater than 25 μm and much more desirably not greater than 20 μm. When a polarizing film having a thickness not greater than 20 μm is used in a 17-inch liquid-crystal display, no light leakage may be observed.

The polarizing film may comprise crosslinked binder. Self-crosslinkable polymers may be used as binder. The polarizing film may be produced by carrying out reaction between functional groups of polymer with light, heat or variation of pH. Crosslinking agents may be used.

Generally, crosslinking reactions may be carried out by heating a coating liquid comprising polymer or a mixture of polymer and a crosslinking agent after being applied to a substrate. The heating step may be carried out at any time by the end of the process for producing the polarizing film as long as a final product having good durability can be obtained.

Any polymers capable of crosslinking themselves or being crosslinked by a crossling agent may be used as binder of the polarizing film. Examples of the polymer used as the binder include polymethyl methacrylate, polyacrylic acid, polymethacrylic acid, polystyrene, gelatin, polyvinyl alcohol, modified polyvinyl alcohol, poly(N-methylol acrylamide), polyvinyl toluene, polyethylene chrolosulfonated, nitrocellulose, polyolefin chloride (for example, polyvinyl chloride), polyester, polyimide, polyvinylacetate, polyethylene, carboxymethyl cellulose, polypropylene, polycarbonate and copolymers thereof (for example, acrylic acid/methacrylic acid copolymer, styrene/maleimide copolymer, styrene/vinyl toluene copolymer, vinyl acetate/vinyl chloride copolymer, ethylene/vinyl acetate copolymer). Among these, water-soluble polymers such as poly methylol acrylamide, carboxymethyl cellulose, gelatin, polyvinyl alcohol and modified polyvinyl alcohol are preferred; gelatin, polyvinyl alcohol and modified polyvinyl alcohol are more preferred; and polyvinyl alcohol and modified polyvinyl alcohol are much more preferred.

The saponification degree of the polyvinyl alcohol or modified polyvinyl alcohol is desirably from 70 to 100%, more preferably from 80 to 100% and much more preferably from 95 to 100%. The polymerization degree of the polyvinyl alcohol is desirably from 100 to 5000.

Modified polyvinyl alcohols can be prepared by carrying out polymerization modification, chain transfer modification or block polymerization modification to introduce modification groups into polyvinyl alcohols. According to the polymerization modification, COONa, $Si(OH)_3$, $N(CH_3)_3$.Cl, $C_9H_{19}COO$, $SO_3Na$, $C_{12}H_{25}$ or the like can be introduced into polyvinyl alcohols. According to the chain transfer modification, COONa, SH, $SC_{12}H_{25}$ or the like can be introduced into polyvinyl alcohols. The polymerization degree of the modified polyvinyl alcohol is desirably from 100 to 3000. the modified polyvinyl alcohols are described in JPA No. hei 8-338913, JPA NO. hei 9-152509 and JPA No. hei 9-316127 号.

Unmodified polyvinyl alcohols having a saponification degree of 85 to 95% and alkylthio-modified polyvinyl alcohols are especially preferred.

One or plural types of polyvinyl alcohol or modified polyvinyl alcohols may be used.

The amount of the crosslinking agent is desirably from 0.1 to 20 wt % and more desirably from 0.5 to 15 weight % with respect to the weight of binder. When the amount falls within the range, good alignment ability and good moisture-heat resistance can be obtained.

The polarizing films may contain some amount of unreacted crosslinking agents after end of crosslinking reaction. The amount of residual crosslinking agent in the polarizing film is desirably not greater than 1.0 wt % and more desirably not greater than 0.5 wt %. When the amount falls within the range, the polarization degree may not lower even if the polarizing film is used for a long period or is left under a high-humidity and high-temperature atmosphere for a long period.

Examples of the crosslinking agent are described in U.S. reissued Pat. No. 23,297. Boron compounds such as boric acid or pyroborate can be used as a crosslinking agent.

Examples of dichroic dye include azo dyes, stilbene dyes, pyrazolone dyes, triphenylmethane dyes, quinoline dyes, oxazine dyes, thiazine dyes and anthraquinone dyes. The dichroic dye is desirably selected from water-soluble dyes. The dichroic dye desirably has a hydrophilic group such as sulfo, amino or hydroxy.

Specific examples of dichroic dyes include C. I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, C.I. Acid Red 37. the dichroic dyes are described in JAP No. hei 1-161202, JPA No. hei 1-172906, JPA No. hei 1-172907, JPA No. hei 1-183602, JPA No. hei 1-248105, JPA No. hei 1-265205 and JPA No. hei 7-261024. The dichroic dyes may be used as free acid or as salt such as alkali salt, ammonim salt or amine salt. For the purpose of preparing dichroic molecules having various hues, two or more kinds of these dichroic dyes may be blended.

For improving grayscale of LCD, it is preferred that the polarizing plate has a high transmittance, and it is also preferred that the polarizing plate has a high polarization degree. The transmittance at 550 nm of the polarizing plate is desirably from 30 to 50%, more desirably from 35 to 50%, and much more desirably from 40 to 50%. The polarization degree at 550 nm is desirably from 90 to 100%, more desirably from 95 to 100% and much more desirably from 99 to 100%.

The polarizing film and the optically anisotropic layer, or the polarizing film and the alignment layer, may be bonded to each other with an adhesive agent. As an adhesive agent, solutions of polyvinyl alcohols (including modified polyvinyl alcohol having acetoacetyl, sulfonic acid, carboxyl or oxyalkylene group), boric compounds or the like can be used. Among these, polyvinyl alcohol solutions are preferred. The thickness of the layer of the adhesive agent is desirably from 0.001 to 10 μm and more desirably from 0.05 to 5 μm after drying.

(Production of a Polarizing Plate)

From the viewpoint of yields, polarizing films are desirably produced by stretching polymer films in a direction 10 to 80 degree tilted with respect to a long direction (MD direction) of the polarizing films, or in other words according to stretching method. Polarizing films are also desirably produced by staining polymer films with iodine or dichroic dye, or in other words according to rubbing method. Generally, the tilt angle is 45 degree, but, the tilt angle is not limited to 45 degree in transmissive, reflective or semi-transmissive liquid-crystal displays which have been provided recently. And thus, the stretching direction may be set depending on designs of LCD.

According to the stretching method, the stretching ratio is desirably from 2.5 to 3.0 and more desirably from 3.0 to 10.0. The stretching process may be carried out under dried atmosphere, pr in other words according to a dry stretching. Or the stretching process may be carried out while being dipped in water, or in other words according to a wet stretching. For the dry stretching, the stretching ratio is desirably from 2.5 to 5.0, and for the wet stretching, the stretching ratio is desirably from 3.0 to 10.0. The stretching process may be divided into plural steps including an obliquely stretching step. Dividing into plural steps, it is possible to stretch uniformly even if the stretching ratio is high. Before an obliquely stretching step, a stretching in a width-direction or a stretching in a length-direction may be carried out slightly (with a degree preventing shrinkage in a width direction).

A tenter stretching employing a biaxial-stretching may be carried out at a left side and a right side respectively. The biaxial-stretching may be carried out according to a usual film formation process.

For a biaxial stretching, a left side and a right side of a film is stretched at a different ratio respectively, and, thus, the film may be required to have different thicknesses at the left and right sides respectively before being stretched. According to a flow-casting method, it is possible to give a difference in a flowing amount of a binder solution at a left side and a right side by forming a taper on a die.

As described above, a binder film stretched obliquely in a direction 10 to 80 degree tilted with respect to the MD direction of a polarizing film.

In the rubbing method, various rubbing treatments employed in alignment treatments of LCDs may be applied. Namely, the rubbing treatment may be carried out by rubbing the surface of a polymer film with a paper, a gauze, a felt, a rubber, a nylon fiber, polyester fiber or the like in a direction. Usually, the rubbing treatment may be carried out by rubbing a polymer film with a fabric in which fibers having a uniform length and line thickness are implanted averagely at several times. The rubbing treatment is desirably carried out with a rubbing roll having circularity, cylindricality and a deviation (a roundness deviation) of not greater than 30 μm. The lap angle of the rubbing roll with respect to the film is desirable set from 0.1 to 90°. As described in JPA No. hei 8-160430, lapping around 360° or more may brig about stabilities in rubbing treatments.

When a long film is subjected to a rubbing treatment, it is preferred that the long film is conveyed at a ratio of 1 to 100 m/min under a certain tension by a transportation apparatus. It is preferred that the rubbing roll is supported rotatably with respected to the conveying direction of the film for allowing a rubbing angle to be set to various angles. The rubbing angle is desirably set within a range from 0 to 60°, more desirably from 40 to 50° and much more desirably 45°.

A polymer film is desirably formed on the opposite surface of the polarizing film, on which no optically anisotropic layer is disposed, or in other words a disposition of an optically anisotropic layer, a linear polarizing film and a polymer film is preferred.

The preferred optical properties of the optical compensatory sheet of the present invention may vary depending on the applications, for example, depending on what a kind of mode the liquid crystal cell to be optically compensated by the sheet has. Generally, it is preferred that Re of the optically anisotropic layer is from 0 to 70 nm, and more preferred that the Re is from 20 to 70 nm. And, generally, it is preferred that Rth of the optically an isotropic layer is from 50 to 400 nm, and more preferred that the Rth is from 100 to 400 nm. The optically anisotropic layer having such optical properties may be produced by aligning discotic liquid crystal molecules in a hybrid-alignment state with a minimum tilt angle of 0 to 90° (preferably of 0 to 60°) and a maximum tilt angle of 30 to 90° (preferably of 50 to 90°). It is preferred that the Re of the substrate supporting the optically anisotropic layer is from 0 to 70 nm, and more preferred that the Re is from 0 to 50 nm; and it is preferred that the Rth of the substrate supporting the optically anisotropic layer is from 10 to 400 nm, and more preferred that the Re is from 40 to 250 nm. These ranges are one preferred examples, and the optical properties of the optical compensatory sheet of the present invention are not limited to the above ranges.

In the specification, Re(λ) and Rth(λ) of an optical compensatory sheet (or optically anisotropic layer), respectively mean an in-plane retardation and a retardation in a thickness-direction at wavelength λ. The Re(λ) is measured by using KOBRA-21ADH (manufactured by Oji Scientific Instruments) for an incoming light of a wavelength λ nm in a direction normal to a film-surface. The Rth(λ) is calculated by using KOBRA-21ADH based on three retardation values; first one of which is the Re(λ) obtained above, second one of which is a retardation which is measured for an incoming light of a wavelength λ nm in a direction rotated by +40° with respect to the normal direction of the film around an in-plane slow axis, which is decided by KOBRA 21ADH, as an a tilt axis (a rotation axis), and third one of which is a retardation which is measured for an incoming light of a wavelength λ nm in a direction rotated by −40° with respect to the normal direction of the film around an in-plane slow axis as an a inclining axis (a rotation axis); a hypothetical mean refractive index and an entered thickness value of the film. The mean refractive indexes of various materials are described in published documents such as "POLYMER HANDBOOK" (JOHN WILEY&SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethylmethacrylate (1.49), polystyrene (1.59).

When the hypothetical mean refractive index and a thickness value are put into KOBRA 21ADH, nx, ny and nz are calculated. And Nz, which is equal to (nx−nz)/(nx−ny), is calculated based on the calculated nx, ny and nz.

Preferred embodiments of the optical compensatory sheet of the invention to be used in liquid crystal displays employing various modes will be described.

(TN-Mode Liquid-Crystal Display Device)

TN-mode liquid crystal cell have been employed in color TFT liquid crystal displays, and are described in a various documents. In a TN-mode liquid crystal cell, rod-like liquid crystal molecules are oriented vertically in a center portion of the cell and rod-like liquid crystal molecules are oriented homogenously in a portion near to substrates.

The rod-like liquid crystal molecules in the central portion of the cell may be optically compensated by the homeotropic alignment of discotic molecules in the optically anisotropic layer, in which the disk-faces of the molecules are horizontally aligned, or by the optical properties of the substrate supporting the optically anisotropic layer; and the rod-like liquid crystal molecules in the portion near to the substrates may be optically compensated by the hybrid-alignment of the discotic molecules in the optically anisotropic layer, in which the tilt angles of the long axes of the discotic molecules vary depending on a distance from the substrate supporting the optically anisotropic layer. Or, the rod-like liquid crystal molecules in the central portion of the cell may be optically compensated by the homogeneous alignment of rod-like molecules in the optically anisotropic layer, in which the rod-like liquid crystal molecules are horizontally aligned, or by the optical properties of the substrate supporting the optically anisotropic layer; and the rod-like liquid crystal molecules in the portion near to the substrates may be optically compensated by the hybrid-alignment of the discotic molecules in the optically anisotropic layer.

In a homeotropic alignment, the liquid crystal molecules may be aligned in a manner that the angles between the mean direction of the long axes of the molecules and the layer surface are from 85 to 95°.

In a homogenous alignment, the liquid crystal molecules may be aligned in a manner that the angles between the mean direction of the long axes of the molecules and the layer surface are less than 5°.

In a hybrid-alignment, the liquid crystal molecules may be aligned in a manner that the angles between the mean direction of the long axes of the molecules and the layer surface are not less than 15°, and preferably from 15 to 85°.

The substrate supporting the optically anisotropic layer, the optically anisotropic layer formed of discotic molecules aligned in a homeotropic alignment, the optically anisotropic layer formed of rod-like molecules aligned in a homogenous alignment, or the combination thereof preferably has an Rth of 40 to 200 nm and an Re of 0 to 700 nm.

Optically anisotropic layers formed of discotic molecules aligned in a homeotropic alignment and optically anisotropic layers formed of rod-like molecules aligned in a homogenous alignment are described in JPA No. 2000-304931 and JPA No. 2000-304932. Optically anisotropic layers formed of discotic molecules aligned in a homeotropic alignment are described in JPA No. hei 8-50206.

(OCB-Mode Liquid-Crystal Display Device)

An OCB-mode liquid crystal cell is a bend alignment mode liquid crystal cell in which rod-like liquid crystal molecules in an upper side and a lower side are substantively oriented in an opposite direction to each other (or in other words symmetrically). Liquid crystal displays employing a bend alignment-mode are described in U.S. Pat. No. 4,583,825 and U.S. Pat. No. 5,410,422. In a bend alignment-mode, rod-like molecules are aligned symmetrically each other in an upper side and in a lower side, and, thus, the mode is called as OCB (Optically Compensatory Bend) mode.

As well as in the TN-mode, in the OCB-mode, in a black state, rod-like liquid crystal molecules are oriented vertically in a center portion of the cell and rod-like liquid crystal molecules are oriented homogenously in a portion near to substrate.

In a black state, rod-like molecules in the OCB mode are oriented in the same manner as in the TN-mode, and the preferred embodiments are same as those for the TN-mode. The central portion, in which rod-like liquid crystal molecules are aligned vertically, in the OCB-mode liquid cell is larger than that in the TN-mode cell, and there are a little differences between the preferred ranged of the optically anisotropic layers used for optically compensation of the OCB mode and the TN mode cells. In particular, the substrate supporting the optically anisotropic layer, the optically anisotropic layer formed of discotic molecules aligned in a homeotropic alignment or the optically anisotropic layer formed of rod-like molecules aligned in a homogenous alignment preferably has an Rth of 150 to 500 nm and an Re of 20 to 70 nm.

(Other Mode Liquid Crystal Display)

For optically compensating ECB-mode and STN-mode liquid crystal displays, the preferred ranges of the optical properties of the optically anisotropic layers may be decided in the same manner as described above.

EXAMPLE

The present invention will specifically be described referring to the specific examples. It is to be noted that any materials, reagents, ratio of use, operations and so forth can be properly altered without departing from the spirit of the present invention. The scope of the present invention is therefore by no means limited to the specific examples shown below.

Example 1-1

(Preparation of Polymer Substrate)

The following composition was charged in a mixing tank and agitated under heating to 30° C., to dissolve the individual ingredients to prepare a cellulose acetate solution.

| Composition of cellulose acetate solution (part by weight) | Inner layer (in part by weight) | Outer layer (in part by weight) |
|---|---|---|
| Cellulose acetate with an acetylation degree of 60.9% | 100 | 100 |
| Triphenyl phosphate (plasticizer) | 7.8 | 0.8 |
| Biphenyldiphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |

-continued

| Composition of cellulose acetate solution (part by weight) | Inner layer (in part by weight) | Outer layer (in part by weight) |
|---|---|---|
| Silica particle (AEROSIL R971 manufactured by Japan AEROSIL, CO., LTD.) | 0 | 0.8 |
| The following retardation-increasing agent | 1.4 | 0 |

Retardation-increasing agent

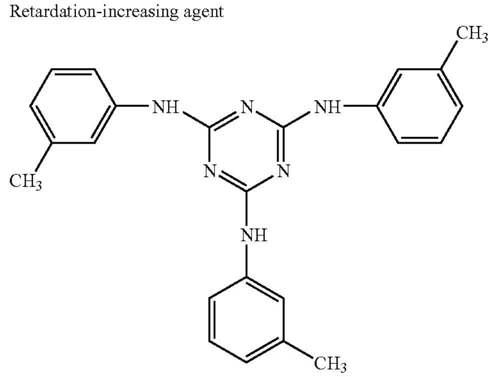

The resulting dope for the inner layer and the dope for the outer layer were cast on a drum cooled to 0° C., using a trilayer co-casting die. A film with a residual solvent amount of 70% by weight was peeled off from the drum. By fixing both the ends of the film under transfer at a draw ratio of 110% along the transfer direction with a pin tenter for drying at 80° C. until the residual solvent amount reached 10%, the film was dried at 110° C. Subsequently, the film was dried at a temperature of 140° C. for 30 minutes, to prepare a cellulose acetate film with a residual solvent of 0.3% by weight (the outer layer of 3 μm and the inner layer of 74 μm, the outer layer of 3 μm). The optical properties of the prepared cellulose acetate film (CF-02) were measured.

The width and thickness of the resulting polymer substrate (PK-1) were 1340 mm and 80 μm, respectively. The retardation value (Re) thereof was measured at a wavelength of 630 nm, using an ellipsometer (M-150 manufactured by JASCO Corporation). Re was 8 nm. The retardation value (Rth) was also measured at a wavelength of 630 nm. Rth was 93 nm.

After the prepared polymer substrate (PK-1) was immersed in aqueous 2.0 N potassium hydroxide solution (25° C.) for 2 minutes, the solution was neutralized with sulfuric acid, rinsed in pure water and dried. The surface energy of the PK-1 was determined by the contact angle method. The surface energy was 63 mN/m.

On PK-1, the coating solution of the following composition was coated at a coating amount of 28 mL/$m^2$, with a #16 wire bar coater. The substrate was dried in warm air at 60° C. for 60 seconds and then in warm air at 90° C. for 150 seconds, to form a layer.

| (Formulation of coating solution for oriented film) | |
|---|---|
| The following modified polyvinyl alcohol | 10 parts by weight |
| Water: | 371 parts by weight |
| Methanol: | 119 parts by weight |
| Glutar aldehyde (crosslinking agent): | 0.5 part by weight |

Modified polyvinyl alcohol

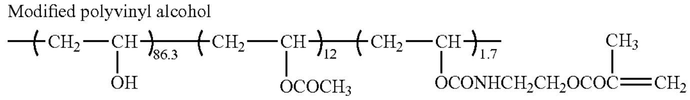

The layer was treated by rubbing process along a direction parallel to the slow axis (as measured at a wavelength of 632.8 nm) of the polymer substrate (PK-1), to form an alignment layer.

| (Preparation of optically anisotropic layer) | |
|---|---|
| Composition of optically anisotropic layer The following discotic liquid crystal compound: | 41.01 parts by weight |
| Ethylene oxide-modified trimethylol propane triacrylate (V#360 manufactured by Osaka Organic Chemical Industry, Ltd.): | 4.06 parts by weight |
| Cellulose acetate butylate (CAB 551-0.2, Eastman Chemical Corporation): | 0.69 part by weight |
| Polymer A (P-33): | 0.18 part by weight |
| Photopolymerization initiator (IrugaCure 907 manufactured by Chiba Geigy): | 1.35 parts by weight |
| Sensitizer (CayaCure DETX manufactured by Nippon Chemical Industrial Co., Ltd.): | 0.45 part by weight |

Discotic liquid crystal compound

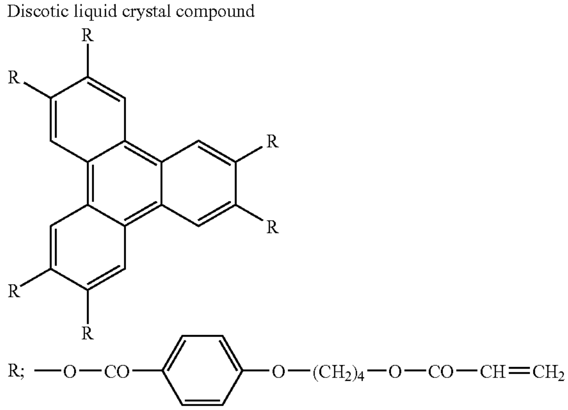

The composition of optically anisotropic layer was dissolved in 102 parts by weight of methyl ethyl ketone, to prepare a coating solution, which was then continuously coated on an alignment layer with a #3.6 wire bar and heated at a state of 130° C. for 2 minutes, to orient the discotic liquid crystal compound. Using a high-pressure mercury lamp of 120 W/cm at 100° C., then, UV irradiation was done for one minute, for the polymerization of the discotic liquid crystal compound. Subsequently, the resulting sheet was left to stand for cooling to ambient temperature. In such manner, an optical compensatory sheet with the optically anisotropic layer was prepared (KH-1a).

The retardation value Re of the optically anisotropic layer was measured at a wavelength of 546 nm, which was 52 nm.

A polarizing plate was arranged in crossed nicols arrangement, to observe the unevenness of the resulting optical compensatory sheet. No unevenness was detected under observation from the front or along a direction slanting up to 60° from the normal.

(Preparation of Polarizer)

PVA of an average polymerization degree of 4000 and with a saponification degree of 99.8 mol % was dissolved in water, to prepare an aqueous 4.0% solution. The solution was cast on a band, using a die with a taper and was dried, to prepare a film of the width at 110 mm and the thickness at 120 μm on the left end and 135 μm on the right end, before stretching.

The film was peeled off from the band and stretched in an oblique direction by 45° at its dry state, which was then immersed in an aqueous solution of 0.5 g/L iodine and 50 g/L potassium iodide at 30° C. for one minute as it was and was then immersed in an aqueous solution of 100 g/L boric acid and 60 g/L potassium iodide at 70° C. for 5 minutes. Then, the film was washed in water in a rinse tank at 20° C. for 10 seconds and dried at 80° C. for 5 minutes, to prepare an iodine-series polarizer (HF-01). The polarizer was at a width of 660 mm and a thickness of 20 μm on both the left and right sides.

(Preparation of Polarizing Plate)

Using a polyvinyl alcohol-series adhesive, KH-1a (optical compensatory sheet) was attached on the single side of the polarizer (HF-01) on the polymer substrate (PK-1) face. Additionally, triacetyl cellulose film of 80-μm thickness (TD-80U; manufactured by FUJI PHOTOFILM Co., Ltd.) was treated by saponification process and then attached on the opposite side of the polarizer, using the polyvinyl alcohol-type adhesive.

The transmission axis of the polarizer and the slow axis of the polymer substrate (PK-1) were arranged in parallel to each other. The transmission axis of the polarizer was arranged orthogonally to the slow axis of the triacetyl cellulose film. In such manner, a polarizing plate (HB-1a) was prepared.

Example 2-1

By the same procedures as in Example 1-1 except for the use of P-67 instead of P-33 as the polymer A, an optical compensatory sheet (KH-2a) and a polarizing plate with KH-2a (HB-2a) were prepared.

Example 3-1

By the same procedures as in Example 1-1 except for the addition of 0.18 part by weight of X-72 as the polymer B, 0.23 part by weight of CAB551-0.2 and 0.02 part by weight of P-33 as the polymer A, an optical compensatory sheet (KH-3a) and a polarizing plate with KH-3a (HB-3a) were prepared.

Example 4-1

By the same procedures as in Example 3-1 except for the use of X-66 instead of X-72 as the polymer B, an optical compensatory sheet (KH-4a) and a polarizing plate with KH-4a (HB-4a) were prepared.

Example 5-1

By the same procedures as in Example 1-1 except for the use of P-63 instead of P-33 as the polymer A, an optical compensatory sheet (KH-5a) and a polarizing plate with KH-5a (HB-5a) were prepared.

Comparative Example 1-1

By the same procedures as in Example 1-1 except for no addition of cellulose acetate butylate (CAB551-0.2), an optical compensatory sheet (KH-H1a) and a polarizing plate with KH-H1a (HB-H1a) were prepared.

Comparative Example 2-1

By the same procedures as in Example 1-1 except for no addition of P-33 as the polymer A, an optical compensatory sheet (KH-H2a) and a polarizing plate with KH-H2a (HB-H2a) were prepared.

(Evaluation of Optical Compensatory Sheets for TN Liquid Crystal Cell)

A pair of the polarizing plates arranged on the liquid crystal display device using a liquid crystal cell of TN type (AQUOS LC20C1S manufactured by Sharp Co., Ltd.) was peeled off. Instead, the polarizing plate (HB-1a) prepared in Example 1-1 was singly attached through an adhesive on the side of an observer and on the side of the backlight, so that the optical compensatory sheet (KH-1a) was on the side of the liquid crystal cell. The transmission axis of the polarizing plate on the side of an observer and the transmission axis of the polarizing plate on the side of the backlight were arranged in the O mode.

The viewing angles of the prepared liquid crystal display device were measured in 8 grades for black display (L1) to white display (L8), using a machine (EZ-Contrast 160D manufactured by ELDIM SA). The results are shown in Table 1-1.

(Measurement of Tilt Angle of Liquid Crystal Compound)

The tilt angle of the liquid crystal compound in the optically anisotropic layer nearby the alignment layer and the tilt angle thereof nearby the air interface were calculated according to the process described in Jpn. J. Appl. Phys., Vol. 36 (1997), pp. 143-147, based on the measured retardation at variable viewing angles, using an ellipsometer (APE-100 manufactured by Shimadzu Corporation). The measured wavelength was 632.8 nm. The results are shown in Table 1-1.

used in Example 1-1 to prepare polymer substrates with Rth at 80, 90, 110, 120 and 130 nm, an optical compensatory sheet and a polarizing plate with the optical compensatory sheet were prepared. Even when the Rth of the polymer substrates was modified to 80, 90, 110, 120 and 130 nm, the viewing angles in the vertical and horizontal directions were almost the same as the viewing angles in Example 1-1.

Example 7-1

In the same manner as in Example 1-1 except for the substitution of the retardation-increasing agent used in Example 1-1 with the following retardation-increasing agent, the addition of 1.4 parts by weight to the inner layer and the preparation of a polymer substrate with Rth of 110 nm, an optical compensatory sheet and a polarizing plate with the optical compensatory sheet were prepared. The viewing angles in the vertical and horizontal directions were almost the same as the viewing angles in Example 1-1.

TABLE 1-1

| Optical compensatory sheets | Cellulose ester | | Polymer A | | Polymer B | | Viewing angle | | Tilt angle | |
|---|---|---|---|---|---|---|---|---|---|---|
| | type | part by weight | type | part by weight | type | part by weight | vertical | Horizontal | On the side of alignment layer | on the side of air interface |
| Example 1-1 | CAB551-0.2 | 0.69 | P-33 | 0.18 | — | — | 168 | 160 | 6 | 78 |
| Example 2-1 | CAB551-0.2 | 0.69 | P-67 | 0.18 | — | — | 167 | 162 | 6 | 79 |
| Example 3-1 | CAB551-0.2 | 0.23 | P-33 | 0.02 | X-72 | 0.18 | 167 | 161 | 5 | 80 |
| Example 4-1 | CAB551-0.2 | 0.23 | P-33 | 0.02 | X-66 | 0.18 | 168 | 158 | 6 | 77 |
| Example 5-1 | CAB551-0.2 | 0.69 | P-63 | 0.18 | — | — | 170 | 165 | 6 | 78 |
| Comparative Example 1-1 | — | — | P-33 | 0.18 | X-72 | 0.18 | 125 | 120 | 6 | 52 |
| Comparative Example 2-1 | CAB551-0.2 | 0.69 | — | — | X-72 | 0.18 | 125 | 120 | 5 | 51 |

As shown in the results in Examples 1-1 through 5-1 and Comparative Examples 1-1 and 1-2 in Table 1-1, it can be understood that the optical compensatory sheets with no content of the polymer A or cellulose acetate butylate in accordance with the invention have low tilt angles of the liquid crystal compounds nearby the air interface (Comparative Examples 1-1 and 2-1) so the viewing angles of the liquid crystal display devices couldn't be sufficiently improved. Because the tile angles of the liquid crystal compounds in the optical compensatory sheets comprising both cellulose acetate butylate and the polymer A (Examples 1-1 through 5-1) nearby the air interface were controlled to optimal values, it can be understood that the optical compensatory sheets contributed to the improvement of the viewing angles.

Example 6-1

In the same manner as in Example 1 except for the modification of the amount of the retardation-increasing agent

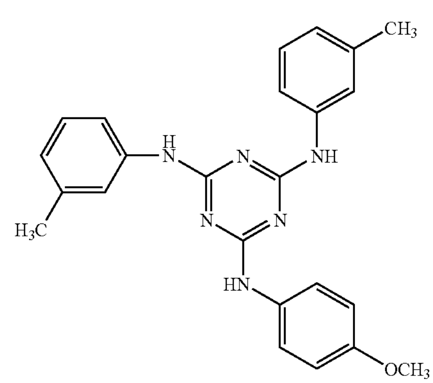

Retardation-increasing agent

Example 8-1

In the same manner as in Example 1-1 except for the modification of the amount of the retardation-increasing agent used in Example 7-1 to prepare polymer substrates with Rth at 80, 90, 100, 120 and 130 nm, an optical compensatory sheet and a polarizing plate with the optical compensatory sheet were prepared. Even when the Rth of the polymer substrates was modified to 80, 90, 100, 120 and 130 nm, the viewing angles in the vertical and horizontal directions were almost the same as the viewing angles in Example 1-1.

Example 1-2

(Preparation of Polymer Substrate)

The following composition was charged in a mixing tank and agitated under heating to 30° C., to dissolve the individual ingredients to prepare a cellulose acetate solution.

| Composition of cellulose acetate solution (part by weight) | Inner layer (in part by weight) | Outer layer (in part by weight) |
|---|---|---|
| Cellulose acetate with an acetylation degree of 60.9% | 100 | 100 |
| Triphenyl phosphate (plasticizer) | 7.8 | 7.8 |
| Biphenyldiphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica particle (AEROSIL R972 manufactured by Japan AEROSIL, CO., LTD.) | 0 | 0.8 |
| The following retardation-increasing agent | 2.0 | 0 |

Retardation-increasing agent

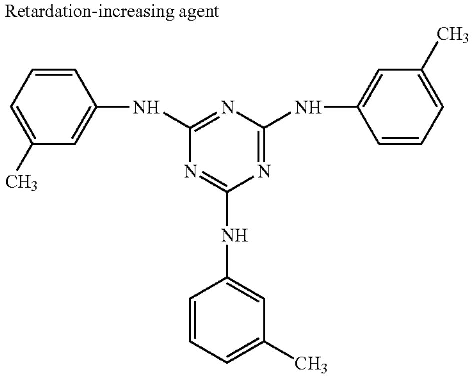

The resulting dope for the inner layer and the dope for the outer layer were casted on a drum cooled to 0° C., using a trilayer co-casting die. A film with a residual solvent amount of 70% by weight was peeled off from the drum. The film was dried at 80° C. under transfer at a draw ratio of 110% along the transfer direction fixing both the ends with a pin tenter until the residual solvent amount reached 10%, the film was dried at 110° C. Subsequently, the film was dried at a temperature of 140° C. for 30 minutes, to prepare a cellulose acetate film with a residual solvent of 0.3% by weight (the outer layer of 3 μm and the inner layer of 74 μm, the outer layer of 3 μm). The optical properties of the prepared cellulose acetate film were measured.

The width and thickness of the resulting polymer substrate (PK-1) were 1340 mm and 80 μm, respectively. The retardation value (Re) thereof was measured at a wavelength of 630 nm. Re was 8 nm. The retardation value (Rth) was also measured at a wavelength of 630 nm. Rth was 90 nm.

After the prepared polymer substrate (PK-1) was immersed in aqueous 2.0 N potassium hydroxide solution (25° C.) for 2 minutes, the solution was neutralized with sulfuric acid, rinsed in pure water and dried. The surface energy of the film was determined by the contact angle method. The surface energy was 63 mN/m.

On PK-1, the coating solution of the following composition was coated at a coating amount of 28 mL/m$^2$, with a #16 wire bar coater. The substrate was dried in warm air at 60° C. for 60 seconds and then in warm air at 90° C. for 150 seconds, to form a layer.

(Composition of coating solution for alignment layer)

| | |
|---|---|
| The following modified polyvinyl alcohol: | 10 parts by weight |
| Water: | 371 parts by weight |
| Methanol: | 119 parts by weight |
| Glutar aldehyde (crosslinking agent): | 0.5 part by weight |

Modified polyvinyl alcohol

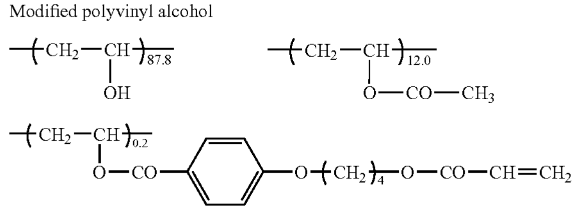

The layer was treated by rubbing process along a direction parallel to the slow axis (as measured at a wavelength of 632.8 nm) of the polymer substrate (PK-1), to form an alignment layer.

(Preparation of optically anisotropic layer)

| | |
|---|---|
| Composition A of optically anisotropic layer | 41.01 parts by weight |
| The following discotic liquid crystal compound: | |
| Ethylene oxide-modified trimethylol propane triacrylate (V#360 manufactured by Osaka Organic Chemical Industry, Ltd.): | 4.06 parts by weight |
| Cellulose acetate butylate (CAB 551-0.2, Eastman Chemical Corporation): | 0.34 part by weight |
| Cellulose acetate butylate (CAB 531-0.2, Eastman Chemical Corporation): | 0.11 part by weight |
| Compound of the formula (1b) (Q-23); MW = 15,000: | 0.18 part by weight |
| Compound of the formula (1b) (Q-23); MW = 30,000: | 0.27 part by weight |
| Photopolymerization initiator (IrugaCure 907 manufactured by Chiba Geigy): | 1.35 parts by weight |
| Sensitizer (CayaCure DETX manufactured by Nippon Chemical Industrial Co., Ltd.): | 0.45 part by weight |
| Fluoro-aliphatic group-containing polymer compound (X-66): | 0.18 part by weight |

-continued

| (Preparation of optically anisotropic layer) |
|---|

Discotic liquid crystal compound

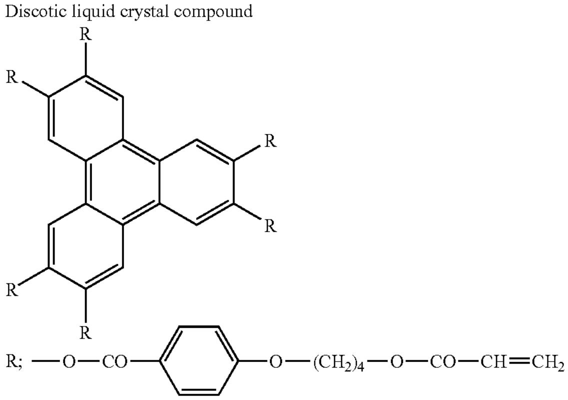

The composition A of optically anisotropic layer was dissolved in methyl ethyl ketone, to prepare a coating solution at a specific gravity of 0.920.

Using the die of the constitution in FIG. 3, the prepared coating solution was coated on the surface of the alignment layer. Using slot die 13 with the upstream lip land length IUP of 1 mm and the downstream lip land length ILO of 50 μm, the coating solution 14 was coated on web 12 at 5.2 ml/m$^2$. The coating speed was 60 m/min. Using the polymer substrate (PK-1) with the alignment layer formed thereon as the web 12, the length of the space from the downstream lip land 19 was preset at 40 μm. The alignment layer was treated by rubbing process along the direction parallel to the slow axis (as measured at a wavelength of 632.8 nm) of the polymer substrate (PK-1). The coating solution 14 was continuously coated, heated at a state of 125° C. for 2 minutes to orient the discotic liquid crystal compound. Using a high-pressure mercury lamp of 120 W/cm at 100° C., then, UV irradiation was done for one minute, for the polymerization of the discotic liquid crystal compound. Subsequently, the resulting sheet was left to stand for cooling to ambient temperature. In such manner, an optical compensatory sheet with the optically anisotropic layer was prepared (KH-1b).

The retardation value Re of the optically anisotropic layer was measured at a wavelength of 546 nm, which was 50 nm.

A polarizing plate was arranged in crossed nicols arrangement, to observe the unevenness of the resulting optical compensatory sheet. No unevenness was detected under observation from the front or along a direction slanting up to 60° from the normal.

(Preparation of Polarizer)

PVA of an average polymerization degree of 4000 and with a saponification degree of 99.8 mol % was dissolved in water, to prepare an aqueous 4.0% solution. The solution was cast on a band, using a die with a taper for drying, to prepare a film of the width at 110 mm and the thickness at 120 μm on the left end and 135 μm on the right end, before elongation.

The film was peeled off from the band and stretched in a slanting direction at 45° at its dry state, which was then immersed in an aqueous solution of 0.5 g/L iodine and 50 g/L potassium iodide at 30° C. for one minute and then immersed in an aqueous solution of 100 g/L boric acid and 60 g/L potassium iodide at 70° C. for 5 minutes. Then, the film was washed in water in a rinse tank at 20° C. for 10 seconds and dried at 80° C. for 5 minutes, to prepare an iodine-series polarizer (HF-01). The polarizer was at a width of 660 mm and a thickness of 20 μm on both the left and right sides.

(Preparation of Polarizing Plate)

Using a polyvinyl alcohol-series adhesive, KH-1b (optical compensatory sheet) was attached on the single side of the polarizer (HF-01) on the polymer substrate (PK-1) face. Additionally, triacetyl cellulose film of 80-μm thickness (TD-80U; manufactured by Fuji Film Co., Ltd.) was treated by saponification process and then attached on the opposite side of the polarizer, using the polyvinyl alcohol-series adhesive.

The transmission axis of the polarizer and the slow axis of the polymer substrate (PK-1) were arranged in parallel to each other. The transmission axis of the polarizer was arranged orthogonally to the slow axis of the triacetyl cellulose film. In such manner, a polarizing plate (HB-1b) was prepared.

Examples 2-2 Through 5-2, Comparative Examples 1-2 Through 5-2

By the same procedures as in Example 1-2 except for the modification of the compound added and used in Example 1-2 as shown in Table 1-2, optical compensatory sheets were prepared.

(Evaluation of Optical Compensatory Sheet for TN Liquid Crystal Cell)

A pair of the polarizing plates arranged on the liquid crystal display device using a liquid crystal cell of TN type (AQUOS LC20C1S manufactured by Sharp Co., Ltd.) was peeled off. Instead, the polarizing plate (HB-1b) prepared in Example 1-2 was singly attached through an adhesive on the side of an observer and on the side of the backlight so that the optical compensatory sheet (KH-1b) was on the side of the liquid crystal cell. The transmission axis of the polarizing plate on the side of an observer and the transmission axis of the polarizing plate on the side of the backlight were arranged in the O mode.

The viewing angle of the prepared liquid crystal display device was measured in 8 grades for black display (L1) to white display (L8), using a machine (EZ-Contrast 160D manufactured by ELDIM SA). In the same manner, a liquid crystal display device was prepared from Examples 2-2 through 4-2 and Comparative Examples 1-2 and 2-2, to measure the contrast viewing angle. The results of viewing angles with a contrast ratio of 20 or more are shown in Table 1-2.

The inversion of the gradation on black side was determined on the basis of inversion between L1 and L2. The results of angles at which downstream gradation inverted are shown in Table 1-2.

(Evaluation Unevenness on Display Panel of Liquid Crystal Display Device)

The display panels of the liquid crystal display devices from Examples 1-2 through 4-2 and Comparative Examples 1-2 and 2-2 were wholly adjusted to an intermediate gradation, to assess unevenness. The results are shown in Table 1-2.

(Evaluation of Tilt Angle of Liquid Crystal Compound)

The tilt angles of the liquid crystal molecules in the optically anisotropic layers in the optical compensatory sheets nearby the alignment layer and the tilt angle thereof nearby the air interface were calculated in the same manner as Example Nos. 1-1 to 5-1 and Comparative Example Nos. 1-1 and 2-1. The results are shown in Table 1-2.

(Evaluation of Adhesive Property of Optical Compensatory Sheet)

The adhesive property of optical compensatory sheet was assessed by preparing a test piece according to JIS K 5400, 8.5.2 Check board (go-ban) tape method. Herein, a polyester adhesive tape NO31RH manufactured by Nitto Denko Corporation was used for the assessment. The results are shown in Table 1-2.

| Liquid crystal display device | Compound of general formula (lb) | | Fluorine-containing polymer | Tilt angle (°) alignment layer | Tilt angle (°) air interface | Viewing angle vertical | Viewing angle horizontal | Angle for grayscale inversion in downward area | Adhesive property | Unevenness |
|---|---|---|---|---|---|---|---|---|---|---|
| Ex. 1-2 | No. Q-23, 0.18 part by weight, MW = 15,000 | No. Q-23, 0.27 part by weight, MW = 30,000 | No. X-66, 0.18 part by weight | 20 | 75 | 120 | 140 | 36 | 10 | No |
| Ex. 2-2 | No. Q-31, 0.14 part by weight, MW = 10,000 | No. Q-20, 0.36 part by weight, MW = 25,000 | No. X-51, 0.23 part by weight | 25 | 73 | 125 | 145 | 38 | 8 | No |
| Ex. 3-2 | No. Q-31, 0.14 part by weight, MW = 6,000 | No. Q-26, 0.32 part by weight, MW = 35,000 | No. X-62, 0.14 part by weight | 30 | 70 | 130 | 145 | 40 | 8 | No |
| Ex. 4-2 | No. Q-32, 0.09 part by weight, MW = 12,000 | No. Q-24, 0.27 part by weight, MW = 27,000 | No. X-68, 0.18 part by weight | 25 | 69 | 125 | 140 | 38 | 10 | No |
| Comp. Ex. 1-2 | — | No. Q-23, 0.45 part by weight, MW = 30,000 | No. X-66, 0.18 part by weight | 15 | 70 | 120 | 125 | 32 | 10 | No |
| Comp. Ex. 2-2 | — | | No. X-66, 0.18 part by weight | 12 | 49 | 90 | 105 | 33 | 8 | No |

As shown in the results from Examples 1-2 through 4-2 and Comparative Examples 1-2 and 2-2, as shown in Table 1-2, the tilt angle of the liquid crystal compounds nearby the interface with the alignment layers in the optical compensatory sheets with no content of the listed compounds with weight average molecular weights of 5,000 to less than 20,000 as represented by the general formula (1b) is small. The angle for the inversion of downward gradation in the liquid crystal display devices was not sufficiently improved (Comparative Examples 1-2 and 2-2). Because the tilt angle nearby the air interface and the tilt angle nearby the interface with the alignment layers are both controlled to optimal values in the optical compensatory sheets containing the polymers of the weight average molecular weight of 5,000 to less than 20,000 and the polymers of the weight average molecular weight of 20,000 or more as represented by the formula (1b) in accordance with the invention (Examples 1-2 through 4-2), these sheets contributed to the improvements of the angle for the grayscale inversion in the downward area and the viewing angle.

Example 6-2

In the same manner as in Example 1-2 except for the modification of the amount of the retardation-increasing agent used in Example 1-2 to prepare polymer substrates with Rth at 70, 80, 100, and 110 nm, an optical compensatory sheet and a polarizing plate with the optical compensatory sheet were prepared. Even when the Rth of the polymer substrates was modified to 70, 80, 100, and 110 nm, the same effects as the effects obtained in Example 1-2 were obtained concerning the viewing angles in vertical and horizontal directions.

Example 7-2

In the same manner as in Example 1-2 except for the substitution of the retardation-increasing agent used in Example 1-2 with the following retardation-increasing agent, the addition of 1.4 parts by weight to the inner layer and the preparation of a polymer substrate with Rth of 95 nm, an optical compensatory sheet and a polarizing plate with the optical compensatory sheet were prepared. The same effects as the effects obtained in Example 1-2 were obtained.

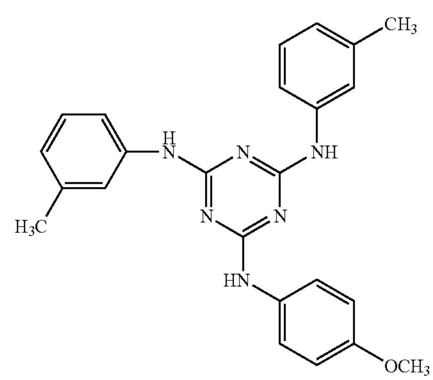

Retardation-increasing agent

Example 8-2

In the same manner as in Example 1 except for the modification of the amount of the retardation-increasing agent used in Example 7-2 to prepare polymer substrates with Rth at 70, 80, 90, 100, 110 and 120 nm, an optical compensatory sheet and a polarizing plate with the optical compensatory sheet were prepared. Even when the Rth of the polymer substrates was modified to 70, 80, 90, 100, 110 and 120 nm, the same effects as the effects obtained in Example 1-2 were obtained.

Example 1-3

An optically compensatory sheet and an oblique polarizing plate in constitutions shown in FIG. 1 were prepared.

<Preparation of Cellulose Acetate Film>

The following composition was charged in a mixing tank and agitated under heating to dissolve the individual components, to prepare a cellulose acetate solution.

| <Composition of cellulose acetate solution> | |
|---|---|
| Cellulose acetate with an acetylation degree of 60.7 to 61.1% | 100 parts by weight |
| Triphenyl phosphate (plasticizer) | 7.8 parts by weight |
| Biphenyldiphenyl phosphate (plasticizer) | 3.9 parts by weight |
| Methylene chloride (first solvent) | 336 parts by weight |
| Methanol (second solvent) | 29 parts by weight |
| Butanol (third solvent) | 11 parts by weight |

In another mixing tank, the following 16 parts by weight of retardation-increasing agent, 92 parts by weight of methylene chloride and 8 parts by weight of methanol were charged and agitated under heating, to prepare a solution of the retardation-increasing agent. 31 parts by weight of the solution of the retardation-increasing agent were mixed in 474 parts by weight of the cellulose acetate solution, for thorough agitation, to prepare a dope.

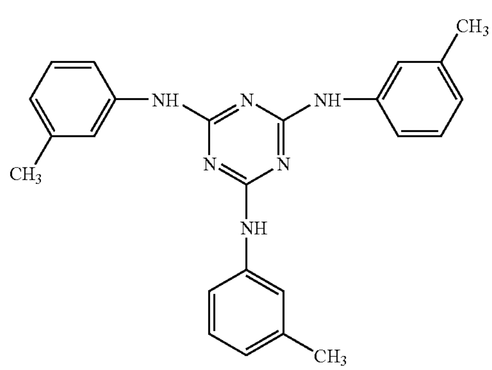 [SMILES: Cc1cccc(Nc2nc(Nc3cccc(C)c3)nc(Nc3cccc(C)c3)n2)c1]

Retardation-increasing agent

The resulting dope was cast with a band stretching machine. After the temperature of the film surface on the band reached 40° C., the film was dried in warm air at 70° C. for one minute. From the side of the band, then, the film was dried in dry air at 140° C. for 10 minutes, to prepare a cellulose acetate film (of a thickness dimension of 80 μm) with the resultant residual solvent level of 0.3% by weight. The retardation value Re of the prepared cellulose acetate film (transparent support, transparent protective film) and the retardation value Rth thereof at a wavelength of 546 nm were measured according a method described above, using an ellipsometer (M-150 manufactured by JASCO Corporation). Re was 8 nm, while Rth was 91 nm.

After the prepared cellulose acetate film was immersed in aqueous 2.0 N potassium hydroxide solution (25° C.) for 2 minutes, the solution was neutralized with sulfuric acid, rinsed in pure water and dried. The surface energy of the film was determined by the contact angle method. The surface energy was 63 mN/m.

<Preparation of Alignment Layer for Use in Optically Anisotropic Layer>

The coating fluid of the following composition was coated at 28 mL/m$^2$, with a #16 wire bar coater on the cellulose acetate film, and was dried in warm air at 60° C. for 60 seconds and then in warm air at 90° C. for 150 seconds, to form a layer.

| (Composition of coating fluid for alignment layer) | |
|---|---|
| The following modified polyvinyl alcohol | 20 parts by weight |
| Water | 360 parts by weight |
| Methanol | 120 parts by weight |
| Glutar aldehyde (crosslinking agent) | 1.0 part by weight |

modified polyvinyl alcohol

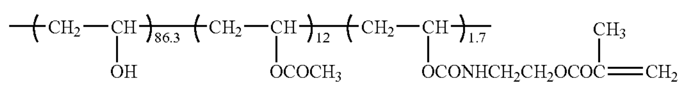

<Preparation of Optically Anisotropic Layer>

At the process of producing optically compensatory sheet, web is fed with a feeder, passes through a coating step with rubbing process roll and slot die coat and then passes through a drying step immediately thereafter. Subsequently, the web passes through a drying zone, a heating zone and an ultraviolet lamp to be wound with a winder. The above steps form the fundamental steps of the process. On the side opposite to the side of the web running direction, a chamber under reduced pressure was arranged at a position without contact, so as to allow the bead to be sufficiently adjusted to reduced pressure.

The lip land length $I_{UP}$ on the upstream side of the slot die was set at 1 mm, while the lip land length $I_{LO}$ of the downstream thereof was set at 50 μm. Using the slot die, the coating fluid was coated at 5 ml/m$^2$ on the web, to a final moist film thickness of 5 μm. The coating speed was 50 m/minute. As the web, the cellulose acetate film coated with the alignment layer was used. The length of the gap between the downstream lip land and the cellulose triacetate substrate as the web was set to 40 μm. The surface of the coated face of the alignment layer was treated by rubbing process, which was then transferred as it was to a coating step for coating. Herein, the rubbing process was done as follows: the alignment layer was treated in the direction parallel to the slow axis of the cellulose acetate film. The rotation peripheral speed of the rubbing roller was set at 5.0 m/s at the rubbing process, while the press pressure for the resin layer for use in the alignment layer was set at 9.8×10$^{-3}$ Pa.

As the coating fluid, the composition 1 of the optically anisotropic layer as shown below was used. The coating speed was set at 50 m/s. Immediately after coating, initial drying was done, using dryer 18 shown in FIG. 5(*a*). The whole length of the dryer 18 was 5 m. The condense plate 30 in the dryer 18 was arranged with a predetermined tilt angle so that the downstream side in the running direction was apart from the coated film. The distance between the condense plate 30 and the web as well as the temperature of the condense plate and the temperature of the coating fluid were controlled to adjust the Rayleigh number to 1200. The web treated by the initial drying with the dryer 18 was passed through the heating zone preset at 130° C. The surface of the resulting liquid crystal layer was irradiated with ultraviolet ray with an UV lamp of 160 W/cm in atmosphere at 60° C., to prepare an optically compensatory sheet (KH-1c).

(Composition 1 of coating fluid of optically anisotropic layer)
The following composition was dissolved in 102 parts by weight of methyl ethyl ketone, to prepare a coating fluid.

| | |
|---|---|
| The discotic liquid crystal compound listed below | 41.0 parts by weight |
| Ethylene oxide-modified trimethylol propane triacrylate (V#360 manufactured by Osaka Organic Chemical Industry, Ltd.) | 4.06 parts by weight |
| Cellulose acetate butylate (CAB 551-0.2, Eastman Chemical Corporation) | 0.34 part by weight |
| Cellulose acetate butylate (CAB 531-1, Eastman Chemical Corporation) | 0.11 part by weight |
| The following fluoro-aliphatic group-containing polymer | 0.03 part by weight |
| Compound listed as the following fluoro-aliphatic group-containing polymer | 0.23 part by weight |
| Photopolymerization initiator (IrugaCure 907 manufactured by Chiba Geigy) | 1.35 parts by weight |
| Sensitizer (CayaCure DETX manufactured by Nippon Chemical Industrial Co., Ltd.) | 0.45 part by weight |

discotic liquid crystal compound

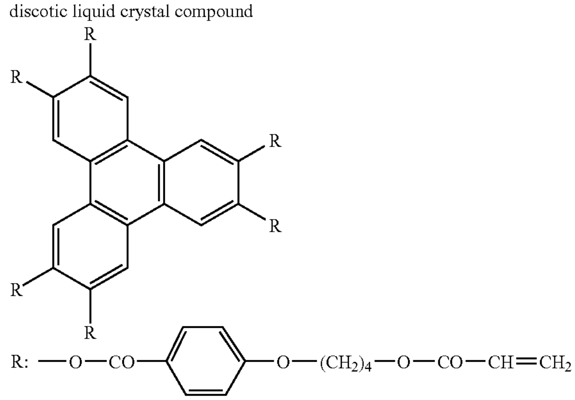

fluoro-aliphatic group-containing polymer

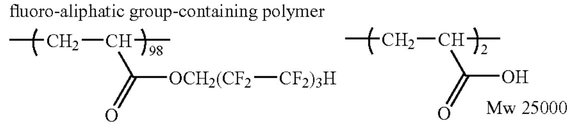

fluoro-aliphatic group-containing polymer

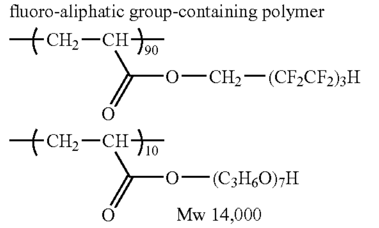

<Evaluation of Characteristic Properties of Optically Compensatory Sheet>

The prepared optically compensatory sheet was placed in between the polarizing sheets arranged in crossed nicols, to observe the face. The optically anisotropic layer had no defects such as shlieren and was a uniform film without any irregularity even at any viewing angle along any directions. Additionally, the optically compensatory sheet was sliced into an ultra-thin section with a microtome so that the direction of the rubbing process might be a cross section. While rotating the stage, the section was observed with a polarizing microscope. It was found that different points quenched along the thickness direction, indicating apparent hybrid orientation.

The retardation of the optically compensatory sheet thus prepared was measured along directions of viewing angles 0°, ±40° on the plane 220 in FIG. 1(*b*), using an ellipsometer (M-150 manufactured by JASCO Corporation). By the same procedures, the retardation of the cellulose acetate film used as the support was measured. Based on the difference, the retardation value of the optically anisotropic layer was calculated. The results are shown below in Table 1-3.

<Preparation of Polarizing Plate>

The optically compensatory sheet prepared was immersed in aqueous 1.5N sodium hydroxide (NaOH) solution at 50° C. for 1.5 minutes, for the hydrophilic treatment of the surface. Subsequently, the surface was neutralized with sulfuric acid, rinsed with pure water and then dried. Additionally, a cellulose triacetate film of a thickness dimension of 80 μm (TD-80U manufactured by Fuji Film Co., Ltd.) was similarly treated by the hydrophilic process. Iodine was adsorbed onto the elongated polyvinyl alcohol film to prepare a polarizing film. Continuously, the optically compensatory sheet and the cellulose triacetate film after the hydrophilic process were individually attached on both the sides of the polarizing film, using a polyvinyl alcohol adhesive. The face of the optically compensatory sheet without any optically anisotropic layer coated thereon was attached on the polarizing film. The absorption axis of the polarizing film and the slow axis (direction parallel to the casting direction) of the support of the optically compensatory sheet were arranged in parallel. In such a manner, a polarizing plate was prepared.

<Preparation of Liquid Crystal Cell>

Figure 2:
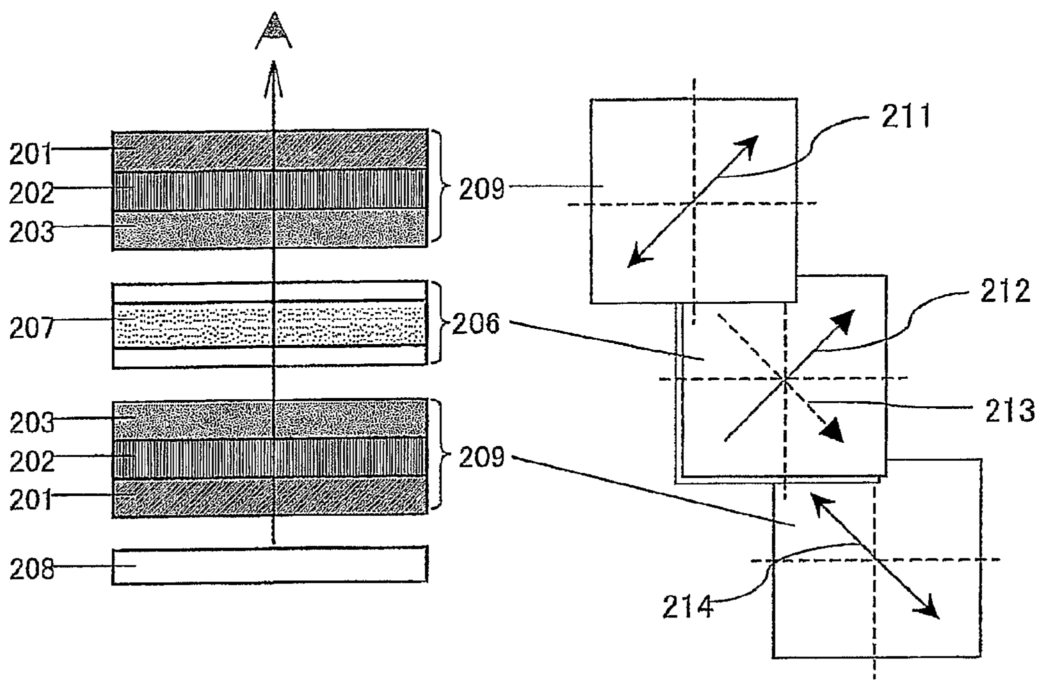
FIG. 2 shows a schematic view of one example of an arrangement of an optical compensatory sheet and an ellipsoidal polarizing plate in a liquid crystal display.

A liquid crystal cell was prepared by sealing a liquid crystal material with an anisotropic layer with a positive dielectric constant in between substrates by dropwise injection, while defining the cell gap (d) as 5 μm, to set Δnd at 400 nm (Δn is the anisotropic refractive index of liquid crystal material). Additionally, the twisted angle of the liquid crystal layer of the liquid crystal cell was preset to 90°. As shown in FIG. 2, the prepared polarizing plate was attached through an adhesive to the cell on the upper and lower sides of the cell, so that the absorption axis of the polarizing plate might be along the rubbing direction of the upper and lower substrates of the liquid crystal cell.

<Optical Measurement of Liquid Crystal Display Device Prepared>

A 60-Hz rectangular voltage was applied to the liquid crystal display device thus prepared. Normally white mode at 1.5-V white display and 5.6-V black display was used. A measuring apparatus EZ-Contrast 160D manufactured by ELDIM SA was used to measure the contrast ratio as the transmission ratio (for white display/black display) and to measure the viewing angle at a transmission level prepared by dividing the difference between the transmission level for black display (L1) and the transmission level for white display (L8) at an equal interval into eight grades. A range involving no inversion of transmission in adjacent grades in the downward area and a range with a contrast ratio of 10 or more were measured. The results are shown in Table 1-3.

Example 2-3

By the same procedures as in Example 1-3 except for the use of the following composition 2 of the coating fluid of the optically anisotropic layer, an optically compensatory sheet and a polarizing plate were prepared.

(Composition 2 of coating fluid of optically anisotropic layer)
The following composition was dissolved in 95 parts by weight of methyl ethyl ketone, to prepare the coating fluid.

| | |
|---|---|
| The discotic liquid crystal compound listed below | 41.0 parts by weight |
| Ethylene oxide-modified trimethylol propane triacrylate (V#360 manufactured by Osaka Organic Chemical Industry, Ltd.) | 4.06 parts by weight |
| Cellulose acetate butylate (CAB 551-0.2, Eastman Chemical Corporation) | 0.34 part by weight |
| Cellulose acetate butylate (CAB 531-1, Eastman Chemical Corporation) | 0.11 part by weight |
| The fluoro-aliphatic group-containing polymer listed below | 0.04 part by weight |
| Compound listed as the following fluoro-aliphatic group-containing polymer | 0.23 part by weight |
| Photopolymerization initiator (IrugaCure 907 manufactured by Chiba Geigy) | 1.35 parts by weight |
| Sensitizer (CayaCure DETX manufactured by Nippon Chemical Industrial Co., Ltd.) | 0.45 part by weight |

discotic liquid crystal compound

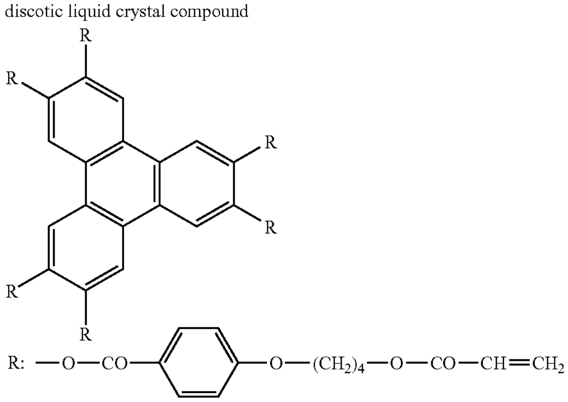

fluoro-aliphatic group-containing polymer

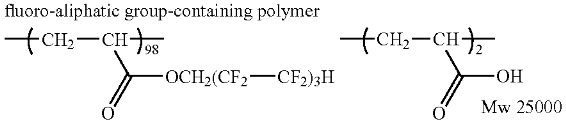

fluoro-aliphatic group-containing polymer

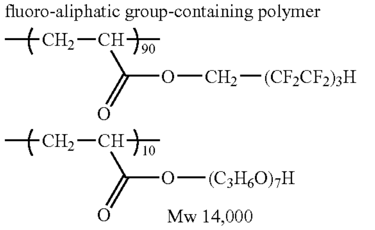

Example 3-3

By the same procedures as in Example 1-3 except for the adjustment of the amount of the retardation-increasing agent (Chemical compound 1) used for the cellulose acetate film and the use of a cellulose acetate support film to final 9 nm Re and 103 nm Rth, an optically compensatory sheet and a polarizing plate were prepared.

Comparative Example 1-3

By the same procedures as in Example 1-1 except for the use of the following composition 3 of the coating fluid of the optically anisotropic layer, an optically compensatory sheet and a polarizing plate were prepared.

(Composition 3 of coating fluid of optically anisotropic layer)
The following composition was dissolved in 100 parts by weight of methyl ethyl ketone, to prepare the coating fluid.

| | |
|---|---|
| The discotic liquid crystal compound listed below | 41.0 parts by weight |
| Ethylene oxide-modified trimethylol propane triacrylate (V#360 manufactured by Osaka Organic Chemical Industry, Ltd.) | 4.06 parts by weight |
| Cellulose acetate butylate (CAB 551-0.2, Eastman Chemical Corporation) | 0.90 part by weight |
| Cellulose acetate butylate (CAB 531-1, Eastman Chemical Corporation) | 0.20 part by weight |
| Compound listed as the following fluoro-aliphatic group-containing polymer | 0.23 part by weight |
| Photopolymerization initiator (IrugaCure 907 manufactured by Chiba Geigy) | 1.35 parts by weight |
| Sensitizer (CayaCure DETX manufactured by Nippon Chemical Industrial Co., Ltd.) | 0.45 part by weight |

discotic liquid crystal compound

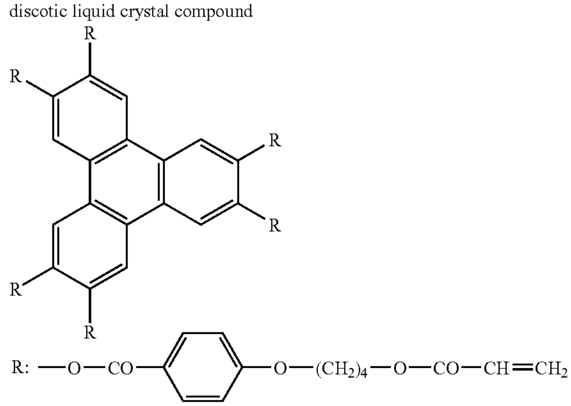

fluoro-aliphatic group-containing polymer

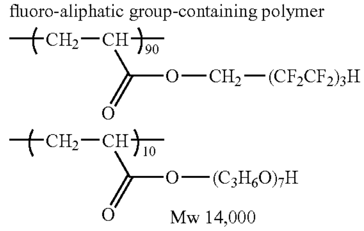

Example 4-3

By the same procedures as in Example 1-3 except for continuous coating with #3.6 wire bar for coating the coating fluid for forming an optically anisotropic layer, an optically compensatory sheet and a polarizing plate were prepared.

Comparative Example 2-3

By the same procedures as in Example 1-3 except for continuous coating with #3.0 wire bar for coating the coating fluid for forming an optically anisotropic layer, an optically compensatory sheet and a polarizing plate were prepared.

Example 5-3

By the same procedures as in Example 1-3 except for the use of a hot-air drying process of drying the coating face in air purge from an air nozzle from the side of the coating face while supporting the non-coated face with a roller as a drying step arranged immediately after coating, an optically compensatory sheet and a polarizing plate were prepared.

The results are collectively shown in Table 1-3.

TABLE 1-3

| Optically compensatory sheets | Re (0) | Re(+40)/ Re (0) | Re(−40)/ Re (0) | Viewing angle Range at C.R. > 10 horizontal | vertical | Unevenness |
|---|---|---|---|---|---|---|
| Example 1-3 | 50 | 1.68 | 0.46 | >160° | >160° | not observed |
| Example 2-3 | 52 | 1.66 | 0.42 | >160° | >160° | not observed |
| Example 3-3 | 49 | 1.71 | 0.46 | >160° | >160° | not observed |
| Comparative Example 1-3 | 43 | 2.03 | 0.32 | 150° | 145° | not observed |
| Example 4-3 | 51 | 1.70 | 0.44 | >160° | >160° | slight step-wise unevenness |
| Comparative Example 2-3 | 38 | 1.62 | 0.48 | 160° | 140° | step-wise unevenness |
| Example 5-3 | 50 | 1.69 | 0.44 | >160° | >160° | slight step-wise unevenness |

In the Examples, the contrast viewing angles of the liquid crystal display devices were 10 or more at any positions. Additionally, no or almost no unevenness was observed at any positions. Thus, uniform liquid crystal display devices could be obtained. In Comparative Examples 1-3 and 2-3, the retardation values or angles dependency of the optically compensatory sheets were not appropriate, so that no great contrast viewing angle was obtained. In Comparative Example 2-3, unevenness was confirmed at such a level that the unevenness obstructed or spoiled the view, particularly when the unevenness was noted on a large area.

In Examples 4-3 and 5-3, step-wise or wave-like unevenness was slightly observed in particularly exact sense. However, the level was not problematic in practical sense.

INDUSTRIAL APPLICABILITY

According to the present invention, novel optical compensatory films, comprising a layer giving an optical anisotropy brought about by a hybrid alignment of liquid-crystalline molecules with an improved tilt angle, excellent in optical compensation can be provided. Optical films and polarizing plates, comprising an optically anisotropic layer formed of a composition comprising at least one discotic liquid-crystal compound, in which the discotic liquid-crystalline molecules are aligned in a hybrid alignment with improved tilt angles at an air interface side and/or at an alignment layer side, capable of contributing to improving viewing angles of liquid crystal displays employing TN-mode, OCB-mode, VA-mode, IPS-mode or the like, can be provided.

CROSS-REFERENCE TO RELATED APPLICATIONS

This application claims benefit of priorities to Japanese Patent Application No. 2004-188334 filed Jun. 25, 2004, Japanese Patent Application No. 2004-274716 filed Sep. 22, 2004, and Japanese Patent Application No. 2004-277364 filed Sep. 24, 2004.

The invention claimed is:

1. An optical compensatory sheet comprising an optically anisotropic layer comprising:

at least one liquid crystal compound, at least one cellulose ester, and at least one polymer A comprising:

at least one repeating unit derived from a monomer having a fluoro-aliphatic group, and at least one repeating unit represented by a formula (1a):

Formula (1a)

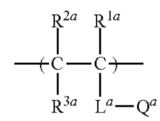

wherein $R^{1a}$, $R^{2a}$ and $R^{3a}$ respectively represent a hydrogen atom or a substituent; La is a linking group selected from Linkage Group I shown below or a divalent group consisting of two or more selected from Linkage Group I shown below:

(Linkage Group I)

a single bond, —O—, —CO—, —$NR^{4a}$— ($R^{4a}$ is a hydrogen atom, an alkyl group, an aryl group or an aralkyl group), —S—, —$SO_2$—, —P(═O)($OR^{5a}$)— ($R^{5a}$ is an alkyl group, an aryl group or aralkyl group), an alkylene group and arylene group;

and $Q^a$ is a carboxyl group (—COOH) or a salt thereof, a sulfo group (—$SO_3H$) or a salt thereof or a phosphonoxy group {OP(═O)$(OH)_2$} or a salt thereof, wherein the amount of the monomer containing a fluoro-aliphatic group is not less than 5 wt % with respect to the total amount of all monomers constituting the polymer A, wherein said at least one repeating unit derived from a monomer having a fluoro-aliphatic group is represented by formula (2a):

Formula (2a)

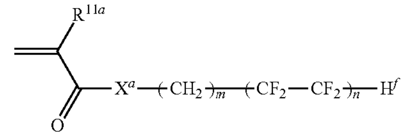

where $R^{11a}$ is a hydrogen or methyl; $X^a$ is oxygen (O), sulfur (S) or —N($R^{12a}$)— where $R^{12a}$ represents a hydrogen atom or a $C_{1-4}$ alkyl group; $H^f$ is hydrogen or fluorine; m is an integer from 1 to 6 and n is an integer from 2 to 4.

2. The optical compensatory sheet of claim 1, wherein the optically anisotropic layer further comprises at least one polymer B having a fluoro-aliphatic group.

3. The optical compensatory sheet of claim 1, wherein, in the optically anisotropic layer, molecules of the liquid crystal compound are fixed in a hybrid alignment state.

4. The optical compensatory sheet of claim 1, wherein the liquid crystal compound is a discotic compound.

5. A liquid crystal display comprising at least one optical compensatory sheet of claim 1.

6. A polarizing plate comprising, at least, a linear polarizing film and an optical compensatory sheet of claim 1.

7. A liquid crystal display comprising a liquid crystal cell, a pair of polarizing films respectively disposed either side of the liquid crystal cell, and at least one optical compensatory sheet of claim 1 disposed between the cell and one of the pair of the polarizing films.

8. The optical compensatory sheet of claim 2, wherein the repeating unit having a fluoro-aliphatic group is derived from a monomer represented by formula (2a):

Formula (2a)

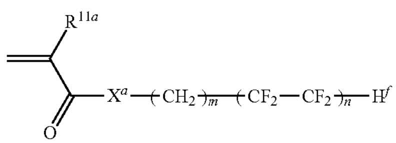

wherein $R^{11a}$ is a hydrogen or methyl; $X^a$ is oxygen (O), sulfur (S) or —N($R^{12a}$)— where $R^{12a}$ represents a hydrogen atom or a $C_{1-4}$ alkyl group; $H^f$ is hydrogen or fluorine; m is an integer from 1 to 6 and n is an integer from 2 to 4.

9. The optical compensatory sheet of claim 2, wherein the polymer B is a copolymer comprising a repeating unit derived from a monomer represented by a formula (2a), and a repeating unit derived from a monomer represented by a formula (3a):

Formula (2a)

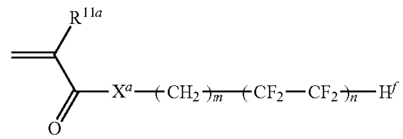

wherein $R^{11a}$ is a hydrogen or methyl; $X^a$ is oxygen (O), sulfur (S) or —N($R^{12a}$)— where $R^{12a}$ represents a hydrogen atom or a $C_{1-4}$ alkyl group; $H^f$ is hydrogen or fluorine; m is an integer from 1 to 6 and n is an integer from 2 to 4;

Formula (3a)

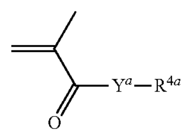

wherein $R^{3a}$ is hydrogen or methyl; $Y^a$ represents a linking group; $R^{4a}$ represents an optionally substituted poly(alkylene)oxy group or an optionally substituted linear, branched or cyclic $C_{1-20}$ alkyl group.

10. The optical compensatory sheet of claim 1, wherein $X^a$ is —N($R^{12a}$)— where $R^{12a}$ represents a hydrogen atom or methyl.

* * * * *